(12) United States Patent
Medina et al.

(10) Patent No.: US 9,078,128 B2
(45) Date of Patent: Jul. 7, 2015

(54) SYSTEM AND METHOD FOR SECURE IDENTITY SERVICE

(75) Inventors: Alexander A. Medina, San Francisco, CA (US); Andrew H. Vyrros, San Francisco, CA (US); Darryl N. Bleau, Campbell, CA (US); Jeffrey T. Davey, San Jose, CA (US); Justin E. Santamaria, San Francisco, CA (US); Justin N. Wood, Sunnyvale, CA (US); Thomas Devanneaux, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/224,626

(22) Filed: Sep. 2, 2011

(65) Prior Publication Data

US 2012/0311686 A1 Dec. 6, 2012

Related U.S. Application Data

(60) Provisional application No. 61/492,917, filed on Jun. 3, 2011.

(51) Int. Cl.
| | |
|---|---|
| *G06F 21/31* | (2013.01) |
| *G06F 21/83* | (2013.01) |
| *G06F 21/34* | (2013.01) |
| *G06F 21/36* | (2013.01) |
| *H04W 12/06* | (2009.01) |
| *H04L 29/06* | (2006.01) |
| *G06F 21/33* | (2013.01) |

(52) U.S. Cl.
CPC ............... *H04W 12/06* (2013.01); *G06F 21/31* (2013.01); *H04L 63/0807* (2013.01); *H04L 63/0823* (2013.01); *H04L 2463/121* (2013.01); *G06F 21/33* (2013.01)

(58) Field of Classification Search
USPC ........... 1/1; 370/352, 357, 389, 401; 380/273, 380/279; 379/142, 221; 709/203, 204, 227, 709/229; 713/156, 175; 726/5, 7, 10, 18
See application file for complete search history.

(56) References Cited

U.S. PATENT DOCUMENTS

| | | | |
|---|---|---|---|
| 5,410,543 A | 4/1995 | Seitz et al. | |
| 6,002,768 A * | 12/1999 | Albanese et al. ............. | 713/175 |
| 6,101,532 A | 8/2000 | Horibe et al. | |
| 6,502,135 B1 | 12/2002 | Munger et al. | |
| 6,684,248 B1 | 1/2004 | Janacek et al. | |
| 7,102,663 B2 | 9/2006 | Crook | |
| 7,418,504 B2 | 8/2008 | Larson et al. | |

(Continued)

*Primary Examiner* — Andrew Nalven
*Assistant Examiner* — Huan V Doan
(74) *Attorney, Agent, or Firm* — Blakely, Sokoloff, Taylor & Zafman LLP

(57) ABSTRACT

A system and method for securely processing identity information. For example, in one embodiment of the invention, a first user is registered on an identity service with one or more identification (ID) codes and a token. In response to a query from a second user to connect with the first user, a query signature is generated using the one or more ID codes and token of the first and second users, and a timestamp. The query signature is usable by network services to authenticate communication between the first and second users on the network over a specified period of time. In another embodiment, user ID codes and tokens are cached on mobile devices and/or a system cache to improve performance. The validity of the cached data is determined by calculating a fingerprint which, in one embodiment, is a hash of the ID code, token and a timestamp.

31 Claims, 42 Drawing Sheets

(56) References Cited

U.S. PATENT DOCUMENTS

| | | |
|---|---|---|
| 7,490,151 B2 | 2/2009 | Munger et al. |
| 7,603,594 B2 | 10/2009 | Inoue et al. |
| 7,620,690 B1 | 11/2009 | Castelli |
| 7,921,211 B2 | 4/2011 | Larson et al. |
| 2003/0056093 A1* | 3/2003 | Huitema et al. ............. 713/156 |
| 2003/0220107 A1 | 11/2003 | Lioy et al. |
| 2004/0048612 A1 | 3/2004 | Virtanen et al. |
| 2004/0109457 A1* | 6/2004 | Johnson et al. ............. 370/401 |
| 2004/0240650 A1 | 12/2004 | Bear et al. |
| 2006/0068758 A1 | 3/2006 | Dharmadhikari et al. |
| 2006/0072569 A1* | 4/2006 | Eppinger et al. ............. 370/389 |
| 2007/0002829 A1 | 1/2007 | Chang et al. |
| 2007/0097989 A1 | 5/2007 | Sato |
| 2007/0104180 A1* | 5/2007 | Aizu et al. .................. 370/352 |
| 2007/0115962 A1 | 5/2007 | Mammoliti et al. |
| 2007/0121856 A1 | 5/2007 | Alperin et al. |
| 2007/0147263 A1 | 6/2007 | Liao et al. |
| 2007/0253418 A1 | 11/2007 | Shiri et al. |
| 2007/0255784 A1* | 11/2007 | Takechi et al. ............. 709/203 |
| 2008/0064398 A1 | 3/2008 | Zhu et al. |
| 2008/0123685 A1 | 5/2008 | Varma et al. |
| 2008/0181169 A1 | 7/2008 | Lauer et al. |
| 2008/0233990 A1 | 9/2008 | Jen |
| 2009/0017855 A1 | 1/2009 | Kwon et al. |
| 2009/0075642 A1* | 3/2009 | Rantapuska et al. ....... 455/422.1 |
| 2009/0187978 A1* | 7/2009 | Upendran et al. ............. 726/5 |
| 2009/0193507 A1 | 7/2009 | Ibrahim |
| 2009/0234910 A1 | 9/2009 | Chung et al. |
| 2009/0288143 A1 | 11/2009 | Stebila et al. |
| 2009/0313688 A1 | 12/2009 | Tuil |
| 2009/0319473 A1* | 12/2009 | Rao et al. .................... 707/2 |
| 2009/0324197 A1 | 12/2009 | Ueda et al. |
| 2010/0001058 A1 | 1/2010 | Grovit |
| 2010/0098226 A1 | 4/2010 | Gupta et al. |
| 2010/0199089 A1 | 8/2010 | Vysogorets et al. |
| 2010/0217964 A1 | 8/2010 | Peterka et al. |
| 2010/0228982 A1 | 9/2010 | Zhu et al. |
| 2010/0245585 A1 | 9/2010 | Fisher et al. |
| 2010/0246355 A1 | 9/2010 | Ueda et al. |
| 2010/0325427 A1 | 12/2010 | Ekberg et al. |
| 2012/0051529 A1* | 3/2012 | Dobbins et al. .......... 379/142.06 |
| 2012/0054276 A1* | 3/2012 | Chaturvedi et al. ........... 709/204 |
| 2012/0131101 A1* | 5/2012 | Said et al. .................... 709/204 |
| 2012/0144457 A1* | 6/2012 | Counterman .................... 726/5 |

* cited by examiner

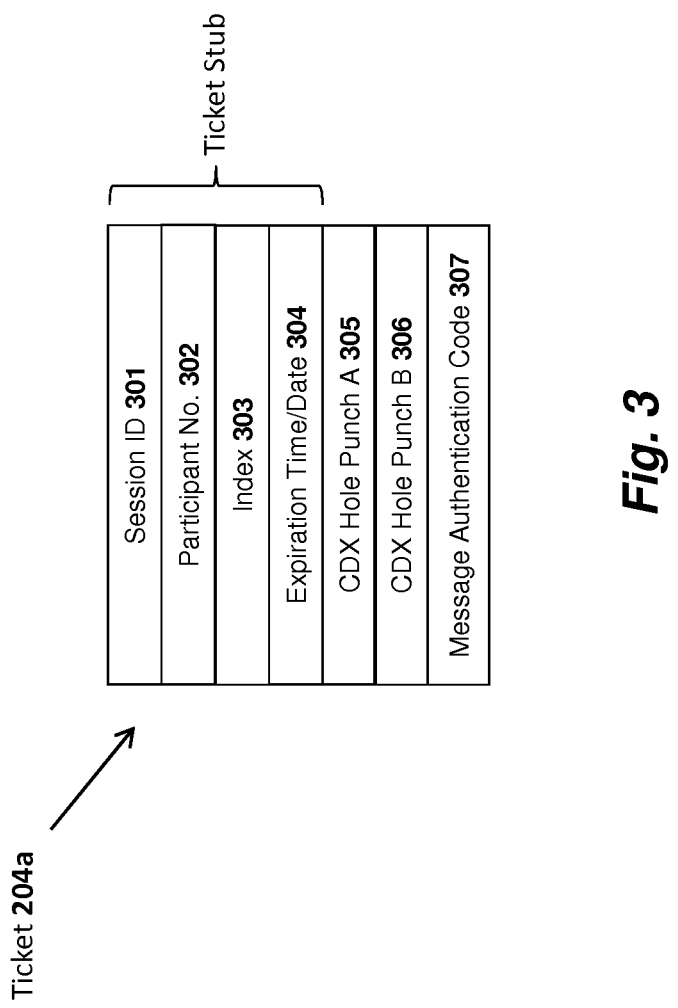

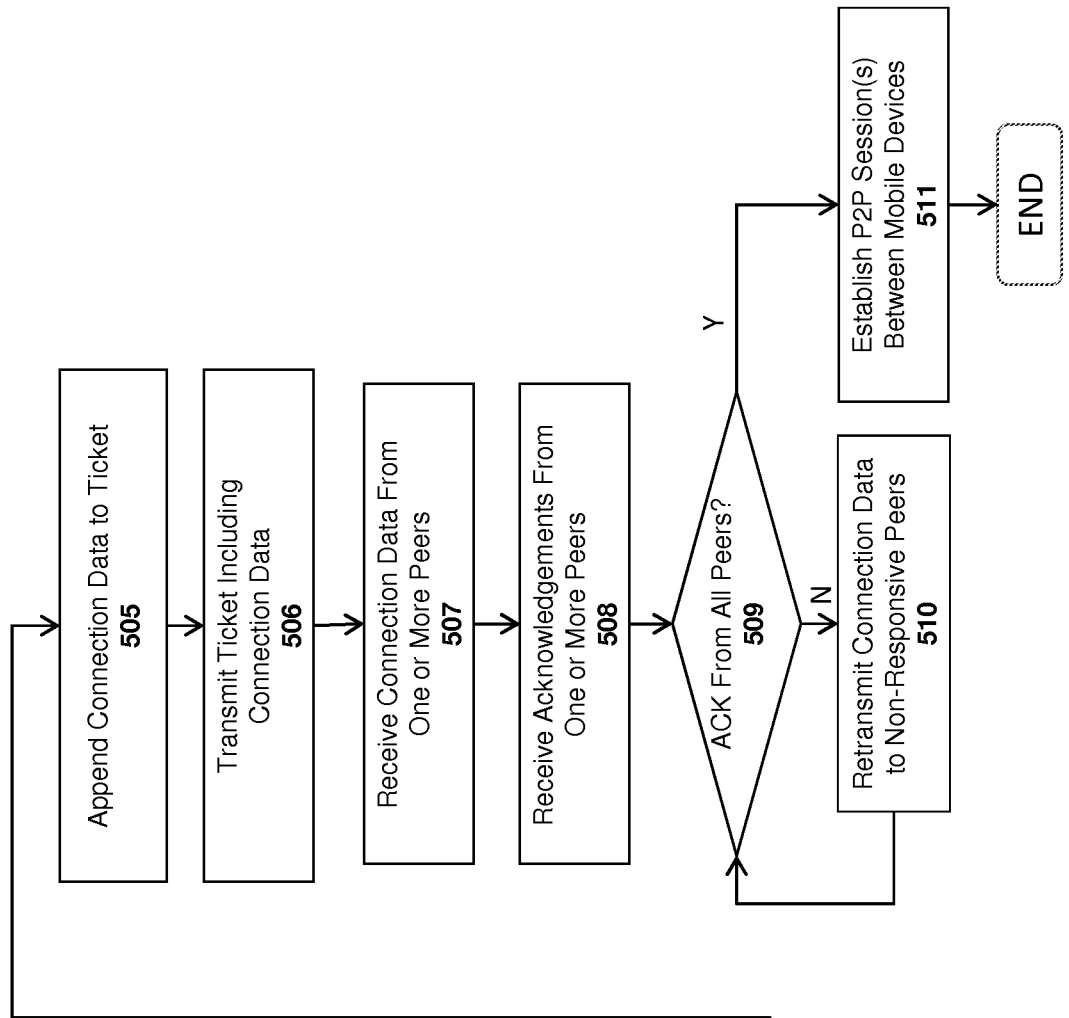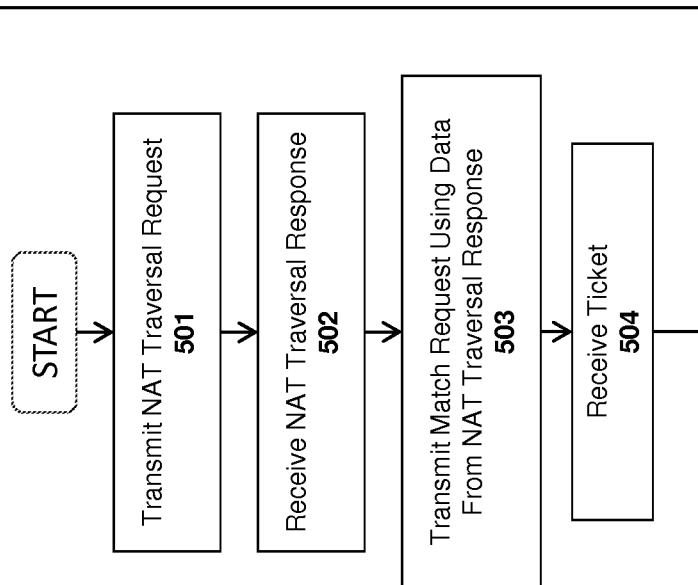
Fig. 5

NAT Compatibility Chart 1400

| A/B | Unknown | Full Cone | Port Restricted | Symmetric | Closed |
|---|---|---|---|---|---|
| Unknown | 0.0 | 1.0 | 0.0 | 0.0 | 0.0 |
| Full Cone | 1.0 | 1.0 | 1.0 | 1.0 | 0.0 |
| Port Restricted | 0.0 | 1.0 | 1.0 | 0.0 | 0.0 |
| Symmetric | 0.0 | 1.0 | 0.0 | 0.0 | 0.0 |
| Closed | 0.0 | 0.0 | 0.0 | 0.0 | 0.0 |

Request Table 1502

| RID | MSI | Request Data |
|-----|-----|--------------|
| A   | 1:1 | Request Data A |
|     |     |              |

MSI Table 1503

| MSI | Lease | MM ID |
|-----|-------|-------|
| 1:1 | N/A   | N/A   |
|     |       |       |

Fig. 17b

Request Table 1502

| RID | MSI | Request Data |
|-----|-----|--------------|
| A   | 1:1 | Request Data A |
| B   | 1:1 | Request Data B |

MSI Table 1503

| MSI | Lease | MM ID |
|-----|-------|-------|
| 1:1 | N/A   | N/A   |
|     |       |       |

Fig. 17c

Request Table 1502

| RID | MSI | Request Data |
|---|---|---|
| A | 1:1 | Request Data A |
| B | 1:1 | Request Data B |

MSI Table 1503

| MSI | Lease | MM ID |
|---|---|---|
| 1:1 | 5 sec | MM # N |

Fig. 17d

Request Table 1502

| RID | MSI | Request Data |
|---|---|---|
| A | Done | *Request Data B* |
| B | Done | *Request Data A* |

MSI Table 1503

| MSI | Lease | MM ID |
|---|---|---|
| 1:1 | 5 sec | MM # N |

SYSTEM AND METHOD FOR SECURE IDENTITY SERVICE

CLAIM TO PRIORITY

This application claims the benefit of the filing date under 35 U.S.C. §119(e), of U.S. Provisional Application No. 61/492,917, filed on Jun. 3, 2011.

BACKGROUND

1. Field of the Invention

This invention relates generally to the field of computer networking. More particularly, the invention relates to an improved apparatus and method for a secure identify service.

2. Description of Related Art

Peer-to-peer ("P2P") computing refers to a distributed network architecture comprised of computing nodes which make a portion of their resources directly available to other network participants. Peers in a P2P network establish direct communication channels with one another and act as both clients and servers, in contrast to the traditional client-server model in which servers supply resources and clients consume resources.

Many current P2P applications such as instant messaging and video chat do not provide adequate security measures to protect the underlying content transmitted between peers. Accordingly, improved techniques are needed for identifying peers and providing secure P2P transactions over a network.

SUMMARY

A system and method for securely processing identity information. For example, in one embodiment of the invention, a first user is registered on an identity service with one or more identification (ID) codes and a token. In response to a query from a second user to connect with the first user, a query signature is generated using the one or more ID codes and token of the first and second users, and a timestamp. The query signature is usable by network services to authenticate communication between the first and second users on the network over a specified period of time. In another embodiment, user ID codes and tokens are cached on mobile devices and/or a system cache to improve performance. The validity of the cached data is determined by calculating a fingerprint which, in one embodiment, is a hash of the ID code, token and a timestamp.

BRIEF DESCRIPTION OF THE DRAWINGS

A better understanding of the present invention can be obtained from the following detailed description in conjunction with the following drawings, in which:

FIG. 3 illustrates a one embodiment of a ticket data structure.

FIG. 5 illustrates one embodiment of a method implemented by a mobile device.

FIG. 14 illustrates one embodiment of a NAT compatibility chart for determining NAT compatibility.

FIGS. 17*a-d* illustrate an exemplary series of table updates performed to match users/devices.

DETAILED DESCRIPTION OF PREFERRED EMBODIMENTS

Described below are embodiments of an apparatus, method, and machine-readable medium for establishing, maintaining and utilizing primary and/or backup peer-to-peer ("P2P") communication channels on a network. An invitation service and a matchmaker service are also described for inviting users and matching users, respectively, for P2P sessions. Additionally, a relay service is described to allow users to establish relay connections under certain specified conditions. Finally, an application framework and associated application programming interface (API) are described to allow application developers to design applications which take advantage of various collaborative online features described herein.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Figure 1:
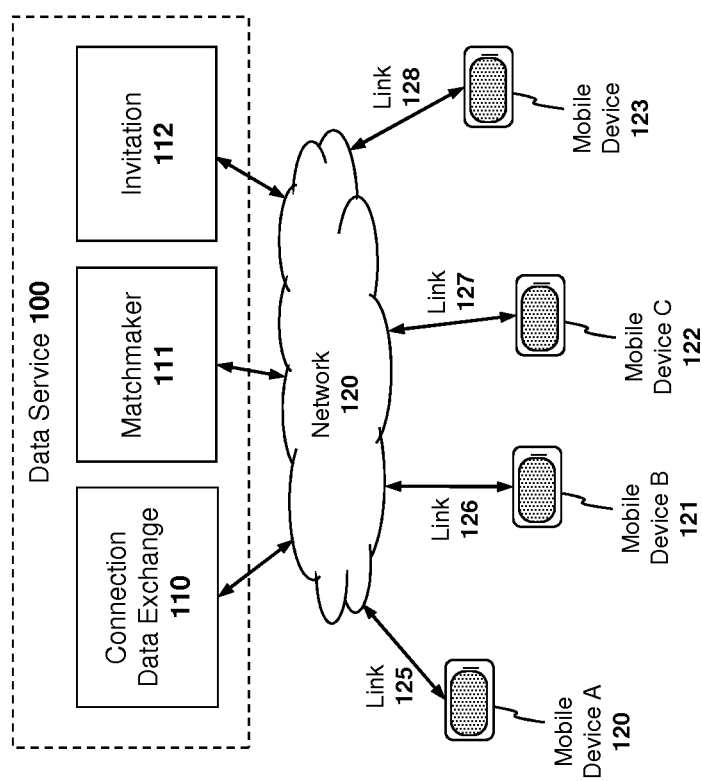
FIG. 1 illustrates a network architecture in which a group of mobile devices and services communicate over a network.

Apparatus and Method for Efficiently and Securely Exchanging Connection Data As illustrated in FIG. 1, a general network topology implemented in one embodiment of the invention can include a group of "client" or "peer" mobile computing devices A-D, 120-123, respectively, communicating with one another and with one or more services 110-112 over a network 120. Although illustrated as a single network cloud in FIG. 1, the "network" 120 can include a variety of different components including public networks such as the Internet and private networks such as local Wi-Fi networks (e.g., 802.11n home wireless networks or wireless hotspots), local area Ethernet networks, cellular data networks (e.g., 3G, Edge, etc), and WiMAX networks, to name a few. For example, mobile device A 120 may be connected to a home Wi-Fi network represented by network link 125, mobile device B 121 may be connected to a 3G network (e.g., Universal Mobile Telecommunications System ("UMTS"), High-Speed Uplink Packet Access ("HSUPA"), etc) represented by network link 126, mobile device C 122 may be connected to a WiMAX network represented by network link 127, and mobile device 123 may be connected to a public Wi-Fi network represented by network link 128. Each of the local network links 125-128 over which the mobile devices 120-123 are connected may be coupled to a public network such as the Internet through a gateway and/or NAT device (not shown in FIG. 1), thereby enabling communication between the various mobile devices 120-123 over the public network. However, if two mobile devices are on the same local or private network (e.g., the same Wi-Fi network), then the two devices may communicate directly over that local/private network, bypassing the public network. It should be noted, of course, that the underlying principles of the invention are not limited to any particular set of network types or network topologies.

Each of the mobile devices 120-123 illustrated in FIG. 1 can communicate with a connection data exchange (CDX) service 110, a matchmaker service 111, and an invitation service 112. In one embodiment, the services 110-112 can be implemented as software executed across one or more physical computing devices such as servers. As shown in FIG. 1, in one embodiment, the services 110-112 may be implemented within the context of a larger data service 100 managed by the same entity (e.g., the same data service provider) and accessible by each of the mobile devices 120-123 over the network 120. The data service 100 can include a local area network (e.g., an Ethernet-based LAN) connecting various types of servers and databases. The data service 100 may also include one or more storage area networks ("SANs") for storing data. In one embodiment, the databases store and manage data related to each of the mobile devices 120-123 and the users of those devices (e.g., user account data, device account data, user application data, . . . etc.).

In one embodiment, matchmaker service 111 can match two or more mobile devices for a collaborative P2P session based on a specified set of conditions. For example, users of two or more of the mobile devices may be interested in playing a particular multi-player game. In such a case, the matchmaker service 111 may identify a group of mobile devices to participate in the game based on variables such as each user's level of expertise, the age of each of the users, the timing of the match requests, the particular game for which a match is requested and various game-specific variables. By way of example, and not limitation, the matchmaker service 111 may attempt to match users with similar levels of expertise at playing a particular game. Additionally, adults may be matched with other adults and children may be matched with other children. Moreover, the matchmaker service 111 may prioritize user requests based on the order in which those requests are received. The underlying principles of the invention are not limited to any particular set of matching criteria or any particular type of P2P application.

As described in detail below, in response to a match request, the matchmaker service 111 can coordinate with the CDX service 110 to ensure that all matched participants receive the necessary connection data for establishing P2P sessions in an efficient and secure manner.

In one embodiment, the invitation service 112 also identifies mobile devices for participation in collaborative P2P sessions. However, in the case of the invitation service 112, at least one of the participants is specifically identified by another participant. For example, the user of mobile device A 120 may specifically request a collaborative session with the user of mobile device B 121 (e.g., identifying mobile device B with a user ID or phone number). As with the matchmaker service 111, in response to an invitation request, the invitation service 112 can identify the set of participants and coordinate with the CDX service 110 to ensure that all participants receive the necessary connection data for establishing P2P sessions in an efficient and secure manner.

As mentioned above, in one embodiment, the CDX service 110 operates as a central exchange point for connection data required to establish P2P sessions between two or more mobile devices. Specifically, one embodiment of the CDX service generates NAT traversal data (sometimes referred to as "Hole Punch" data) in response to mobile device requests to enable external services and clients to communicate through the NAT of each mobile device (i.e., to "punch a hole" through the NAT to reach the device). For example, in one embodiment, the CDX service detects the external IP address and port needed to communicate with the mobile device and provides this information to the mobile device. In one embodiment, the CDX service also receives and processes lists of mobile devices generated by the matchmaker service 111 and invitation service 112 and efficiently and securely distributes connection data to each of the mobile devices included on the lists (as described in detail below).

In one embodiment, communication between the mobile devices and the CDX service 110 is established using a relatively lightweight network protocol such as User Datagram Protocol ("UDP") sockets. As is known by those of skill in the art, UDP socket connections do not require hand-shaking dialogues for guaranteeing packet reliability, ordering, or data integrity and, therefore, do not consume as much packet processing overhead as TCP socket connections. Consequently, UDP's lightweight, stateless nature is useful for servers that answer small queries from a vast number of clients. Moreover, unlike TCP, UDP is compatible with packet broadcasting (in which packets are sent to all devices on a local network) and multicasting (in which packets are sent to a subset of devices on the local network). As described below, even though UDP may be used, security can be maintained on the CDX service 110 by encrypting NAT traversal data using session keys.

In contrast to the low-overhead, lightweight network protocol used by the CDX service 110, in one embodiment, communication between the mobile devices 120-123 and the matchmaker service 111 and/or invitation service 112 is established with an inherently secure network protocol such as Hypertext Transfer Protocol Secure ("HTTPS"), which relies on Secure Sockets Layer ("SSL") or Transport Layer Security ("TLS") connections. Details associated with these protocols are well known by those of skill in the art.

Figure 2A:
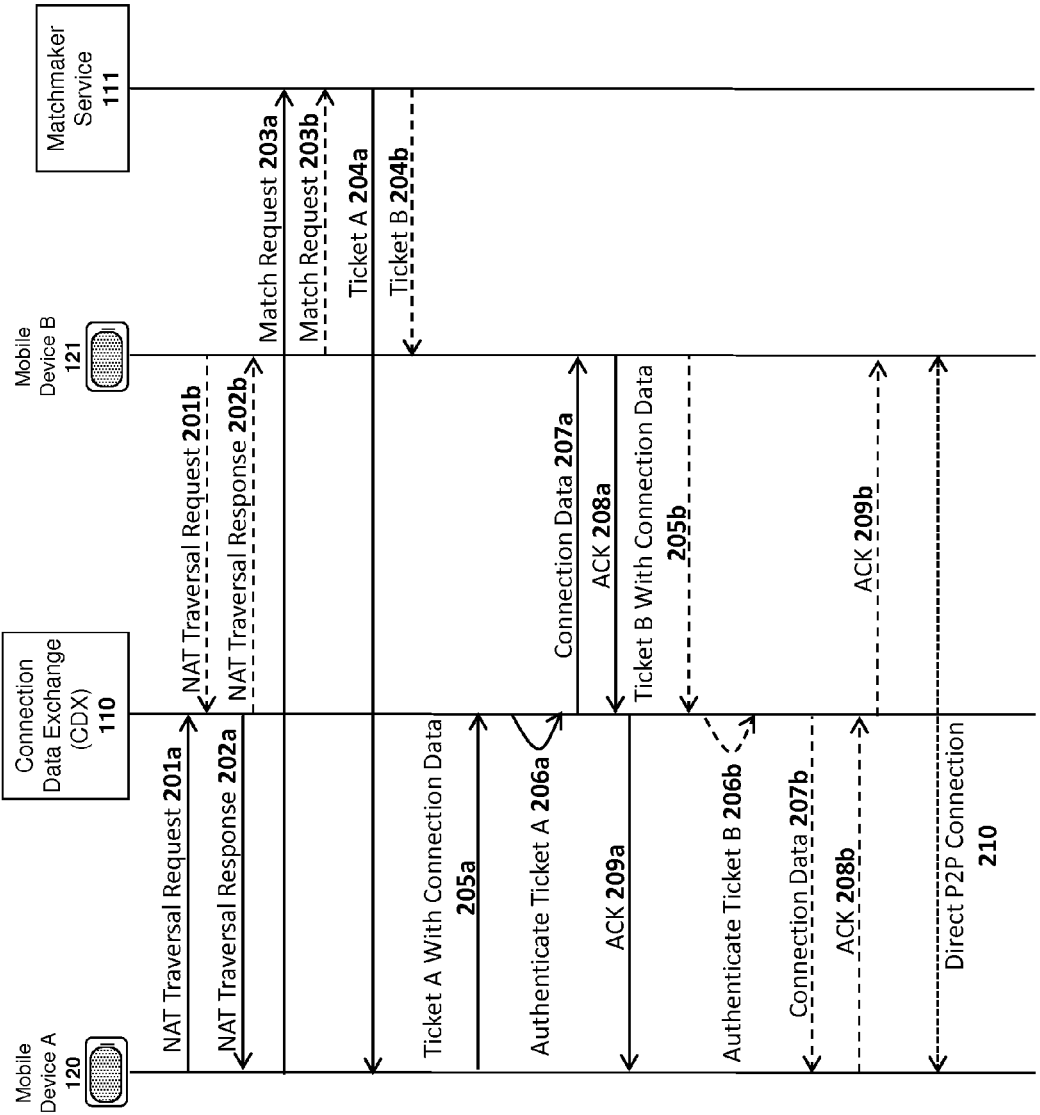
FIGS. 2*a-c* illustrate transactions between one embodiment of a connection data exchange (CDX) service, a matchmaker service and/or an invitation service.

FIG. 2a illustrates an exemplary series of transactions which can be implemented by a CDX server. When describing the operation of one embodiment of the CDX service, the following terms shall have the following meanings:

Connection Data—This is the information which potential peers need to exchange with each other to establish a Peer-To-Peer Session. Described below are embodiments of a mechanism for how this information can be exchanged.

CDX Server—A CDX Server in one embodiment is an authenticated multicast reflector which allows authorized entities to exchange arbitrary data. This data is referred to as the Payload.

CDX Session—A CDX Session refers to a group of client devices which can communicate with each other via the CDX Server. Each client device which is a part of the session is assigned a CDX Ticket. Each session has a unique CDX Session ID, which is a large integer which can be used to identify or refer to an individual session.

CDX Request—A request that is sent from a client device to the CDX Server. A request generally consists of two parts: a CDX Ticket and the Payload. In this embodiment, the payload is Connection Data encrypted with the Session Key.

CDX Response—A CDX Response is what is "reflected" back to the other devices in a CDX Session when the CDX Server receives a CDX Request from a member of the CDX Session. It is constructed by appending the Payload to the CDX Ticket Stub of the CDX Ticket used in the given CDX Request.

CDX Ticket—A CDX Ticket tells the CDX Server how to send a Payload to the members of the CDX Session. In one embodiment, it is "signed" with the CDX Ticket Key to prevent forgery or tampering. As illustrated in FIG. 3, in one embodiment, a CDX Ticket contains the following information:

The Session ID 301 which is not encrypted or obfuscated in one embodiment.

The number of participants 302 in the session which is not encrypted or obfuscated in one embodiment.

The index 303 of which participant in the session that this ticket refers to (not encrypted or obfuscated in one embodiment).

An expiration time/date 304, after which the ticket is considered invalid (not encrypted or obfuscated in one embodiment).

The CDX Hole-Punch Data 305-306 for each participant in the session, encrypted using the CDX Ticket Key in one embodiment.

A Message Authentication Code 307 using the CDX Ticket Key, which acts as a "Digital Signature" to ensure that the ticket is authentic.

CDX Ticket Stub—The first part of a CDX Ticket, minus the CDX Hole-Punch Data and the Message Authentication Code.

Payload—This is the second part of a CDX Request and a CDX Response. The payload is the data that a client device wishes to communicate to other devices in the CDX Session. In this embodiment, the payload is the Connection Data encrypted with the Session Key. The CDX Server does not decrypt the payload, in one embodiment, it simply passes it along unchanged.

Session Key—This is the key used by the clients to encrypt the Connection Data. In one embodiment, this key is not known to the CDX server. In this embodiment, the Session Key is generated by the matchmaking service and transmitted to the clients along with their individual CDX Tickets.

CDX Ticket Key—This is the key used to create and "sign" CDX Tickets. The CDX Ticket Key is known only by the CDX Server and the service which generates CDX Tickets—which, as described below, could be the matchmaking service and/or the invitation service.

CDX Hole-Punch Request—A special type of CDX Request which is used to obtain the CDX Hole-Punch Data from the CDX Server.

CDX Hole-Punch Data—This is an opaque data blob that describes how the CDX Server can send information to the client which originally requested it. It is obtained by sending a CDX Hole-Punch Request to the CDX Server. CDX Hole-Punch Data must be collected from each client device in the CDX Session before CDX Tickets can be generated. The CDX Hole-Punch data (sometimes referred to as "NAT traversal data") may include the public IP address and port of a requesting device.

Turning now to FIG. 2a, in one embodiment, the mobile device A 120 and mobile device B 121 can be executing a collaborative application such as a multi-player game or a collaborative chat session which requires a P2P connection with one or more other computing devices. At 201a, mobile device A 120 transmits a CDX Hole-Punch Request to the CDX Server 110. The CDX Server 110 then responds with the CDX Hole-Punch Data at 202a. In one embodiment, the hole punch data includes the public IP address and port of mobile device A and/or any other data needed to punch a hole through mobile device A's NAT (e.g., NAT type data defining mobile device A's NAT type). Similar transactions are performed for mobile device B at 201b and 202b, respectively.

At 203a and 203b, mobile devices A and B then send match requests including the CDX Hole-Punch Data to the Matchmaking Service, along with any additional matching criteria (described below). At this stage, mobile devices A and B may begin to construct the Connection Data needed to establish a P2P connection. This may be accomplished, for example, using a transaction such as a standard Internet Connectivity Establishment ("ICE") transaction (e.g., by a NAT traversal service). However, the underlying principles of the invention are not limited to any particular mechanism for determining connection data.

In one embodiment, once the matchmaking service 111 has found a set of client devices with matching criteria, it may generate a unique CDX Session ID, a unique CDX Ticket for each member of the CDX Session, and a unique Session Key. In one embodiment, the matchmaking service 111 may encrypt the CDX Hole-Punch Data for the CDX ticket using a unique CDX ticket key. At 204a and 204b, the Matchmaking service then may then send each of the mobile devices A and B their CDX Ticket and the Session Key.

Mobile device A receives the CDX Ticket and Session Key and encrypts its previously determined Connection Data using the Session Key, making a Payload. In one embodiment, mobile device A constructs a CDX Request by appending the constructed Payload to the CDX Ticket. At 205a, mobile device A sends the CDX Request to the CDX Server 110. Mobile device B could also performs the same operations and transmit a request to the CDX server at 205b.

At 206a, the CDX Server 110 receives the CDX Request, examines the ticket to ensure that it is valid and authentic (e.g., based on the message authentication code 307). If the CDX Ticket is invalid, the request is dropped. In one embodiment, the CDX Server then decrypts the CDX Hole-Punch Data set that is contained in the CDX Ticket using the CDX ticket key. In one embodiment, the CDX ticket key can include an expiration time/date which may also be transmitted with the tickets. The CDX service 110 and the matchmaker service 111 can store two (or more) different CDX ticket keys for encryption/decryption—a first which is currently active and a second which will become active upon reaching the expiration time/date of the first. Upon receiving a ticket, the CDX service 110 can read the expiration time/date to determine which ticket key to use. When a CDX ticket key has expired, both the CDX service 110 and the matchmaker service 111 can each generate a new ticket key (which will be the next key to be used after the current ticket key expires). In one embodiment, the CDX service 110 and matchmaker service 111 execute the same key generation algorithm to ensure consistency with the two ticket keys. For example, techniques such as those used for the well-known RSA SecurID authentication mechanism may be used in which a new authentication code is generated at fixed intervals. In one embodiment, a new CDX ticket key is generated on a daily basis. However, the underlying principles of the invention are not limited to any particular mechanism for generating CDX ticket keys.

The same operations could be performed as shown at 206b for mobile device B. The CDX Server constructs a CDX Response from the CDX Request and then uses the CDX Hole-Punch Data to send the CDX Response to the participants in the CDX Session (sending to mobile device B at 207a and to mobile device A at 207b).

Mobile device B receives the CDX Response 207a from the CDX Server. Client Device B examines the CDX Ticket Stub to ensure that the Session ID matches the Session ID of its own CDX Ticket. Mobile device B may then decrypt the Payload using the Session Key, yielding the Connection Data from Mobile device A. Mobile device B then uses the Connection Data from Mobile device A to begin the process of establishing the P2P session. In one embodiment, these involve standard ICE transactions. However, the underlying principles of the invention are not limited to any particular mechanism for establishing P2P communication.

As mentioned above, in one embodiment, mobile device A and B establish Hypertext Transfer Protocol Secure ("HTTPS") sessions to communicate with the matchmaker service 111 (e.g., using HTTPS request/response transactions) and establish UDP sockets to communicate with the CDX service. The match requests 204a, 204b can include the NAT type and the hole punch data (e.g., the public IP address and port) previously determined for each respective mobile device. In an embodiment which involves a multi-player game, each match request can identify the player on each mobile device (e.g., using a unique player ID code), the game that each user wishes to play, the number of players to participate in the game, and/or other game configuration variables associated with the desired game. By way of example, and not limitation, the game configuration variables associated with a game may include a level of difficulty (e.g., easy, normal, difficult), a user's age (e.g., "under 13"), a sub-region of the game (e.g., "level 2"), and/or a level of player expertise (e.g., expert, beginner, intermediate). As described in detail below, these variables are sometimes referred to as a game "bucket" and are identified using a unique "bucket ID." Each game may include different sets of bucket IDs to identify different game configuration variables.

In one embodiment, mobile device B sends and acknowledgement at 208a and 209a. Similarly, mobile device A's acknowledgement is transmitted at 208b and 209b. If mobile device A's or B's acknowledgements are not received after a specified period of time, then the connection data 207a may be resent to mobile device B 212. Either the CDX service 110 may initiate the retry and/or mobile device A 120 may initiate the retry.

Figure 2B:
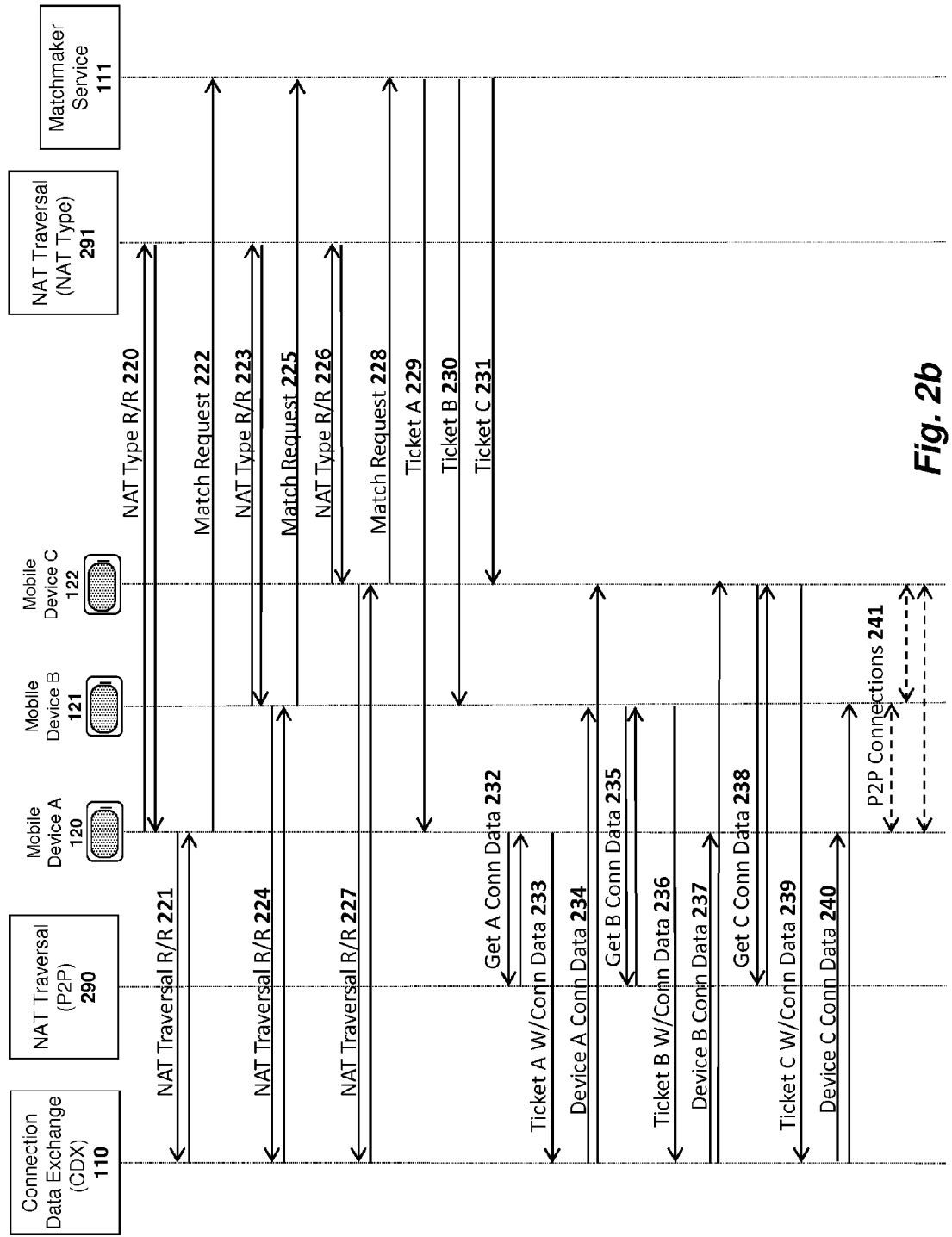

FIG. 2b illustrates a more detailed example in which three different mobile devices 120-122 negotiate for P2P connections using the CDX service and matchmaker service 111. FIG. 2b also illustrates two additional services used by the mobile devices 120-122 to establish a connection: a NAT traversal service 291 for determining NAT type and a NAT traversal service 290 for determining the full connection data for each mobile device (e.g., utilizing an ICE connection data transaction). It should be noted, however, that separate services are not required to comply with the underlying principles of the invention. For example, in an alternate embodiment, the NAT traversal functions performed by each of these services 290-291 may be integrated directly within the CDX service 110 and/or matchmaker service 111. Similarly, the functions performed by the both NAT traversal services 290-291 may be integrated within a single NAT traversal service. In summary, the specific functional separation shown in FIG. 2b is not required for complying with the underlying principles of the invention.

Turning now to the specific details of FIG. 2b, at 220, mobile device A transmits a NAT type request to the NAT traversal service 291. In response, the NAT traversal service 291 may use various known techniques including implementing a series of transactions to determine the NAT type used by mobile device A. For example, the NAT traversal service 291 may attempt to open different IP addresses and ports on mobile device A's NAT and communicate with mobile device A through those ports using different IP/port combinations. In this manner, the NAT employed by mobile device A may be classified as one of the NAT types described above (e.g., full cone, restricted cone, port restricted cone, symmetric) or an alternative NAT type. This information may then be provided to mobile device A 120 as illustrated.

At 221, mobile device A 120 initiates a NAT traversal request with the CDX service 110. In response, the CDX service 110 can read the public IP address and public port number used for the request and transmits this information back to mobile device A 120. As described above, if a device is behind a NAT, its public port and IP address will be different from its private port and IP address, respectively. Thus, depending on the type of NAT being used, the public IP address and port may be used to "punch a hole" through the NAT device to reach the mobile device.

At 222, mobile device A 120 transmits a match request 222 to the matchmaker service 111. As described above, in one embodiment, mobile device A communicates to the matchmaker service 111 using Hypertext Transfer Protocol Secure ("HTTPS") sessions (e.g., using HTTPS request/response transactions). The match request can include the NAT type and the hole punch data (e.g., the public IP address and port) previously determined for mobile device A 120. In an embodiment which involves a multi-player game, the match request can identify the player on mobile device A (e.g., using a unique player ID code), the game that the user wishes to play, the number of players to participate in the game, and/or other game configuration variables associated with the desired game (as previously described with respect to FIG. 2a).

At 223-225 a set of transactions corresponding to transactions 220-222 are performed for mobile device B 121 and at 226-228 a set of transactions corresponding to transactions 220-222 are performed for mobile device C 122. Thus, following transaction 228, the matchmaker service 111 has received match requests for all three of the mobile devices 120-122. In this specific example, the match requests result in mobile devices 120-122 being matched for a particular collaborative session such as a multi-player game (e.g., the users of these mobile devices may have selected the same game with the same, or similar, sets of variables, thereby resulting in a match by the matchmaker service 111).

The matchmaker service 111 uses the data contained in each of the match requests to generate Ticket A, which it transmits to mobile device A at 229; Ticket B, which it transmits to mobile device B at 230; and Ticket C, which it transmits to mobile device C at 231. Although not shown in FIG. 2b, the matchmaker service 111 may utilize a push notification service to push Tickets A, B and C to mobile devices A, B, and C, respectively (e.g., such as the push notification service 1050 illustrated FIGS. 11-12). One embodiment of the ticket data structure used for tickets A, B, and C is described above with respect to FIG. 3.

At 232, mobile device A 120 communicates with NAT traversal service 290 to determine its own connection data. In one embodiment, this can include a standard ICE connection data transaction. As previously mentioned, the connection data may include public/private IP address, port and NAT type for mobile device A 120.

Mobile device A 120 appends its connection data to Ticket A and, at 233, transmits Ticket A with the connection data to the CDX service 110. In one embodiment, the CDX service 110 processes Ticket A as described above and, at 234, transmits the connection data (which may be encrypted) to mobile device B 121 and mobile device C 122. For these transactions, the CDX service 110 can utilize the NAT traversal data for mobile devices B and C included with Ticket A.

At 236-238, a set of transactions corresponding to transactions 232-234 are performed using Ticket B and at 238-240 a set of transactions corresponding to transactions 232-234 are performed for Ticket C. Thus, following transaction 240, connection data has been shared between each of the mobile devices 120-122. Using the connection data, P2P sessions are established between mobile devices A and B, mobile devices A and C, and mobile devices A and C.

Figure 2C:
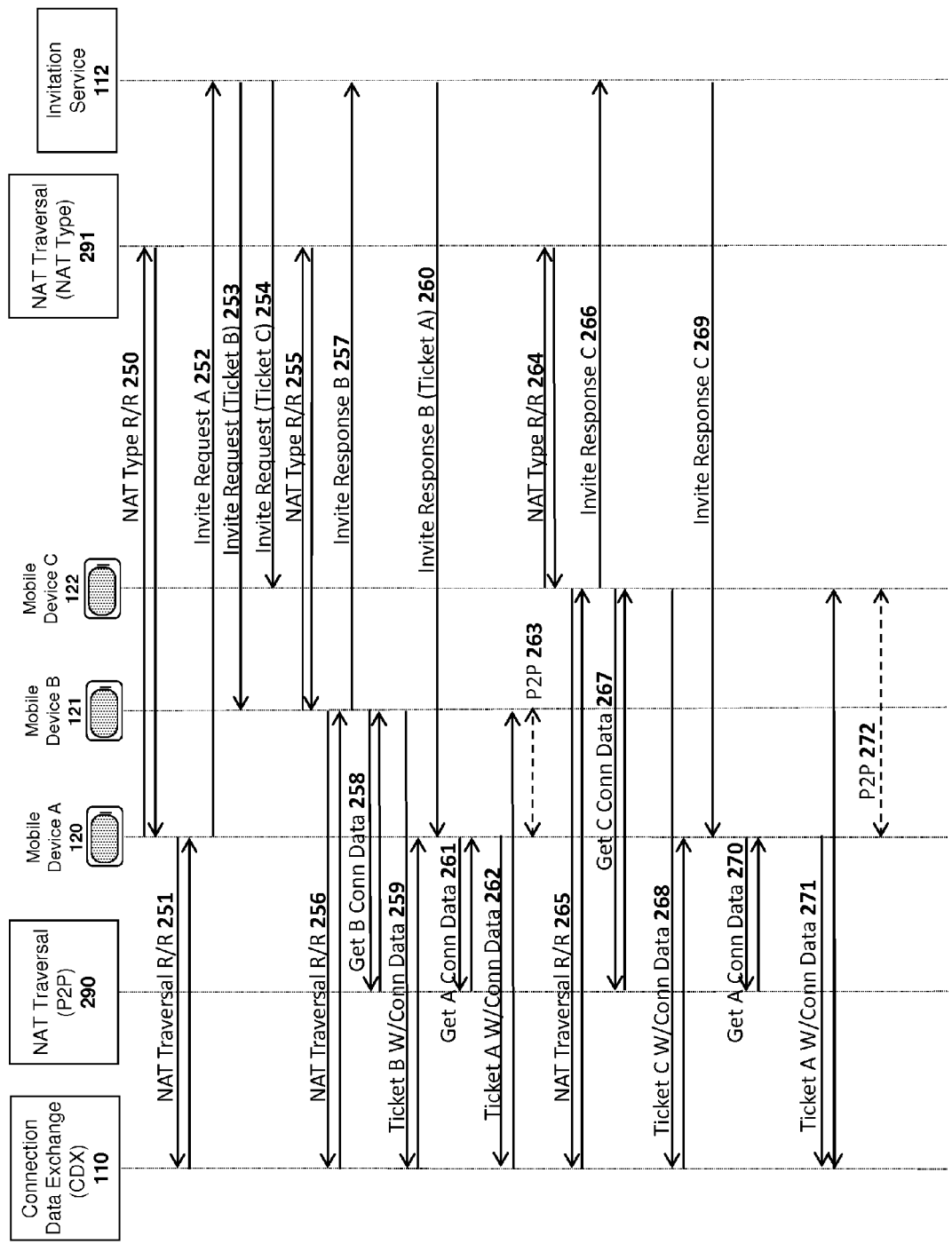

As illustrated in FIG. 2c, an invitation service 112 can also be used with the CDX service 110 (either in lieu of or in addition to the matchmaker service 111). In one embodiment, the invitation service 112 processes invitation requests for P2P connections with specific mobile devices and/or users. The invitation service 112 can be implemented as a stateless service (i.e., a service which does not tack the current state of transactions between each of the wireless devices).

Turning to this particular example, at 250, mobile device A 120 transmits a NAT type request to the NAT traversal service 291. In response, the NAT traversal service 291 may use various known techniques for determining the NAT type used by mobile device A (some of which are described above). At 251, mobile device A 120 initiates a NAT traversal request with the CDX service 110. In response, the CDX service 110 can read the public IP address and public port number used for the request and transmits this information back to mobile device A 120. As described above, if a device is behind a NAT, its public port and IP address will be different from its private port and IP address, respectively. Thus, depending on the type of NAT being used, the public IP address and port may be used to "punch a hole" through the NAT device to reach the mobile device.

As with the matchmaker service, in one embodiment, each of the mobile devices communicate with the invitation service 112 using Hypertext Transfer Protocol Secure ("HTTPS") sessions (e.g., using HTTPS request/response transactions).

At 252, mobile device A 120 transmits an invitation request to the invitation service 112 which includes mobile device A's NAT traversal data (e.g., NAT type, public IP address/port). In an embodiment which utilizes a push notification service (described in greater detail below), the invitation request may also include mobile device A's push token. The invitation request 252 can also include an identification code identifying one or more other users/devices—in this case the users of mobile devices B 121 and C 122. Various different identification code types may be used. For example, in the case of a multi-player game, the identification codes may comprise game-specific player ID codes. In the case of an audio/video chat session, the identification codes may comprise phone numbers or unique ID codes identifying one or more users from the user of mobile device A's "buddy" list.

In one embodiment, the invitation service 112 reads the identification codes from the invitation request and performs a lookup in a registration database (not shown) to locate each of the mobile devices B and C. In one particular embodiment, each of the mobile devices B and C has previously registered with a push service to receive push notifications from the invitation service 112. As such, in this embodiment, the invitation service 112 uses the push notification service to push the invitation requests to mobile device B 121 and mobile device C 122 at 253 and 254, respectively. Additional details related to a push notification service are described below (see, e.g., FIGS. 11-12 and associated text) and in the Push Notification Application referenced above.

In one embodiment, the invitation requests 253 and 254 include the ticket data structure illustrated in FIG. 3 and described above with respect to FIGS. 2a-b. Specifically, the ticket sent to mobile device B includes an encrypted list identifying mobile devices A and B and the ticket sent to mobile device C includes an encrypted list identifying mobile devices A and C. In one embodiment, because the invitation service 112 may not yet have mobile device B's NAT traversal data, the "ticket" at 253 may include other information identifying mobile device B. For example, as set forth below with respect to embodiments which utilize the relay service and push notification service (see, e.g., FIGS. 11-12), the "ticket" at 253 may include the NAT traversal data for mobile device A, device A's ID code, device A's push token, device B's ID code, and the push token for mobile device B. The same types of information may be provided at 254 for mobile devices A and C.

At 255, mobile device B may communicate with NAT traversal service 291 to determine its NAT type and, at 256, mobile device B may communicate with the CDX service 110 to determine its NAT traversal data (e.g., public IP address/port). At 257, mobile device B transmits an invitation response to the invitation service 112 containing mobile device A's and mobile device B's identification code, NAT traversal data and, if the push notification service is used, push tokens for mobile devices A and B. At 258, mobile device B can retrieve its current connection data by communicating with NAT traversal service 290. At 259, mobile device B transmits its ticket (Ticket B) with its current connection data to the CDX service 110. In response, the CDX service 110 processes the ticket as described above and forwards the connection data to mobile device A 120.

Upon receipt of mobile device B's invitation response, the invitation service 112 can generate an encrypted ticket for mobile device A and transmit the ticket to mobile device A at 260. In one embodiment, the ticket includes NAT traversal data, NAT type and push token (if the push notification service is used) for mobile devices A and B. The "tickets" described with respect to FIG. 2c may be the same or different from the data structures for "tickets" described with respect to the matchmaker service 111. For example, rather than generating an encrypted "ticket" as described above, the invitation service 112 may simply generate a unique session ID to identify the invitation session with each of the mobile devices.

At 261, mobile device A retrieves its current connection data by communicating with NAT traversal service 290. Mobile device A may then append its connection data to the ticket and, at 262, transmit the ticket with its connection data to the CDX service 110. The CDX service 110 processes the ticket as described above and forwards mobile device A's connection data to mobile device B. Finally, at 263, mobile devices A and B use the exchanged connection data to open a direct P2P connection. As described below, in cases where mobile device A's and B's NAT types are incompatible, a relay service may be used to enable communication between mobile devices A and B.

At 264-272, mobile device C 122 and mobile device A can execute a series of transactions to establish a P2P connection as described at 255-263 for mobile devices B and A. Specifically, at 624, mobile device C 122 communicates with NAT traversal service 291 to determine its NAT type and, at 265, communicates with the CDX service 110 to determine its NAT traversal data (e.g., public IP address/port). At 266, mobile device C transmits an invitation response containing mobile device C's and mobile device A's NAT type, NAT traversal data and push token (if the push notification service is used). At 267, mobile device C retrieves its current connection data through the NAT traversal P2P service 290 and, at 268, mobile device C appends its connection data to Ticket C and transmits Ticket C to the CDX service 110. The CDX service 110 processes the ticket as described above and forwards mobile device C's connection data to mobile device A 120.

At 269, mobile device A 120 receives mobile device C's invitation response from the invitation service 112 which includes both mobile device A's and C's NAT type, NAT traversal data and push tokens (if the push service is used). At 270, mobile device A retrieves its current connection data from the NAT traversal service 290, appends its current connection data to Ticket A and, at 271, transmits Ticket A to the CDX service 110. Alternatively, transaction 270 may not be required because mobile device determined its connection data at transaction 261. The CDX service 110 processes Ticket A as described above and forwards mobile device A's connection data to mobile device C. Finally, at 272, mobile device A and C use the exchanged connection data to establish a direct, P2P connection 272.

In one embodiment, the invitation service 112 and the matchmaker service 111 can rely on a push notification service (not shown) for pushing data to mobile devices. For example, in FIG. 2c, invitation requests 253 and 254 may be pushed to the mobile devices B 121 and C 122 via the push notification service. Similarly, in FIG. 2a, tickets A and B may be pushed to mobile devices A 120 and B 121. In one embodiment, when a mobile device is activated on the network, it registers its push token in a central registration directory accessible by the push notification service. In one embodiment, the registration directory associates a password protected user ID or a telephone number with a push token. If the push token can be identified in the directory, the push notification service can use the push token to transmit push notifications to the mobile device. In one embodiment, the push notification service is the Apple Push Notification Service ("APNS") designed by the assignee of the present application and described, for example, in the Push Notification Application referenced above. It should be noted however, that a push notification service is not required by the embodiments of the invention shown in FIGS. 2a-c. For example, push notifications are not required for the CDX service 110 to perform its operations as described herein.

Figure 4:
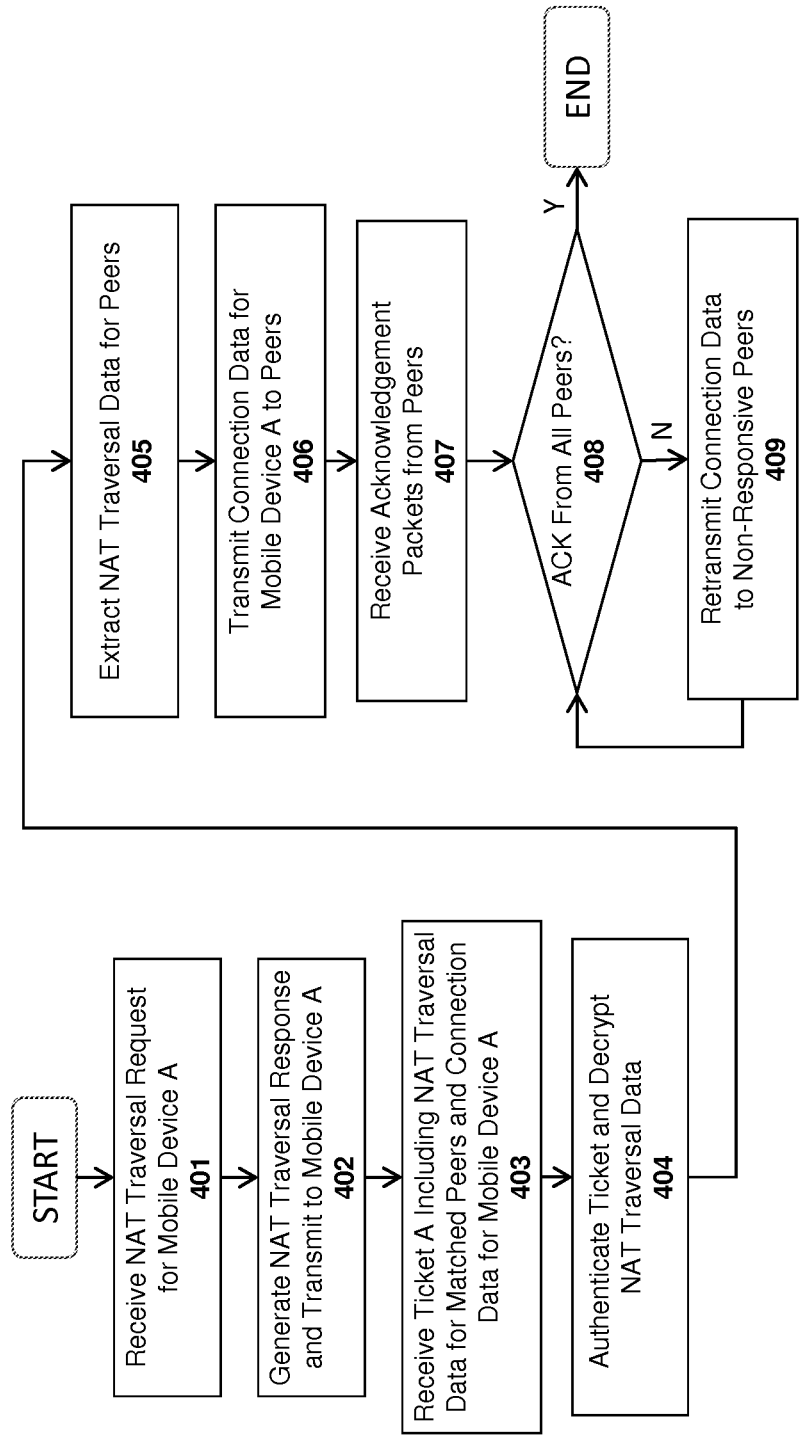
FIG. 4 illustrates one embodiment of a method implemented by a CDX service.

FIG. 4 illustrates a method which can be implemented by a CDX service 110 to exchange connection data and FIG. 5 illustrates a method which may be implemented by a mobile device to exchange connection data and establish a P2P connection. Certain aspects of these methods have already been described above with respect to FIGS. 1-2c. In particular, these methods may be implemented within the context of the network architecture shown in FIGS. 1-2c but they are not limited to such an architecture. In one embodiment, the methods are embodied in program code which, when executed by a processor, causes the operations of the methods to be performed. The program code may be stored in a machine-readable medium such as a random access memory ("RAM") while being executed by the processor. The processor may be a general purpose processor (e.g., an Intel® Core™ processor) or a special purpose processor. However, the methods may be implemented using any combination of hardware, software, and firmware. In addition, the program code may be stored on a non-volatile storage device such as a hard disk drive, optical disc (e.g., a Digital Video Disk or Compact Disc) or a non-volatile memory such as Flash memory device.

Turning now to the method shown in FIG. 4, at 401, a NAT traversal request (also sometimes referred to as a "hole punch" request) is received for a particular mobile device— "mobile device A" in the example. At 402, a NAT traversal response is generated and transmitted to mobile device A. In one embodiment, generating the NAT traversal response can include determining the current public IP address/port and/or NAT type of mobile device A.

A ticket for mobile device A may subsequently be generated and encrypted by a ticket-generation entity such as the matchmaker service 111 or invitation service 112 described above. At 403, the ticket generated for mobile device A ("Ticket A") is received which includes NAT traversal data (for device A and one or more other devices) and connection data for device A. At 404, the ticket is authenticated using the message authentication code and the hole punch data is decrypted using the same CDX ticket key as that used by the ticket-generation entity to encrypt the ticket. As mentioned above, in one embodiment, the correct CDX ticket key is identified using an expiration time/date associated with the CDX ticket key.

At 405, the NAT traversal data for the mobile devices is extracted. At 406, the connection data for mobile device A is transmitted to each of the peers using the NAT traversal data. At 407 acknowledgements are received from each of the peers. If acknowledgements have not been received from all of the peers, determined at 408, then mobile device A's connection data is retransmitted to those peers which have not responded at 409. When all of the connection data has been acknowledged, determined at 408, the method terminates.

In one embodiment, the method shown in FIG. 4 can be performed for each of the peers involved in the P2P transaction to ensure that each peer receives the connection data required to establish a P2P connection.

FIG. 5 illustrates a method which can be performed by a mobile device in accordance with the embodiments of the invention described herein. At 501, a NAT traversal request is transmitted and, at 502, a NAT traversal response is received. As previously described, the NAT traversal data contained in the response may include the public port/IP address of the requesting device. At 503, a match request is transmitted which contains the NAT traversal data. A ticket for the mobile device may subsequently be generated and encrypted by a ticket-generation entity such as the matchmaker service 111 or invitation service 112 described above. As an alternative to the ticket data structure described above, the matchmaker service 111 and/or the invitation service 112 may simply identify each of the participants using a unique session ID.

At 504, the ticket may be received; at 505, connection data for the mobile device is appended to the ticket; and, at 506, the ticket with the connection data is transmitted. At 507, connection data needed to establish P2P connections with one or more other peers is received. At 508, acknowledgements indicating that one or more other wireless devices have received the connection data transmitted at 506 are received. If all acknowledgements are not received then, at 510, the connection data is retransmitted to those mobile devices from which acknowledgements have not been received. If all acknowledgements are received, determined at 509, then the connection data received at 507 is used to establish P2P sessions with the other mobile devices.

Apparatus and Method for Establishing and Utilizing Backup Communication Channels Current mobile devices are capable of communicating over a variety of different communication channels. For example, the Apple iPhone™ is capable of communicating over Wi-Fi networks (e.g., 802.11b, g, n networks); 3G networks (e.g., Universal Mobile Telecommunications System ("UMTS") networks, High-Speed Uplink Packet Access ("HSUPA") networks, etc); and Bluetooth networks (known as personal area networks ("PANs")). Future mobile devices will be capable of communicating over additional communication channels such as WiMAX, International Mobile Telecommunication ("IMT") Advanced, and Long Term Evolution ("LTE") Advanced, to name a few.

In operation, current mobile devices select one primary communication channel from among a set of available channels. For example, mobile devices are often configured to choose a Wi-Fi connection if one is available and to choose a cellular data connection (e.g., a UTMS connection) if Wi-Fi is not available.

In one embodiment of the invention, a group of mobile devices initially establish primary peer-to-peer ("P2P") communication channels using standard ICE connection data exchanges and/or using the connection data exchange techniques described above. The mobile devices may then exchange connection data over the primary channels to establish one or more secondary communication channels which are used as backup channels if any of the primary channels fail. In one embodiment, the secondary communication channels are maintained open through NAT firewalls by periodically transmitting "heartbeat" packets over these channels.

As used herein, a communication "channel" refers to the full network path between two mobile devices and a communication "link" refers to one particular connection used in the communication path. For example, if device A is connected to the Internet using a Wi-Fi connection and device B is connected to the Internet using a 3G connection, then the "channel" between device A and device B is defined by both the Wi-Fi link and the 3G link; device A has a Wi-Fi communication "link;" and device B has a 3 G communication "link." As such, if device A switches from a Wi-Fi link to a 3G link, then the "channel" between device A and device B is changed notwithstanding the fact that device B's 3G link remains the same.

Specific examples in which mobile devices establish primary and secondary communication channels will now be described with respect to FIG. 6. It should be noted, however, that the underlying principles of the invention are not limited to the particular set of communication links and communication channels shown in FIG. 6.

Figure 6:
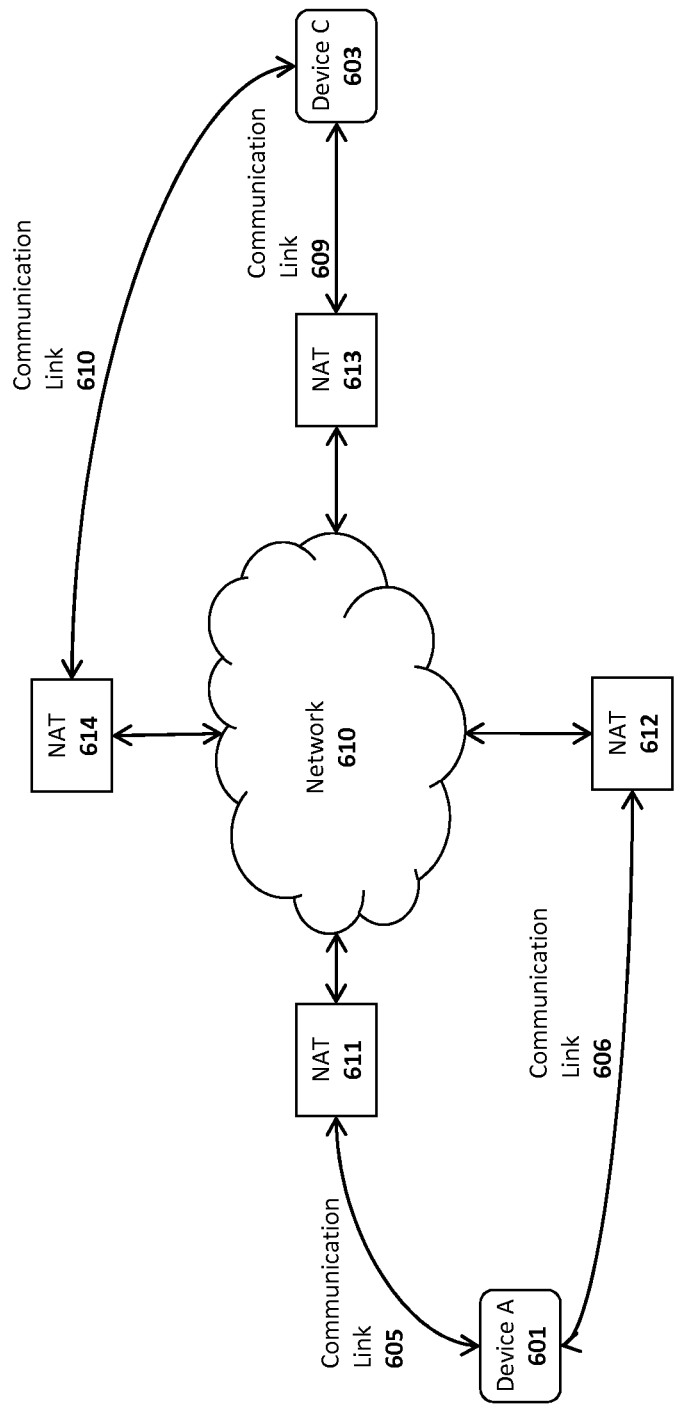
FIG. 6 illustrates a group of mobile devices connected through primary and secondary communication channels.

In FIG. 6, mobile device A 601 is capable of connecting to a network 610 (e.g., the Internet) over communication link 605 with NAT device 611 and over communication link 606 with NAT device 612. Similarly, device C 603 is capable of connecting to the network 610 over communication link 609 with NAT device 613 and over communication link 610 with NAT device 613. By way of example, and not limitation, communication links 605 and 609 may be 3 G communication links and communication links 606 and 610 may be Wi-Fi communication links.

Consequently, in this example, there are four different communication channels which may be established between mobile device A and mobile device B: a first channel which uses links 605 and 609; a second channel which uses links 605 and 610; a third channel which uses links 606 and 609; and a third channel which uses links 606 and 610. In one embodiment, mobile devices A and B will select one of these channels as the primary communication channel based on a prioritization scheme and will select the three remaining channels as backup communication channels. For example, one prioritization scheme may be to select the channel with the highest bandwidth as the primary channel and to use the remaining channels as the secondary channels. If two or more channels have comparable bandwidth, the prioritization scheme may include selecting the least expensive channel (assuming that the user pays a fee to use one or more of the channels). Alternatively, the prioritization scheme may be to select the least expensive channel as the primary channel and, if the cost of each channel is the same, to select the highest bandwidth channel. Various different prioritization schemes may be implemented while still complying with the underlying principles of the invention.

Mobile devices A 601 and C 603 may utilize the techniques described above to establish the primary communication channel (e.g., by exchanging connection data via the CDX service 110). Alternatively, the mobile devices 601, 603 may implement standard Internet Connectivity Establishment ("ICE") transactions to exchange the connection data. Regardless of how the primary channel is established, once it is, the mobile devices A 601 and C 603 may exchange connection data for the secondary communication channels over the primary communication channel. For example, if the primary communication channel in FIG. 6 includes communication link 606 and communication link 609, then this connection, once established may be used to exchange connection data for secondary communication channels which include communication links 605 and 609. In this example, the connection data exchanged over the primary communication channel may include NAT traversal data and NAT type data for NAT 611 and NAT 613, including public and private IP addresses/ports for each of the mobile devices.

Once the secondary communication channels have been established, they are maintained open using heartbeat packets. For example, device A may periodically transmit a small "heartbeat" packet to device C and/or device A may periodically transmit a small "heartbeat" packet to device C to ensure that the NAT ports used for the secondary channels remain open (NATs will often close ports due to inactivity). The heartbeat packets may be UDP packets with no payload, although the underlying principles of the invention are not limited to any particular packet format. The heartbeat packets may be UDP packets with a self-identifying type field in their payload header, and may contain optional additionally-formatted information including but not limited to a channel time-to-live value.

Figure 7:
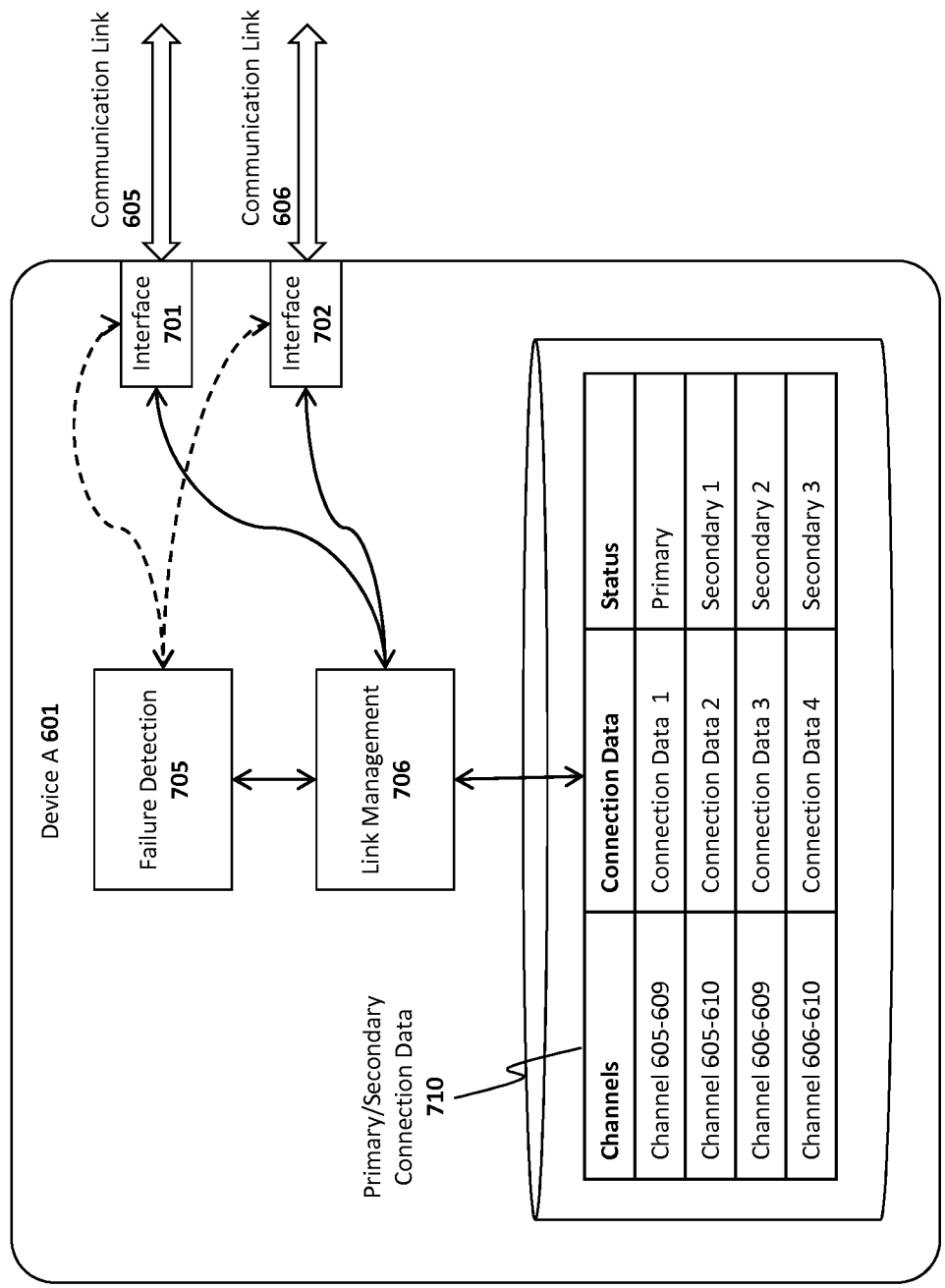
FIG. 7 illustrates one embodiment of a mobile device for selecting among primary and secondary communication channels

As illustrated in FIG. 7, each mobile device 601 stores and maintains a data structure 710 (e.g., a table, text file, database, etc) containing a list of primary and secondary communication channels. A separate entry is provided for each communication channel and includes the connection data needed to utilize that channel (e.g., private/public IP address, NAT type, etc), and the current status of that channel (e.g., primary, secondary 1, secondary 2, etc).

In one embodiment, communication interfaces 701 and 702 are used for communicating over communication link 605 and communication link 606, respectively. A failure detection module 705 can be executed on the mobile device 601 to detect when a particular communication interface/link has failed or has degraded below a specified threshold. In response, a link management module 706 can read the primary/secondary connection data 710 to promote a secondary channel having the next highest priority to the primary channel. The prioritization of the secondary channels may be accomplished using the same principles as those discussed above for the primary channels (e.g., based on bandwidth, cost, reliability, etc). Once a secondary channel has been selected, the link management module 706 can transmit a link failure indication to link management modules on the other mobile devices, instructing those devices to promote the secondary communication channel to a primary communication channel. Those devices will then begin using the connection data associated with the selected primary channel.

In one embodiment, a complete "failure" of the primary communication channel is not required to force a switch to one of the secondary communication channels. For example, in one embodiment, if the primary communication channel is sufficiently degraded (e.g., below a particular bandwidth, bitrate, or reliability threshold), then a change to a secondary channel may be implemented as described herein. In one embodiment, the switch to the secondary channel is only performed if the secondary channel is capable of supporting better performance (e.g., bandwidth, bitrate or reliability) than the current primary channel.

Figure 8A:
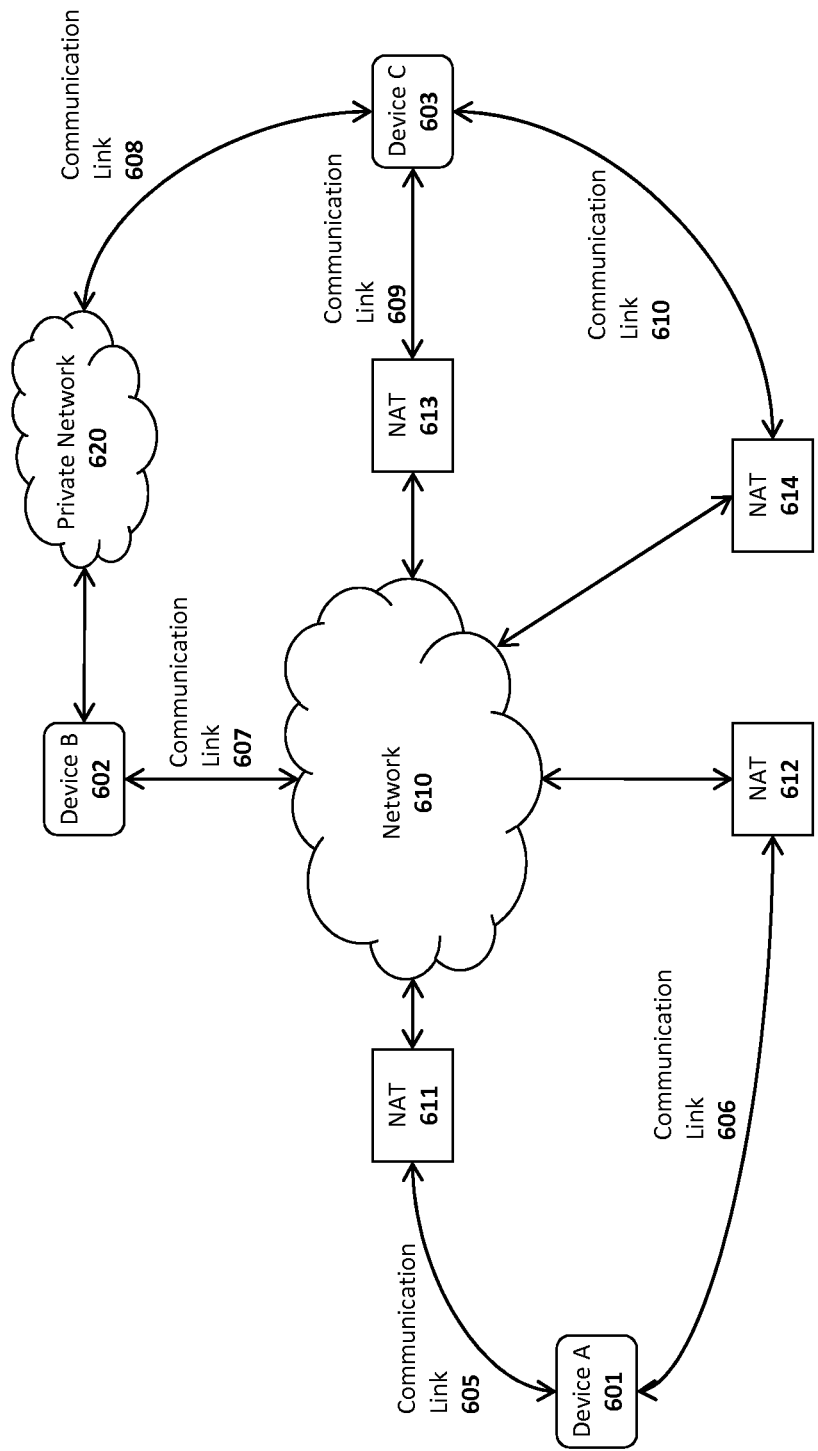
FIGS. 8*a-b* illustrate a group of mobile devices connected through primary and secondary communication channels and the resulting network topologies.
Figure 8B:
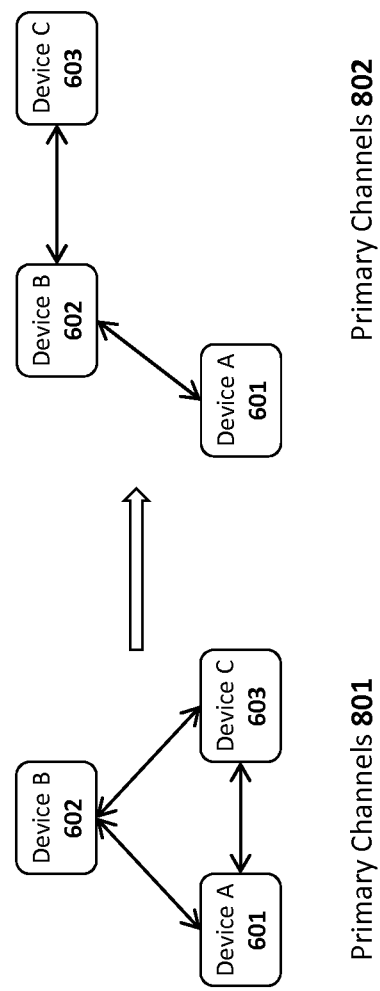
Figure 9:
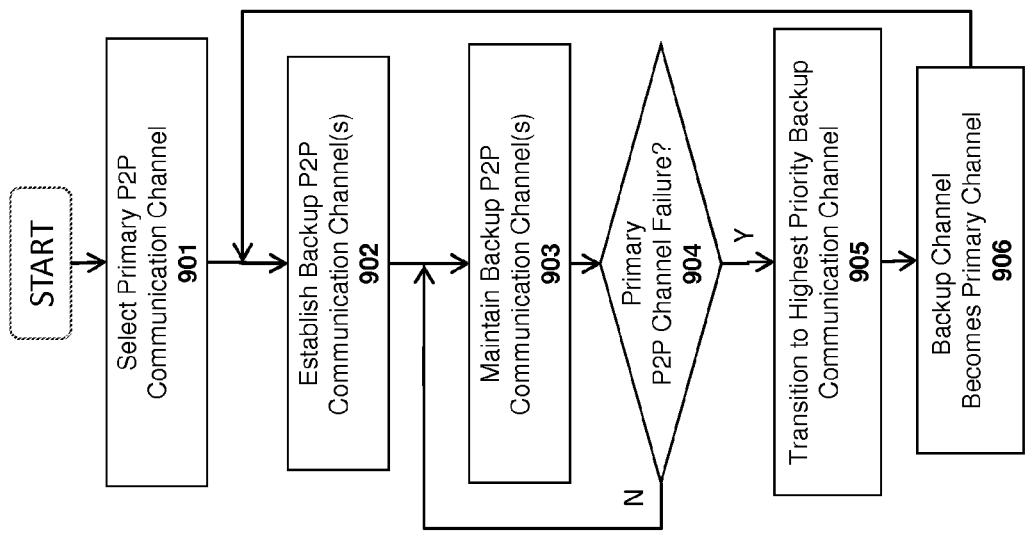
FIG. 9 illustrates one embodiment of a computer-implemented method for selecting between primary and secondary communication channels.

FIG. 8a illustrates the same network configuration as shown in FIG. 6 with the addition of mobile device B 602 connected directly to the network 610 and connected to device C 603 through a private network connection 620. The private network 620 may be, for example, a Bluetooth PAN connection between device B 602 and device C 603. It can be seen from this example that switching from a primary channel to a secondary channel may dramatically alter the network topology. For example, as shown in FIG. 8b, if the primary channels 801 for the mobile devices include communication link 609 (resulting in direct connections between device devices A, B and C) and the secondary channels include the private network 620, then the network topology may change as illustrated in FIG. 8c because the only way for device A and device C to communicate using the private network is through device B. While this is a simplified example with only three devices, a significantly larger number of devices may be used, resulting in a variety of different network topology configurations when switching between primary and secondary communication channels.

One embodiment of a method for establishing and maintaining secondary channels is illustrated in FIG. 8. In one embodiment, the method may be executed by the link management module 706 on each mobile device. However, the method is not limited to any particular device configuration.

At 901, a primary P2P communication channel is selected. As mentioned above, the primary channel may be selected based on a predefined prioritization scheme. For example, certain communication channel types may be prioritized ahead of other communication channel types. Channels may also be prioritized based on variables such as bandwidth, cost for usage, and/or reliability.

At 902, backup P2P communication channels are established. In one embodiment, this is accomplished by sharing connection data between all of the mobile devices over the primary communication channel. At 903, the backup channels are maintained. In one embodiment, this involves transmitting data periodically over the secondary communication channels (e.g., in the form of periodic heartbeat packets).

At 904, if the primary P2P channel fails (e.g., because the communication link of a particular mobile device went down or the mobile device moved out of range of the communication link), then at 905, the mobile devices promote the highest priority backup channel to the primary channel. In one embodiment, this involves the mobile device with the failed link transmitting a notification of its link failure to the other devices over the secondary channel. Finally, at 906, the backup channel is made the primary channel and the process reverts to 902 (in which any additional backup channels are discovered and added to the prioritization scheme).

Figure 10:
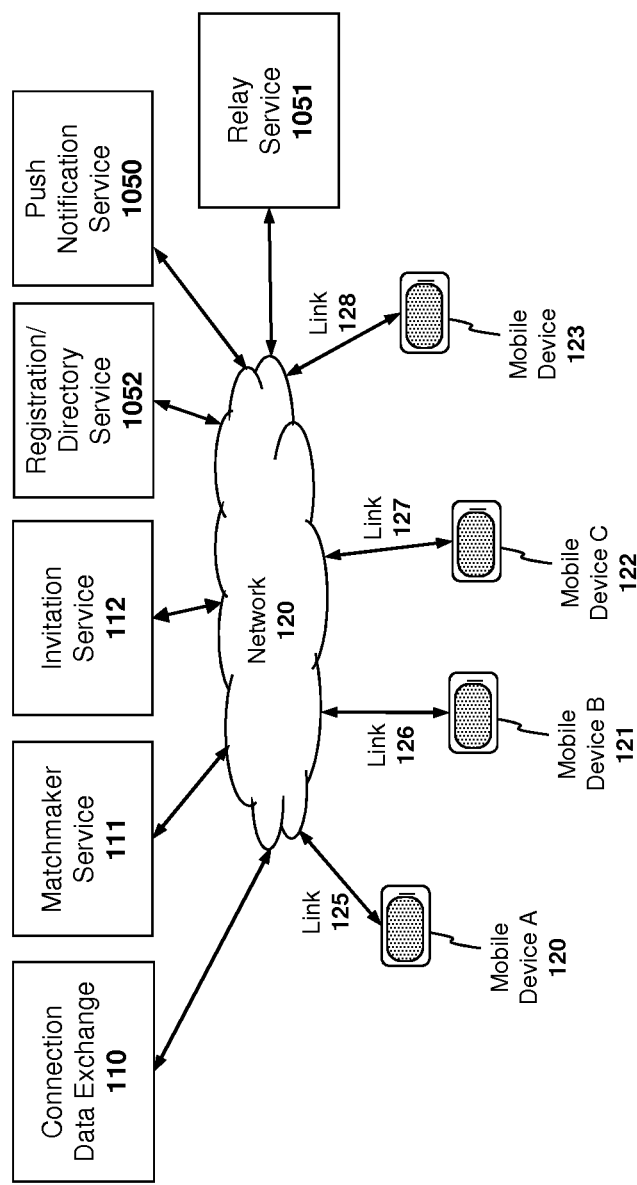
FIG. 10 illustrates a network architecture in which a group of mobile devices and services, including a directory service and a push notification service communicate over a network.

Apparatus and Method for an Invitation Service for Establishing Peer-to-Peer (P2P) Communication Channels As illustrated in FIG. 10, in addition to the CDX service 110, matchmaker service 111 and invitation service 112 (some embodiments of which are described above), one embodiment of the invention can include a registration/directory service 1052, a push notification service 1050, and a relay service 1051. As mentioned above, in one embodiment, the invitation service 112 and/or the matchmaker service 111 can use the registration/directory service 1052 to identify registered mobile devices and the push notification service 1050 to push data to the mobile devices. In one embodiment, when a mobile device is activated on the network, it registers a "push token" (sometimes referred to as a "notification service account identifier" in the Push Notification Application) with a database maintained by the registration/directory service 1052 by associating the push token with a password protected user ID or a telephone number. If the push token is identified in the registration directory (e.g., by performing a query with the user ID), the push notification service 1050 can use the push token to transmit push notifications to a mobile device. In one embodiment, the push notification service is the Apple Push Notification Service ("APNS") designed by the assignee of the present application and described, for example, in the Push Notification Application referenced above.

Figure 11:
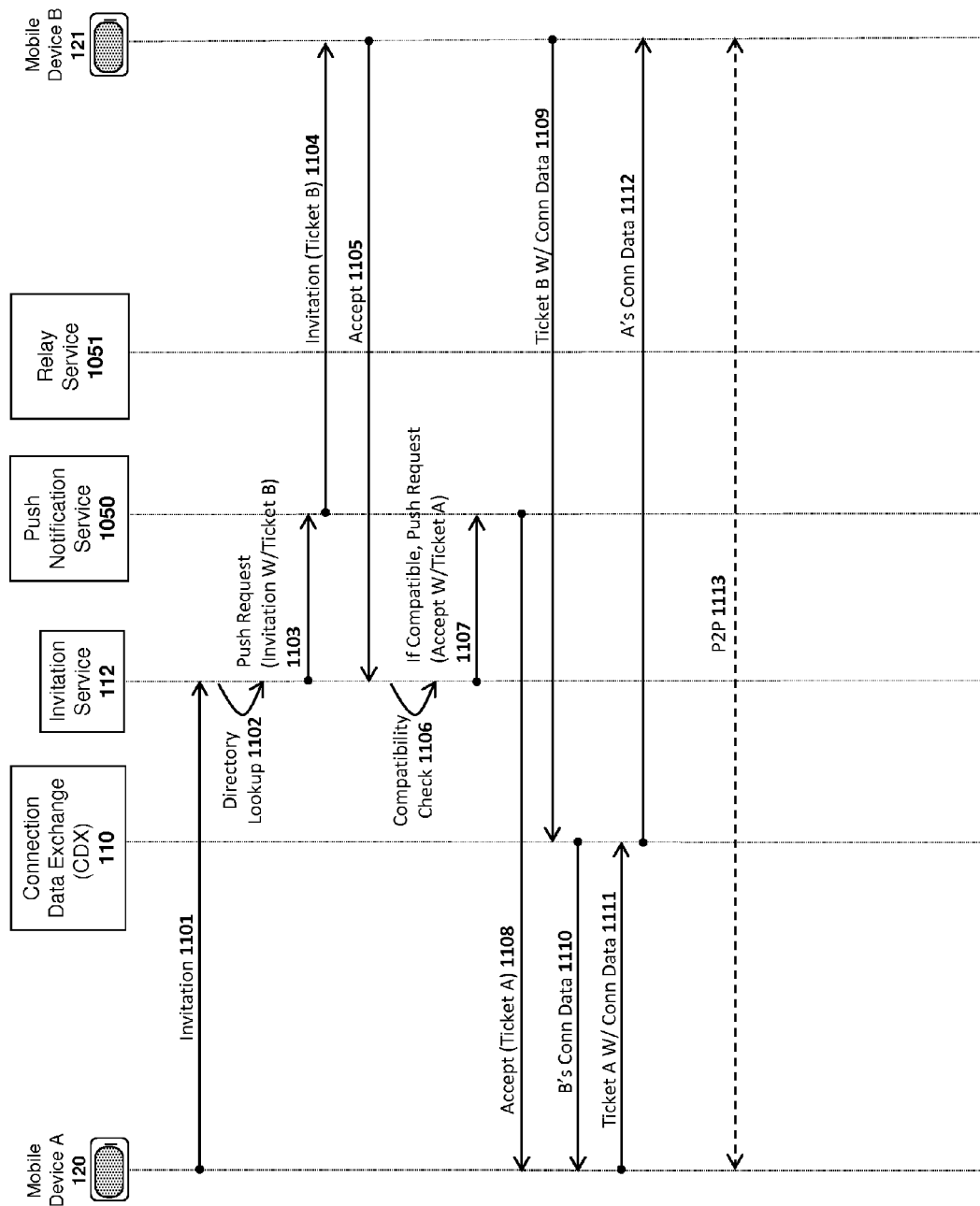
FIG. 11 illustrates transactions between one embodiment of an invitation service, a push notification service and a connection data exchange (CDX) service.
Figure 12:
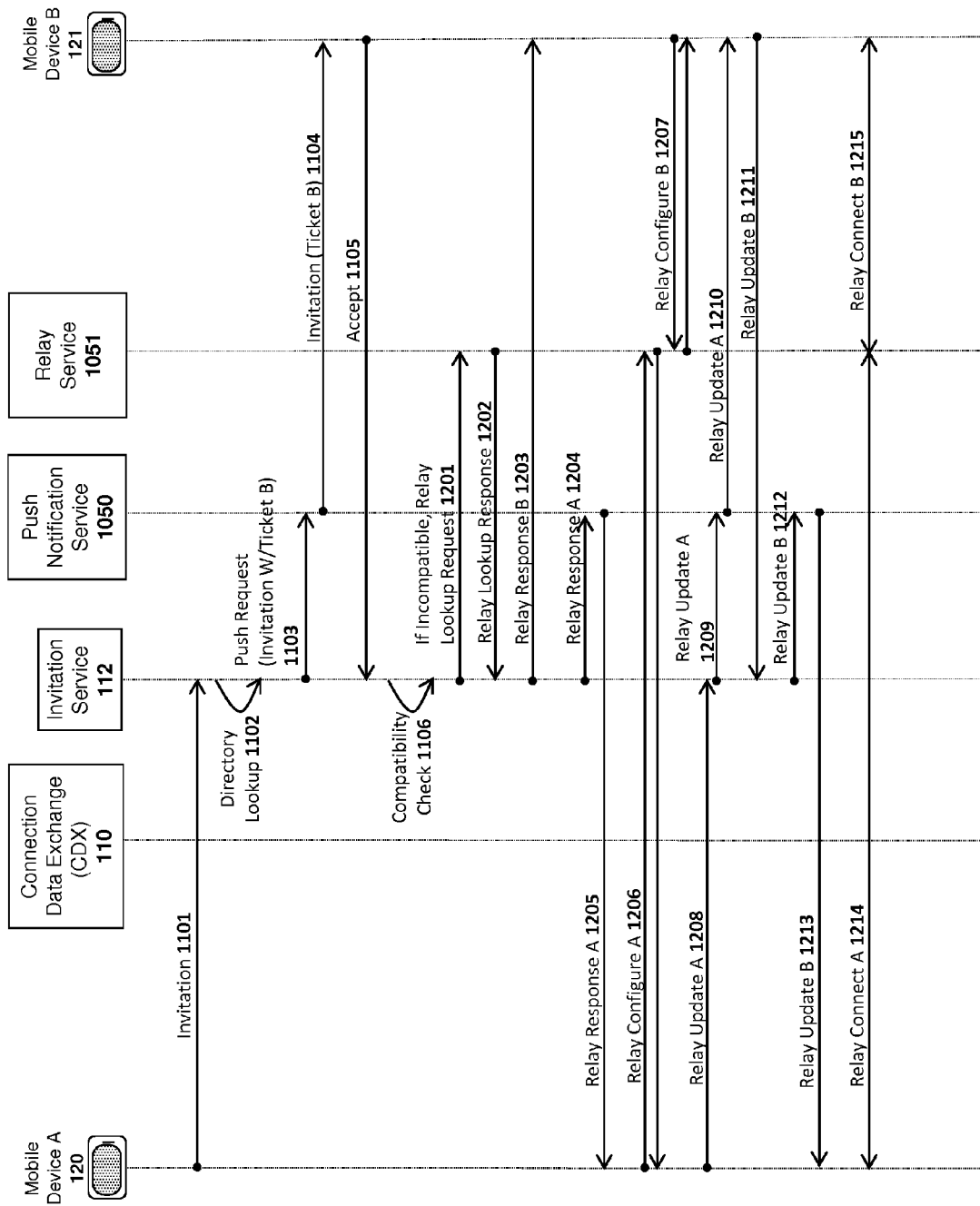
FIG. 12 illustrates transactions between one embodiment of an invitation service, a push notification service, and a relay service.

FIG. 11 illustrates an embodiment of the invention in which the push notification service 1051 is used to establish a direct P2P connection between two mobile devices and FIG. 12 illustrates an embodiment which is used to establish a P2P connection through the relay service 1051. As described below, the decision as to whether to use the relay service 1051 to establish a P2P connection may be based on the feasibility of establishing a direct P2P connection between the mobile devices (e.g., based on NAT compatibility issues).

Turning now to FIG. 11, at 1101, mobile device A 120 transmits an invitation to invite mobile device B 121 to invite mobile device B to a P2P communication session (e.g., a collaborative video game, a P2P video chat, etc). In one embodiment, the invitation includes a User ID code identifying mobile device B 121 (and/or the user of mobile device B) within the context of a particular online application. For example, the user ID code may be a player ID for a particular multi-player, P2P game and may take the form, for example, of a Universally Unique Identifier (UUID). Alternatively, in some embodiments, the ID code may be a phone number of mobile device B 121. A game ID code may be used to identify the multi-player game that mobile device A is inviting mobile device B to join. A bucket ID may be used to identify a configuration for that game (as described herein with respect to the matchmaker service).

The invitation 1101 may also include an ID code identifying mobile device A 120 and NAT traversal/connection data associated with mobile device A (e.g., the public/private IP addresses and ports for mobile device A and the NAT type for device A's NAT device). The NAT traversal/connection data or NAT type data may have been previously determined by mobile device A prior to the invitation request 1101 (e.g., via NAT traversal, NAT type and connection data transactions such as those discussed above with respect to FIGS. 2*a-c*). As previously mentioned, the invitation request 1101 can take the form of an HTTPS request. In addition, for additional security, the invitation request 1101 can include a client certificate signed by a pre-specified certificate authority.

Regardless of the particular type of ID code used to identify mobile device B, the ID code is received by the invitation service 112 and, at 1102, the invitation service 112 can perform a lookup in the directory service 1052 (not shown in FIG. 11) to identify a notification service account identifier such as a push token used for pushing notifications to mobile device B ("push-token-B"). In one embodiment, the lookup operations can perform several checks to determine whether the invitation should be allowed. First, it can confirm that the identification code for mobile device A ("ID-A") and device A's push token ("push-token-A") are a registered association within the directory service database. The lookup operation 1102 can also confirm that that the user of mobile device A is permitted to invite the user of mobile device B (e.g., the user of mobile device B can specify that only those other users registered as B's friends can invite user B; or can specify that no invitations are permitted). In one embodiment, if any of these checks fail, the invitation is canceled, and the invitation service 112 returns an error to mobile device A.

While a "push token" is described in this embodiment, it should be noted that the underlying principles of the invention are not limited to the use of a "push token" or any other particular data structure for authenticating and pushing notifications to mobile devices.

In one embodiment, after the push token has been identified, the invitation service 112 can generate a secure, one-time "session token" assigned to the invitation session and used to identify the session in all further transactions. A copy of the session token is then transmitted back to the mobile device A 120 and sent to mobile device B with the invitation request. In one embodiment, the session token is used together with the ticket data structure described above and, in another embodiment, only the session token is used.

At 1103, the invitation service 112 transmits a push request to the push notification service 1050. In one embodiment, the push request can include the NAT traversal data for mobile device A, device A's ID code, push-token-A, device B's ID code, and push-token-B. In one embodiment, this information may be packaged within a "ticket" data structure and encrypted as described above. In another embodiment, the data is simply transmitted with the invitation session ID.

Because mobile device B 121 in this example has registered with the push notification service 1050, the push notification service 1050 is capable of locating and pushing the invitation request to mobile device B 121 at 1104. The pushed invitation 1104 may include the session token, mobile device A's NAT traversal data/connection data, and mobile device B's ID code. In response to the invitation request, mobile device B may determine its networking information (e.g., NAT traversal/connection data, NAT type, etc) by making a call to a NAT traversal service or the CDX service 110 as described above.

At 1105, mobile device B accepts the invitation. The accept 1105 may take the form of an HTTPS call to the invitation service 112 and may include a client certificate signed by the pre-specified certificate authority (mentioned above with respect to the invitation request). In one embodiment, the accept 1105 can include the ID code for mobile devices A and B and the NAT traversal/connection data and/or NAT type for mobile devices A and B. The accept 1105 may also include the push tokens for mobile devices A and B and/or the session token. In one embodiment, the accept 1105 may also contain an indication as to whether it is a retry from a previous failed direct connection attempt. However, in another embodiment, the accept 1105 does not contain the retry indication. Rather, upon detecting a failed P2P connection attempt, one of the two mobile devices may transmit a special "relay invitation" to the invitation service 112. In response, the service may directly initiate the series of relay transactions described below with respect to FIG. 12 (starting at 1201).

At 1106, the invitation service 112 can perform a compatibility check to determine whether a direct P2P connection between mobile devices A and B is feasible. For example, in one embodiment, if the accept 1105 received from mobile device B indicates that it is a retry from a previous failed direct connection attempt (or a specified number of previous failed direct connection attempts), then the invitation service may conclude that a direct P2P connection is infeasible. The invitation service 112 may compare the NAT type data for mobile devices A and B to determine if the NAT devices of mobile devices A and B will support a direct P2P connection. Certain combinations of NAT types are known to be incompatible for establishing P2P connections. For example, a full cone NAT may be used with any other NAT type except a closed/firewalled NAT to establish a direct P2P connection. By contrast, a symmetric NAT can only be used with a full cone NAT to establish a direct P2P connection. The feasibility of combining various NAT types in one embodiment of the invention is set forth in the NAT compatibility table 1400 shown in FIG. 14, in which columns represent NAT types of one mobile device (e.g., mobile device A) and rows represent NAT types of the other mobile device (e.g., mobile device B). A "1.0" in a cell indicates that the NAT types in the associated row and column are compatible and a "0.0" indicates that the NAT types are incompatible.

In one embodiment, if the compatibility check 1106 determines that a direct P2P connection is infeasible, then the invitation service 112 can transmit a relay lookup request 1201 as described below with respect to FIG. 12. If, however, the compatibility check 1106 determines that a direct P2P connection is feasible, then the invitation service 112 can transmit a push request 1107 to the push notification service 1050 containing mobile device B's acceptance of mobile device A's invitation. The push request 1107 and subsequent push communication 1108 to mobile device A from the push notification service 1050 can include the session token and both mobile device A's and B's push token, ID code, and/or NAT traversal/connection data. In one embodiment, this information may be packed within the "ticket" data structure described above (see, e.g., FIGS. 2*a-c* and associated text) and may be encrypted using a unique key. Alternatively, this information may simply be transmitted with a unique invitation session ID. The invitation service 1050 may also notify mobile device B that a direct connection will be attempted.

At this stage, mobile devices A and B have sufficient information to establish a direct P2P connection. In one embodiment, this is accomplished using the CDX service 110 as described above. For example, mobile device B appends its connection data to Ticket B and, at 1109, transmits Ticket B (with connection data) to the CDX service. Just prior to this transaction, mobile device B may implement a transaction such as transaction 235 shown in FIG. 2*b* in order to ensure that its connection data is current. The CDX service 110 then authenticates the ticket (e.g., using the unique session key as described above), extracts mobile device B's connection data, and forwards the connection data to mobile device A at 1110. Similarly, mobile device A appends its connection data to Ticket A and, at 1111, transmits Ticket A (with connection data) to the CDX service 110. Just prior to this transaction, mobile device A may implement a transaction such as transaction 232 shown in FIG. 2*b* in order to ensure that its connection data is current. The CDX service 110 then authenticates the ticket (e.g., using the unique session key as described above), extracts mobile device A's connection data and forwards the connection data to mobile device B at 1112. Finally, at 1113, mobile devices A and B enter into a direct P2P connection using the exchanged connection data.

Figure 13:
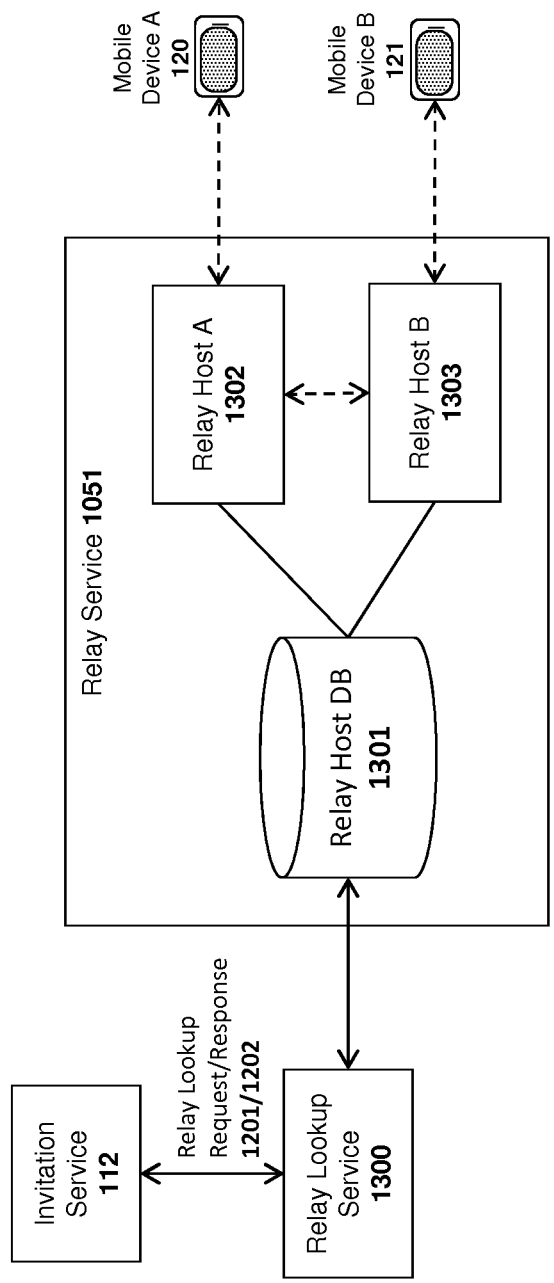
FIG. 13 illustrates one embodiment of a relay service for establishing a relay connection between two or more mobile devices.

Turning now to FIG. 12, if the compatibility check 1106 determines that a direct P2P connection is infeasible, then the invitation service 112 can transmit a relay lookup request 1201 to the relay service 1051 to determine a relay host to be used by each mobile device. The request 1201 may contain the networking information for mobile devices A and B (e.g., NAT traversal/connection data and/or NAT type data) which is used by the relay service 1051 to select appropriate relay hosts for both of the mobile devices. As illustrated in FIG. 13, one embodiment of the relay service 1051 includes a plurality of relay hosts 1302-1303 and a relay host database 1301 containing network information related to each of the relay hosts. The invitation service 112 transmits a relay lookup request 1201 to a relay lookup service 1300, which queries the relay host database 1301 using the network information for mobile devices A and B. Upon receiving the database results, the relay lookup service 1300 provides a response 1202 identifying the selected relay hosts 1302-1303.

In one embodiment, the relay lookup response 1202 contains a relay token generated by the relay service and the network addresses (IP addresses/ports) of the relay hosts 1302-1303 to be used by mobile devices A and B for the relay connection. In one embodiment, the relay token is associated with the relay session and is used by the relay hosts 1302-1303 to authenticate mobile devices A and B upon connecting to the relay service 1051. The token may take on various forms including, for example, unique ID relay session ID code, a digital certificate and/or a unique encryption key associated with the relay session.

At 1203, the invitation service transmits a relay response 1203 to mobile device B 121 containing an indication that a relay connection will be made. In one embodiment, the relay response 1203 can include the relay token and the network information for relay host B 1303. In one embodiment, response 1203 can be sent directly to mobile device B (bypassing the push notification service 1050) because it is being sent in response to mobile device B's accept 1105.

The invitation service 112 transmits relay response 1204 to mobile device A which can include the relay token and the network information for relay host B 1303. In this instance, the response 1204 is pushed to mobile device A via the push notification service 1050 at transaction 1205.

At 1206, mobile device A 120 uses the network information for relay host A 1302 to establish a connection with the relay service 1051. Similarly, at 1207, mobile device B 121 uses the network information for relay host B 1303 to establish a connection with the relay service 1051. In each of these transactions, new holes are opened in any NAT firewalls of mobile devices A and B and the NAT traversal/connection data for mobile devices A and B may be determined by the relay service 1051 and returned to mobile devices A and B, respectively (e.g., by determining the public IP/port for the devices). In one embodiment, the relay service 1051 and mobile devices A and B implement the Traversal Using Relay NAT ("TURN") protocol which, as understood by those of skill in the art, allows an element behind a NAT or firewall to receive incoming data over TCP or UDP connections.

At 1208, mobile device A transmits a relay update to the invitation service 112 which is forwarded to the push notification service at 1209 and pushed to mobile device B at 1210. Similarly, at 1211 mobile device B transmits a relay update to the invitation service 112 which is forwarded to the push notification service at 1212 and pushed to mobile device A at 1213. The relay update transmitted by mobile device A can include the session token, each device's ID code, and the NAT traversal/connection data determined by the relay at 1206 and 1207 (i.e., with mobile device A sending its NAT traversal/connection data to mobile device B and vice versa). In one embodiment, the relay update operations are performed because each mobile device's NAT information may change.

Finally, at 1214 and 1215 mobile devices A and B, respectively, establish a P2P connection through the relay service 1051. In one embodiment, the relay connections can be established when mobile device A sends the NAT traversal/connection data of mobile device B to the relay service 1051, and vice versa, thereby allowing the relay service to determine the correct path to each peer's relay host 1302-1303.

Using the techniques described above, the invitation service 112 may be implemented as a stateless service which is inherently scalable and resilient, even in a large-scale system with a vast number of mobile devices. For example, because the push notification service 1050 is inherently capable of locating and pushing content to registered mobile devices, the invitation service is not required to track the current location of each device. Additionally, because devices may transmit the entire session state data with each request and response, the invitation service is never required to maintain any per-connection state information, thereby reducing the storage and processing requirements of the invitation service. Such an implementation is particularly useful in a large-scale system.

System and Method for Matching Users for Online Sessions

Figure 15:
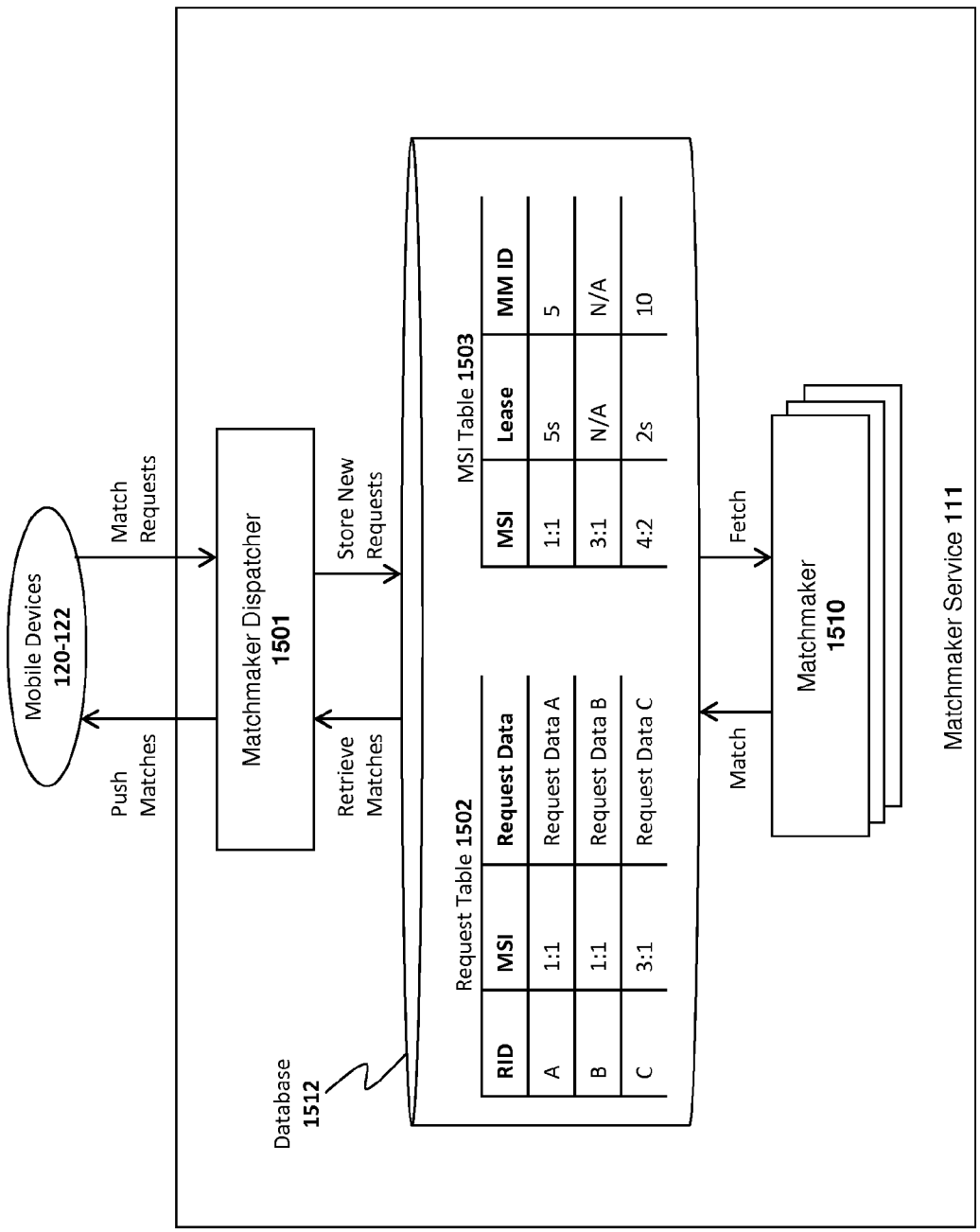
FIG. 15 illustrates one embodiment of a matchmaker service for matching mobile devices for online applications.

As illustrated in FIG. 15, one embodiment of a matchmaker service 111 can include a matchmaker dispatcher 1501 for receiving match requests and pushing match responses to mobile devices 120-122; a database 1512 for storing match requests in a request table 1502 and for storing matchable set data in a matchable set identifier ("MSI") table 1503; and one or more matchmakers 1510 for fetching match requests from the database 1512, performing matching operations, and storing the match results back in the database 1512. It should be noted, however, that the underlying principles of the invention are not limited to the specific architecture shown in FIG. 15.

In one embodiment, the matchmaker dispatcher 1501 acts as an interface to the matchmaker service 111, receiving requests from mobile devices 120-122, translating those requests into commands to store the requests in the database 1512, reading match results from the database 1512, and translating and communicating those results to the mobile devices 120-122.

In operation, when a new match request arrives, the matchmaker dispatcher 1501 can store the request within a row of the request table 1502. In one embodiment, the dispatcher 1501 assigns each match request a request ID ("RID") code, illustrated simply as "A," "B" and "C" in FIG. 15 (corresponding to mobile devices A, B and C, respectively). While shown using a letter designation in FIG. 15 for simplicity, the RID code may be a string, integer, or any other variable type suitable for tracking match requests within the database.

Each match request may be assigned a matchable set identifier ("MSI") value which is stored in the request table 1502. In one embodiment, the MSI can identify the specific application for which a match is being requested and/or the configuration parameters to be used for that application. For example, an MSI value of 12:4 may identify a particular multi-player game with the identifier "12" and may identify a particular configuration for the game with the identifier "4." More specifically, the ID code of 12 may identify a particular multi-player racing game and the ID code of 4 may specify a particular racing track, speed, or player experience level for the racing game. In one embodiment, application developers are provided the option to specify any application configuration parameters using MSI values in this manner. In one embodiment, rather than specifying an MSI directly, application developers specify a game ID (to identify a particular game) and a bucket ID (to identify a particular game configuration) and these values are mapped to an MSI value by the matchmaker dispatcher 1501.

Additionally, several different MSI values may be used within a single MSI to specify multiple different configuration parameters (e.g., 12:4:1 might represent: 12=racing game; 4=track; and 1=experience level). As described in detail below, in one embodiment, each MSI is used by a matchmaker 1510 to identify a set of match requests in which matchmaking operations can be performed (e.g., requests are grouped based on MSI and matches are performed within each MSI group). In one embodiment, each MSI may be dynamically modified/selected by the dispatcher to include a partition ID identifying different machine partitions. For example, if a particular MSI becomes overloaded, the dispatcher may split the MSI between two or more different servers and/or storage partitions (e.g., using designations such as 4:3:1 and 4:3:2 where the last digits identify partitions 1 and 2, respectively). A different matchmaker may then independently retrieve and process requests from each of the different MSIs from each of the different servers.

As illustrated in FIG. 15, match request data may also be stored within the request table 1502 for each request. The request data may include any data usable for rendering a matchmaking decision and/or any data needed to access the mobile device initiating the request over the network. For example, in one embodiment the match request data for each request includes the NAT type data and/or NAT traversal/connection data for the mobile device initiating the request. Other types of request data may also be stored within the request table 1502 such as device connection speed (100 kbps, 1 Mbps, etc), connection type (e.g., 3G, EDGE, WiFi, etc), device location (e.g., determined by geo-location techniques), language (English, Spanish, etc), and/or user preferences. The request data may be determined by each mobile device 120-122 and transmitted to the matchmaking dispatcher 1501 with each match request. For example, each mobile device may determine its connection data, connection type, device location, etc, using various techniques, some of which are described herein (e.g., communicating with a NAT traversal server to determine NAT traversal/connection data, using GPS to determine device location, reading HTTP information to determine language, etc).

As illustrated in FIG. 15, in one embodiment, each active MSI can be assigned a row in the MSI table 1503. In one embodiment, when a new request arrives, in addition to adding the request to the request table 1502, the dispatcher 1501 also checks the MSI table 1503 to determine whether an MSI already exists for that request (i.e., whether other requests having the same MSI have already been received). If no matching MSI is found, then the dispatcher 1501 may create a new entry in the MSI table 1503 for the new request. If a matching MSI is found, then the dispatcher can simply add the new request to the request table 1502 as described above.

Once the request table 1502 and MSI table 1503 are updated by the matchmaker dispatcher 1501, an instance of a matchmaker module 1510 (hereinafter simply referred to as "matchmaker 1510") fetches the data to perform matchmaking operations. Multiple matchmaker instances may be concurrently executed to perform matchmaking requests and a single matchmaker 1510 may concurrently process multiple matchmaking operations on multiple different MSI groups.

In one embodiment, when a matchmaker 1510 becomes available (e.g., after completing matching operations for an MSI group or after being initialized), it queries the MSI table 1503 to identify a new MSI to process. In FIG. 15, the "N/A" value in the matchmaker ID fields for MSI 3:1 indicate that the responsibility for processing this MSI has not yet been assigned to a matchmaker. In one embodiment, each MSI entry is time-stamped and the matchmaker 1510 selects an MSI having the oldest time-stamp.

In one embodiment, when a matchmaker 1510 assumes responsibility for a particular MSI, it updates its matchmaker ID code in the MSI table 1503 and specifies a lease duration for that MSI (e.g., 5 seconds). In one embodiment, the matchmaker 1510 continually updates the lease value as it processes matches for that MSI. The lease values may be used to identify MSIs which were assigned to failed matchmakers 1510. For example, if the lease value has expired, that MSI may be claimed by a new matchmaker notwithstanding the fact that the MSI table 1503 indicates that the MSI is already assigned to a matchmaker.

Once the matchmaker 1510 has assumed responsibility for an MSI, it can query the request table 1502 to read requests associated with that MSI into memory. The matchmaker 1510 can then perform matching operations to match users and mobile devices according to a set of matching criteria (e.g., as described below). The matchmaker 1510 can update the request table 1512 to indicate when matches of mobile device have been made. For example, the matchmaker can remove the MSI values from the MSI column in the request table 1512 and enter a predefined value to indicate that the match has been completed. In addition, the matchmaker 1510 may update the "request data" field for each participant to identify the other participants with which that participant was matched (e.g., by writing the NAT traversal/connection data needed to communicate with the other participants).

The dispatcher 1501 can periodically query the request table 1502 to identify completed matches. In response to detecting a completed match, the dispatcher 1501 may transmit a push notification to the mobile devices involved in the match (e.g., using the push notification techniques described herein and in the co-pending applications). In one embodiment, the push notification includes the "ticket" data structure described above. The mobile devices may then use each of their tickets to exchange connection data via the CDX service 110 as described above.

In addition to using push notifications, in one embodiment, the mobile devices 120-122 may periodically query the dispatcher 1501 to determine if a match has been made. Periodic queries are useful in case the push notification has not made it to the mobile device. However, because a push architecture is used, the periodic queries may be set to a relatively low rate, thereby reducing the load on the matchmaker service 111.

Figure 16:
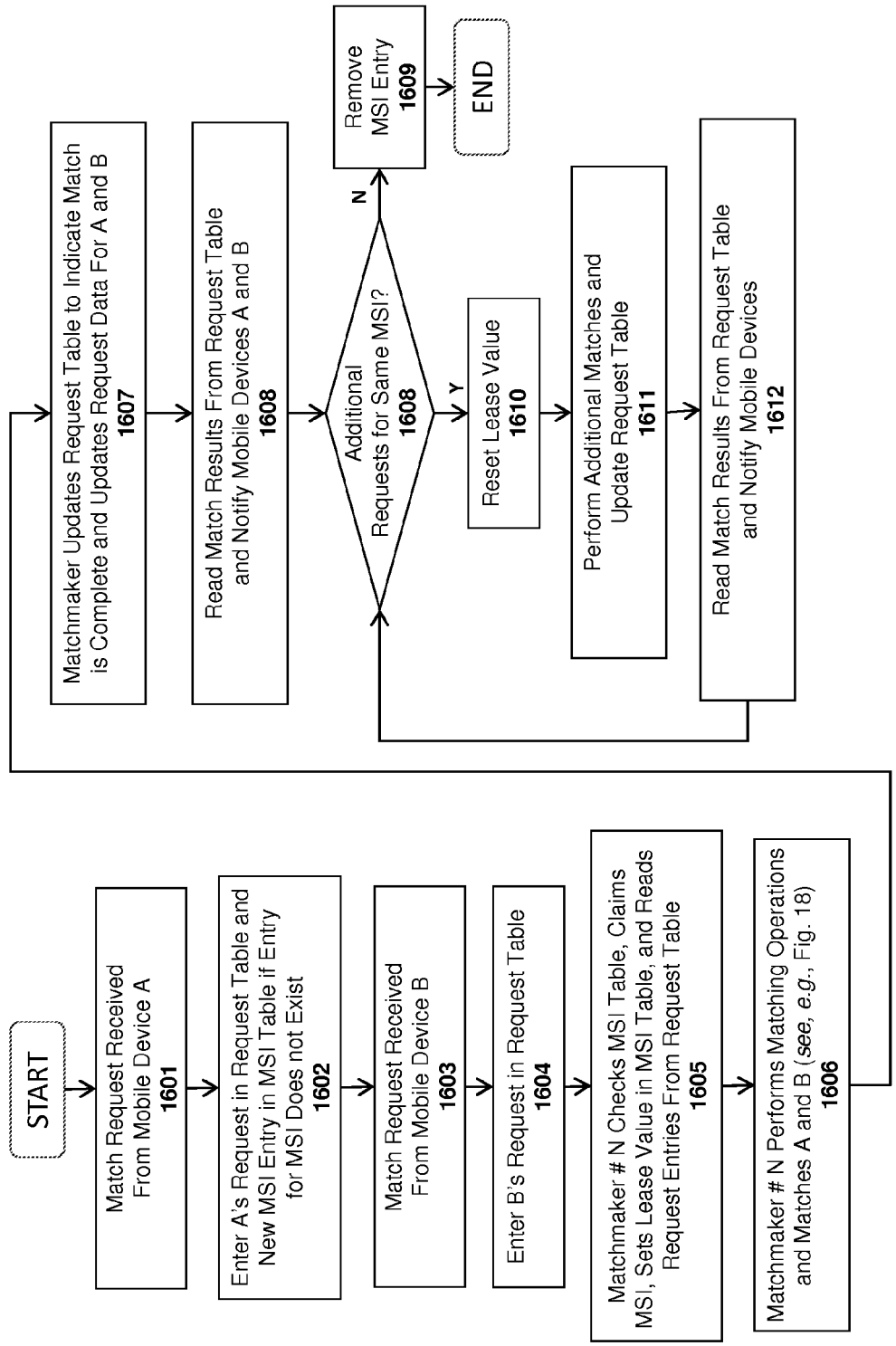
FIG. 16 illustrates one embodiment of a method for matching users/devices.

FIG. 16 illustrates an exemplary embodiment of a method in which two mobile devices, A and B, are matched by the matchmaker service 111. FIGS. 17*a-d* illustrate exemplary updates to the request table 1502 and the MSI table 1503 which may occur as the method progresses.

At 1601, a match request is received from mobile device A. At 1602, mobile device A's request is entered in the request table and a new MSI entry (MSI 1:1) is entered in the MSI table (if one does not already exist), as illustrated in FIG. 17*a*. At 1603, a match request is received from mobile device B and, at 1604, mobile device B's match request is also entered in the request table as illustrated in FIG. 17*b*.

At 1605, a particular matchmaker instance (matchmaker # N) checks the MSI table and detects that MSI 1:1 has not been claimed by another matchmaker instance. Alternatively, the matchmaker may detect an MSI table entry with an expired lease, indicating that the matchmaker previously working on the MSI has failed. In one embodiment, MSI entries with expired leases are given higher priority than new MSI entries (which have not yet been assigned a matchmaker). In addition, in one embodiment, relatively older MSI entries may be given higher priority than relatively newer MSI entries. Regardless of how the matchmaker selects the MSI, when it does, it adds its identifier and sets a new lease value for the MSI entry, as illustrated in FIG. 17*c* (e.g., using a lease value of 5 seconds in the illustrated example). The matchmaker may then query the request table and read the request table entries with that MSI into memory so that they can be processed.

At 1606, the matchmaker performs a series of matching operations to select an appropriate match for each of the requests. Certain embodiments of the matching operations are described below with respect to FIG. 18. Briefly, in one embodiment, the variables which are evaluated to determine "appropriate" matches include the NAT type (e.g., full cone, port restricted, symmetric, etc), the connection type (e.g., WiFi, 3G, Edge, etc), the language associated with the user (derived from the HTTP request accept-language header), and the age of each of the match requests. In general, the matchmaker 1510 may attempt to match mobile devices having compatible NAT types (although the relay service may sometimes be used as described below), the same connection types, and the same language. In one embodiment, the matchmaker 1510 may be more liberal with the matching requirements based on the age of the matching requests (i.e., the older the request, the more liberally the matching constraints will be applied).

Returning to FIG. 16, at 1607, following the matching decision, the matchmaker 1510 may update the request table to indicate that the matching is complete, as indicated in FIG. 17*d*. As part of the update, the matchmaker may also update the request data for mobile devices A and B. For example, in one embodiment, the matchmaker 1510 writes mobile device B's NAT traversal/connection data in the request data column for mobile device A and writes mobile device A's NAT traversal/connection data in the request column for mobile device B.

At 1608, the dispatcher 1501 can read through the request table to identify request entries which have been matched. In one embodiment, when it detects that mobile devices A and B have been matched, it reads the request data (updated by the matchmaker as described above), and generates a notification for mobile devices A and B. In one embodiment, the notification is the "ticket" data structure described above which is encrypted and includes the NAT traversal/connection data for each mobile device. As previously described, in one embodiment, the push notification service 1050 is used to push the notifications to mobile devices A and B. In addition, mobile devices A and B may periodically poll the dispatcher 1501 to determine whether a match has been made. In this embodiment, the polling technique may be done at a relatively slow rate to identify matches which, for some reason, were not successfully pushed to one of the mobile devices. Using push notifications to manage polling request load significantly reduces the load on the matchmaker service 111, which would otherwise be loaded with polling requests from mobile devices.

If additional match requests are pending for the same MSI, determined at 1608, the matchmaker may continue to match mobile devices/users within the MSI. At 1610, the matchmaker may reset the lease value within the MSI table 1503. At 1611, additional matches are performed and the request table is updated (as described above). At 1612, the additional matches are read from the request table and the additional mobile devices are updated (as described above). If no additional match requests are pending for the MSI then, at 1609, the MSI entry is removed from the MSI table (e.g., via a delete command from either the dispatcher and/or the matchmaker).

Figure 18:
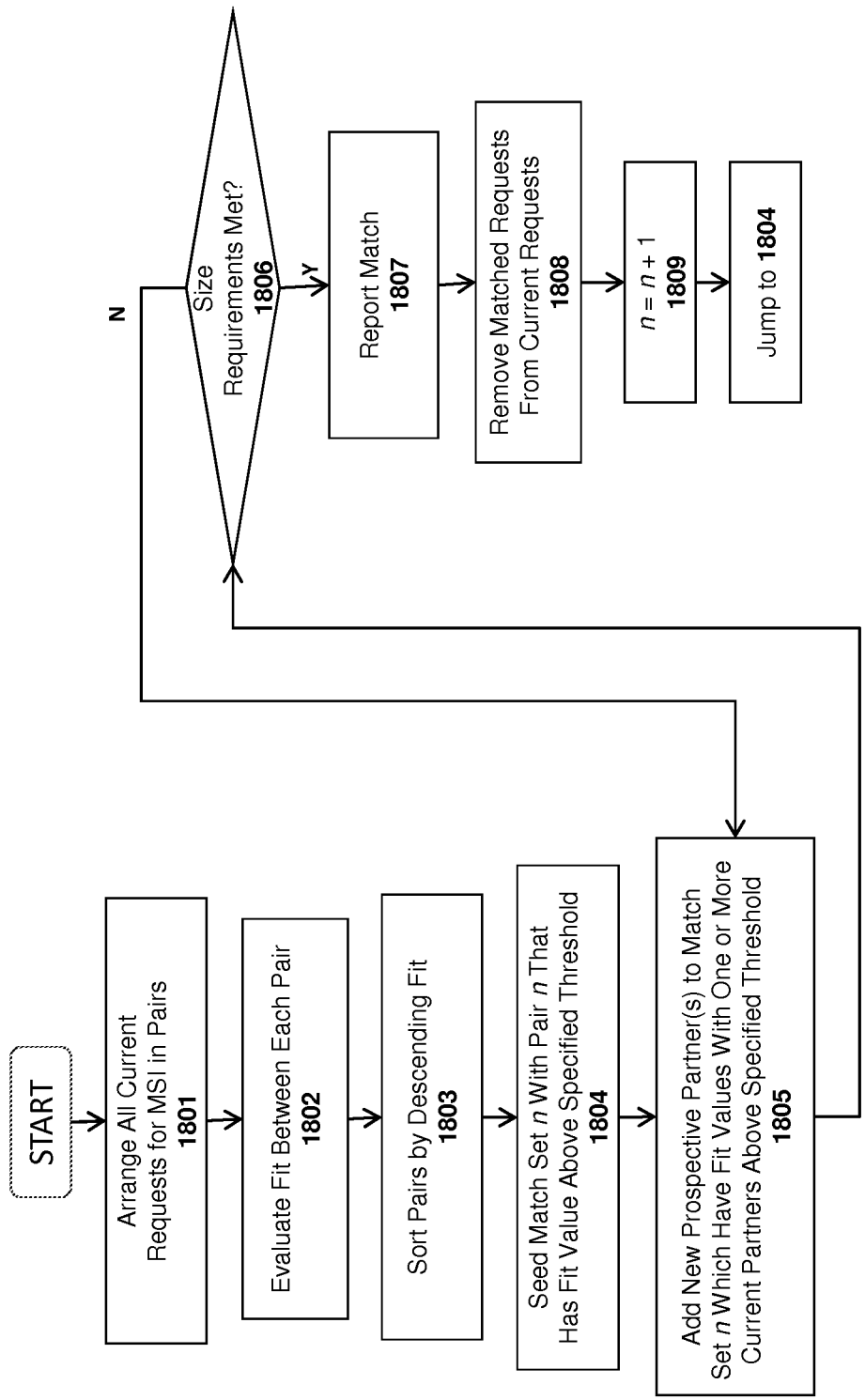
FIG. 18 illustrates a method for matching users/devices using different match fit variables.

FIG. 18 illustrates one embodiment of a method for performing matches between mobile devices/users (operation 1606 in FIG. 16). At 1801, all current MSI requests (e.g., for a particular application/bucket combination) are arranged in pairs. At 1802, the match "fit" between each pair is evaluated and, at 1803, the pairs are sorted by descending fit. The "fit" is evaluated based on a plurality of different variables including, but not limited to, the NAT type (e.g., full cone, port restricted, symmetric, etc), the connection type (e.g., WiFi, 3G, Edge, etc), the language associated with the user (derived from the HTTP request accept-language header), and the age of each of the match requests. Other variables which may be factored in to the matchmaking decision include the location of each of the mobile devices (e.g., with an attempt to match users in a particular location); minimum and/or maximum player requirements (e.g., specified by the user and/or the application); whether the one or more of the users included in the MSI are "friends" or have entered into a P2P connection previously (e.g., with a preference to matching "friends" or prior acquaintances); and user experience with the application (e.g., for a multi-player game, the leaderboard ranks of each of the users may be factored in, with a preference to matching similarly-experienced users).

As indicated in Table A below, in one embodiment, the evaluation of "fitness" is a numeric value between 0.0 and 1.0. Using a floating point value allows for normalization of the fitness for each criteria. To avoid floating point arithmetic, non-normalized integer values can be used with suitable evaluation so fitness values can be compared.

In one embodiment, all criteria have a binary fit where they are either compatible (having a normalized value of 1.0) or not compatible (having a normalized value of less than 1.0). These can be thought of as required criteria where the fit may change with age (as described below). If location is added as a variable, then the best fit may be one with the closest player that matches the required criteria.

TABLE A

| Match Fitness | | |
|---|---|---|
| Factor | Weight | Normalized |
| NAT Compatibility | 2.0 | 0.4 |
| Connection Type | 2.0 | 0.4 |
| Language | 1.0 | 0.2 |
| TOTAL | 5.0 | 1.0 |

In one embodiment, the Fit is equal to the Sum Of (Normalized Weight*Aged Factor Value) for each of the above criteria. The Aged Factor Value may start with a value of 1 and increase after a predetermined period of time has passed. It may then continue to increase as more time passes (e.g., periodically increasing by a specified amount). In one embodiment, instead of using the Aged Factor Value described above, age thresholds may be established as described below. The normalized/weighted values of certain variables such as Connection Type and Language may be applied above certain age thresholds (even if they do not match).

In one embodiment, the "fit" between a pair of requests, A and B, is the average of the fit of A with B and B with A. Moreover, the fit of A with B for each factor may be adjusted based on A's age (and vice versa). In one embodiment, a fit of 1.0 may be required for a compatible match. This means A and B will only match if the NAT compatibility, Connection Type and Language match (resulting in a normalized value of 1.0) or if A and/or B have aged so that some of the above variables (e.g., the Connection Type and Language) are effectively ignored (either using the aged factor value above or the thresholds below).

TABLE B

| Ages | | | | | |
|---|---|---|---|---|---|
| Age | Thresh. 1 | Thresh. 2 | Thresh. 3 | Thresh. 4 | Thresh. 5 |
| Older Than | 0 sec | 1 sec | 5 sec | 10 sec | 30 sec |

Age thresholds may be established as set forth in Table B above. As each age threshold is passed (i.e., as the request becomes older than the specified threshold), the aged factor value may be increased to successively larger values (e.g., 1.5, 2.0, etc). Alternatively, or in addition, as different age thresholds are passed, weighted values for certain variables may be added to the matching decision (e.g., such as connection type and language as described below).

In one embodiment, the request age limits specified in Table B are adjusted according to the match flow rate for a given MSI. In one embodiment, the flow rate is specified as a number of matches being performed per a specified unit of time (e.g., every 10 seconds, every minute, etc). Thus, the flow rate provides an indication as to how busy a particular MSI set is. In one embodiment, the busier the set, the lower each of the above thresholds may be set in Table B above to increase the probability of an early successful match and reduce the load on the matchmaker. Moreover, the load for a given MSI set may be provided to the end user (e.g., in the form of an estimated time to match value), so that the end user can choose whether to attempt to enter a multi-player game which is particularly busy. The load value may be provided to the user in the form of a push notification.

Turning now to each of the variables from Table A, in one embodiment, NAT compatibility is determined from the NAT compatibility chart 1400 shown in FIG. 14. If two NATs are determined to be compatible based on this chart, then the NAT compatibility weight may be applied.

TABLE C

| Connection Type | | | |
|---|---|---|---|
| A/B | WiFi | Edge | 3G |
| WiFi | 1.0 | 0.0 | 0.0 |
| Edge | 0.0 | 1.0 | 0.0 |
| 3G | 0.0 | 0.0 | 1.0 |

The connection type may be evaluated using a chart such as that shown above as Table C. In this example, if the connection type of devices A and B is the same (as indicated by a 1.0 in the cells where the same connection types meet), then the weighted connection type value from Table A may be included in the fitness determination. As mentioned above, the age of each of the requests may be used to affect the connection type determination. For example, in one embodiment, the fit value for connection type is selected using the matrix in Table C for ages at threshold 1, 2, and 3. For ages at threshold 4 or above, the connection type may be set to 1.0 (even for non-matching connection types) and the corresponding weighted connection type value may be applied. While connection "type" is used in some embodiments, connection speed may be determined and used with, or instead of, connection type. For example, connection speeds within certain specified ranges may be considered "compatible" (e.g., 0-100 kbps; 100-500 kbps; 500-1000 kbps, 1000-1500 kbps, etc). Any of the matching variables discussed herein may also be applied as weights to the match fit calculation and aged as described above.

In one embodiment, the player language can be derived from the HTTP request accept-language header which may contain one or more languages with a preference qfactor. The dispatcher can extract the most preferred language and pass this information to the matchmaker. In one embodiment, the weighted language value from Table A is set to 1.0 if the languages are the same or 0.0 if they are not. However, in one embodiment, the weighted language value may be applied even if the languages are different if the age is above a specified threshold (e.g., if the age is at threshold 2 or above in Table B).

In one embodiment, a match may be made between two users with incompatible NAT types. For example, if the matchmaker is having difficulty matching users for a particular MSI, after a specified period of time it may route connections through the relay service 1051 using the techniques described above. In this way, the relay service 1051 acts as a pressure valve, allowing aging matches to occur notwithstanding incompatible NAT types. The relay service 1051 may also be used in response to detecting one or more failed match attempts. In this embodiment, each match request submitted by a mobile device may include an indication as to whether one or more unsuccessful matches was previously attempted.

Various additional match criteria may be evaluated and provided a weight value as part of the match fit determination including, by way of example and not limitation, an indication as to whether any of the users requesting matches are friends. For example, the matchmaker 1510 may attempt to match any requests for users who are "friends" by applying a "friends" weight to the match fit calculation. Similarly, friends of friends may also be weighted (e.g., with 2 or more degrees of separation). Additionally, a player may rate other players for a particular game and the matchmaker may evaluate those ratings when performing a match (with a tendency to match a user with those players who have relatively higher ratings and not to match a user with players who have low ratings). Moreover, the latency of a user's connection may be evaluated (e.g., using a simple ping operation) and used as part of the matchmaking decision.

Yet another variable used to match players may be device type. For example, the matchmaker 1510 may attempt to match players with similar device types (e.g., iPads, iPods, iTouches, iPhones, RIM Blackberries, etc). Additional variables may include a user's leaderboard ranking, current location, current residence, age, gender, and similar game collections may similarly be evaluated for the match determination (i.e., in many cases tending to favor matches between those users with similar criteria). Finally, parental controls may be evaluated by the matchmaker 1510 to ensure that users are only matched with appropriate MSIs and with other users of the same age.

The matchmaker service 111 may retrieve any of the above variables from one or more databases managed within the data service 100 (see, e.g., database 1920 described below with respect to FIG. 19). For example, a user's friend data may be accessed from a friends service database and other information such as each user's age, gender, game collection, etc, may be accessed from one or more other databases (e.g., a user profile, a games database, a leaderboard database, etc). In one embodiment, all of the services described herein are provided with access to the same central database (or group of databases) for storing all of the various different types of user/device data used for making matchmaking decisions.

While several specific examples are provided above, it will be appreciated that the underlying principles of the invention are not limited to any particular set of variables for determining a fitness level for a match. In one embodiment, application programmers designing applications to be run on the system and method described herein may specify their own set of criteria for matching and/or for grouping requests using different MSI criteria.

Turning back to the method of FIG. 18, once the match "fit" between each pair has been determined, at 1803, the pairs are sorted by descending fit (e.g., with the pairs having the highest fit at the top of the list). At 1804 "match sets" are seeded with those pairs which have the highest fit values above the specified threshold. As described above, the "threshold" value may be set to the normalized value of 1.0 shown above in Table A. At 1805, new prospective partners are added to the match set which have fit values with one or all of the current members in the match set above a specified threshold. For example, if a match set has initially been seeded with A and B, then C may be added to the match set if the fit value of A-C and/or B-C are above the specified threshold. In one embodiment, if only a single match fit is above a threshold for a prospective party, then that party may be added to the match set (i.e., because, if necessary, that party will be able to communicate to all of the parties through the one party with which it has a suitable match fit). Once one or more new parties have been added to the match set, if the size requirements for the match have been met, determined at 1806, then the match results are stored and reported at 1807 (e.g., by updating the request table 1502 and transmitting notifications as described above). In one embodiment, a single match request may represent multiple users (e.g., when a match request follows an invitation sequence as described below). In this case, the size requirements are evaluated based on the number of users represented by each match request. If the size requirements have not been met, then the process returns to 1805 and a new party is added to the match set (i.e., a party having a match fit with one or more of the current members of the set above a specified threshold).

At 1808, the matched requests are removed from the current set of requests being processed by the matchmaker 1510. At 1809 the next seeded match set is selected and the process returns to 1804 for additional matching. Although illustrated in FIG. 18 as a sequential process, it should be noted that multiple seeded match sets may be processed concurrently while still complying with the underlying principles of the invention.

Although described above as separate services, the matchmaker service 111 and the invitation service 112 may operate together to connect P2P users. For example, in one embodiment, a first user may invite one or more friends to an online session and request a match with one or more additional users (e.g., INVITE friend "Bob" and match 3 additional players for a multilayer video game). In such a case, the invitation service 112 may initially process the first user's invitation request to connect the first user and the first user's friend(s). The results of the invitation request (e.g., a successful P2P connection) may then be reported back to the user's mobile device. The matchmaking service 111 may then receive a match request from the first user's mobile device (or, in one embodiment, directly from the invitation service or from the first user's friends) requesting additional players. In response, the matchmaker service 111 may match the first user with one or more other match requests having the same MSI as the first user's request (as described above). The match request may include only the first user's matching criteria or may include the first user's and the first user's friend's matching criteria (e.g., NAT type, connection type, language, location, etc). In one embodiment, if one or more of the first user's friends cannot establish a direct P2P connection with another matched user, the matched user's connection with the first user's friends may by established through the first user's data processing device (e.g., using the first user's mobile device as a proxy for the connection) and/or the relay service may be used to connect the users (as described above).

In one embodiment, the first user may initially be matched with one or more users by the matchmaking service (as described above) and then the first user may invite one or more friends to join the online session with the first user and the matched users. In this embodiment, both the user's information and the matched users' information (e.g., NAT/connection data, user IDs, push tokens, etc) may be exchanged with the invited users through the invitation service (as described above). The underlying principles of the invention remain the same regardless of whether matching occurs first, followed by invitation or whether invitation occurs first, followed by matching.

Figure 19:
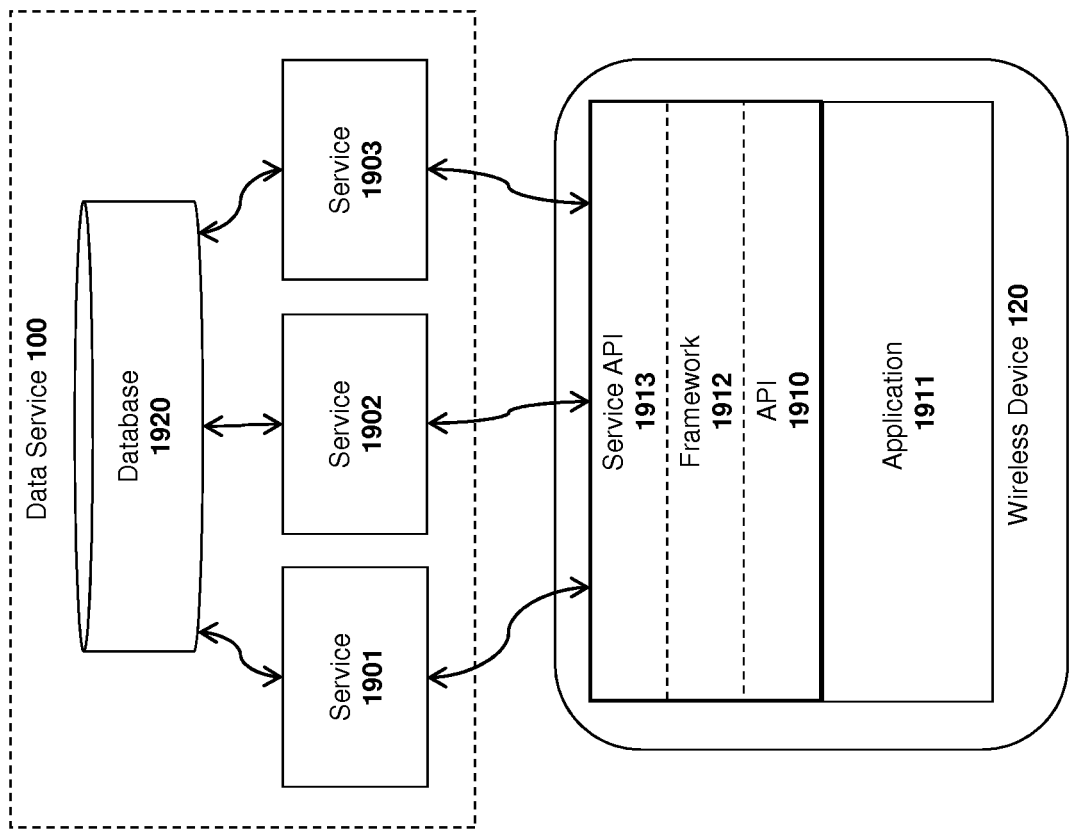
FIG. 19 illustrates a framework exposing an application programming interface (API) for applications and a service API for communicating with a set of services.

Application Framework with an Application Programming Interface for Collaborative Online Applications As illustrated in FIG. 19, one embodiment of the invention is implemented within the context of a mobile device 120 having a predefined software framework 1912 with an application programming interface ("API") 1910 for interfacing with one or more applications 1911 and a service-side API 1910 for communicating with a plurality of network services 1901-1903. As shown in FIG. 19, the network services 1901-1903 may be designed and/or managed by the same online data service 100 (although such a configuration is not required). Applications 1911 such as P2P gaming applications and other types of collaborative online applications may be designed to access the network services 1901-1903 through the API 1910 by making calls to the API 1910. The design of applications 1911 may be facilitated using a software development kid ("SDK") provided by the developer of the framework 1912 and the network services 1901-1903. A more specific implementation of the framework 1912 and APIs 1910, 1913 is described below with respect to FIG. 20.

As illustrated, each of the services may be provided with access to a database 1920 for storing data used by the services. One particular example is the database 1512 used by the matchmaker service 111 (described above). Other examples may include a leaderboard database for storing leaderboard data, a friend service database for storing friend state records, a profile database for storing user profile data and a games database for storing data related to online games. Any type of database may be used (e.g., MySQL, Microsoft SQL, etc) but in one particular embodiment, a key/value database such as Berkley DB and/or MZBasic DB can be used. The databases may be spread across a large number mass storage devices (e.g., hard drives) in a Storage Area Network (SAN) or other storage configuration.

Consequently, when a particular service processes and/or stores data as described above, the data may be stored within the database 1920. Some services, however, may not utilize a database. For example, as described above, the invitation service 112 may be implemented as a stateless service and, therefore, may not be required to store data within a database 1920 (although such an implementation is still possible in accordance with the underlying principles of the invention).

The API 1913 may be designed to communicate and exchange information with the network services 1901-1903 using any suitable network protocol stack including, for example, TCP/IP or UDP/IP at the network layer and HTTPS at the application layer. An remote procedure call (RPC)-based protocol over HTTP or HTTPS such as SOAP may be used and/or a Representational State Transfer (REST) protocol may be used. Moreover, the services may be implemented on any computing platform including, by way of example, Xserve or similar servers running Unix, Linux or an Apache software platform. In one particular embodiment, the platform includes Web objects implemented on Linux. The foregoing examples are provided merely for the purpose of illustration. The underlying principles of the invention are not limited to any particular mechanism for linking applications to services or any particular set of network protocols.

Figure 20:
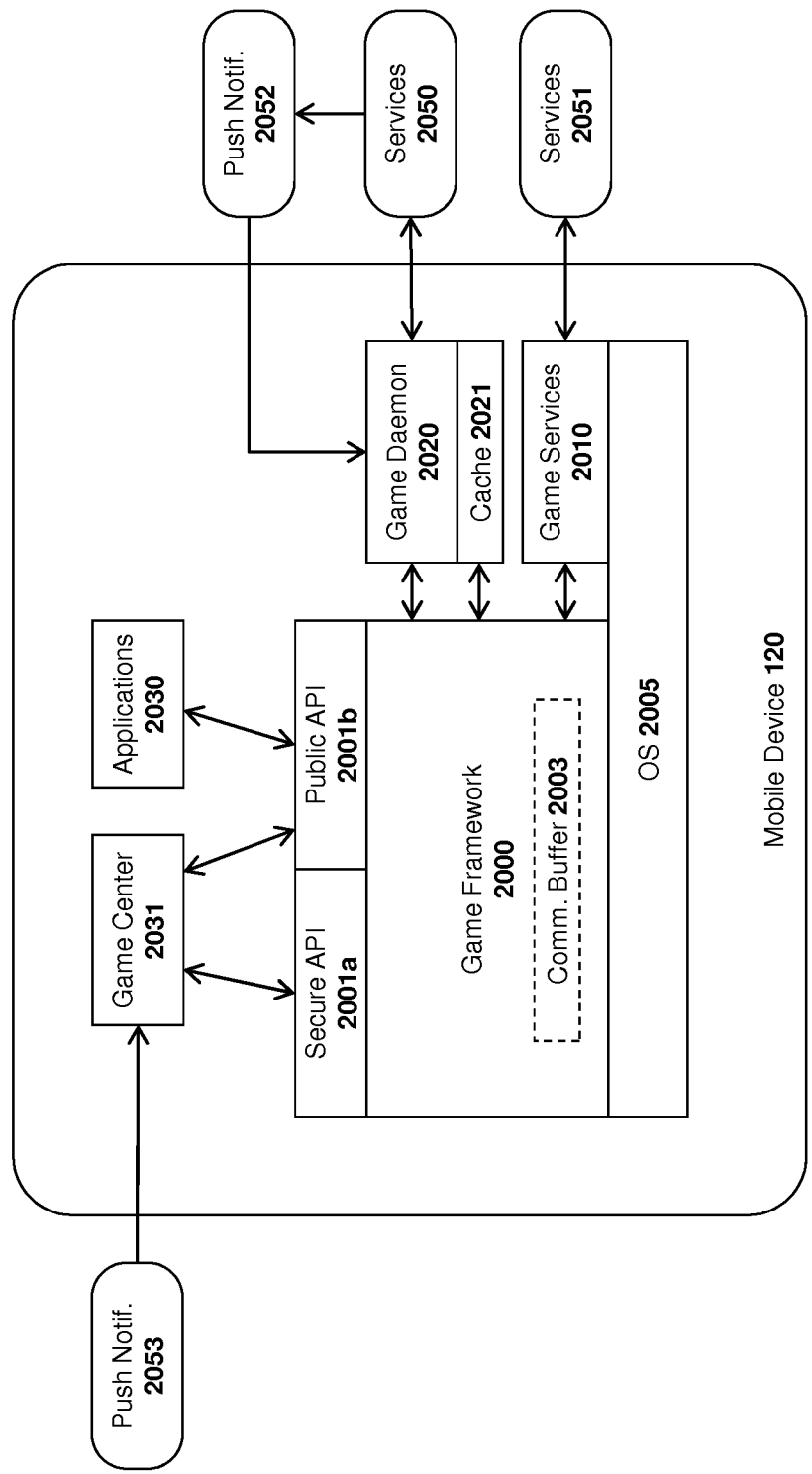
FIG. 20 illustrates one embodiment of a game framework with an API for applications, a game daemon and a game services module for communicating with services.

FIG. 20 illustrates a more detailed software architecture including application programming interfaces (APIs) 2001a-b which can be implemented on the wireless device 120 in one embodiment of the invention. Although this embodiment is described within the context of a multi-player game framework 2000, the underlying principles of the invention are not limited to a gaming implementation. For example, the software architecture shown in FIG. 20 may be used to support various collaborative applications which are not games (e.g., collaborative chat, multi-party collaborative audio/video, etc).

In the architecture shown in FIG. 20, a game framework 2000 is provided to support the various multi-party features and P2P features described herein. In one embodiment, the game framework 2000 is designed to run on the mobile device's operating system 2005. For example, if the mobile device 120 is an iPhone, iPad, or iPod Touch, the operating system 2005 can be the iPhone OS, a mobile operating system designed by the assignee of the present application.

The game framework 2000 can include a public application programming interface (API) 2001b and a private or "secure" API 2001a. In one embodiment, a game center application 2031 designed to provide various game-related features described herein can make calls to both the public API 2001b and the private API 2001a, whereas other applications 2030 (e.g., applications designed by third parties) are provided with access to only the public API 2001b. For example, the designer of the mobile device 120 may wish to keep certain API functions which involve potentially sensitive information out of the public API 2001b to avoid abuse by third party developers (e.g., friend requests, friends lists, etc). However, both the secure API 2001a and the public API 2001b may be merged into a single API accessible by all applications on the mobile device (i.e., the separation of the API into separate public and private components is not required for complying with the underlying principles of the invention). The designation "API 2001" is sometimes used below to refer to operations which may be found in either the public API 2001b and/or the private API 2001a.

One embodiment of the game center application 2031 is described in the co-pending application entitled Systems and Methods for Providing a Ser. No. 61/321,861, filed Apr. 7, 2010, having inventors Marcel Van Os and Mike Lampell (hereinafter "Game Center Patent Application"), which is assigned to the assignee of the present application and which are incorporated herein by reference. Briefly, the game center application 2031 includes a game-centric graphical user interface (GUI) for navigating through multi-player games; purchasing new games; retrieving information related to games (e.g., leaderboard information, achievements, friend information, etc); contacting friends to play games; requesting game matches with other users; and inviting specific users. Various other functions performed by the game center application 2031 are described in the Game Center Patent Application referenced above. Some of the game center functions may be provided by the game framework 2000 and made accessible to other applications 2030 through the public API 2001b.

In one embodiment, the API 2001 exposed by the game framework 2000 simplifies the process of designing multi-player, collaborative games for the mobile device 120. In particular, in one embodiment, the API 2001 allows developers to make a simple API call to invoke the relatively complex process of connecting users for a multi-player, P2P game session. For example, a simple API call such as INVITE (Player B ID, Bucket ID), may be invoked from the API 2001 to initiate the detailed invitation sequence described above. Similarly, an API call such as MATCH (Player A ID, Bucket ID) may be invoked from the API 2001 to initiate the detailed matchmaking sequence described above. The INVITE and MATCH functions are sometimes generally referred to herein as "P2P Connection Functions." In one embodiment, the game framework 2000 includes the program code required to manage the invitation and matchmaking operations in response to these API calls (as described in greater detail below). It should be noted that the actual API functions may have somewhat different data formats than those set forth above, (although they may result in the similar operations performed by the game framework 2000). The underlying principles of the invention are not limited to any particular format for specifying API functions.

Various other types of game-related transactions and information may also be managed by the game framework 2000 on behalf of the game center 2031 and other applications 2030. Some of this information is described in the Game Center Patent Application. By way of example and not limitation, this information may include "leaderboard" information related to those users who have achieved top scores for each game and "achievements" information identifying users who have completed certain game-specific achievements. Each application developer may specify their own set of "achievements" for each game application 2030 (e.g., completed levels 1-3; completed level 1 in under 5 minutes; over 50 kills per level; knocked down 20 flags; etc).

The game framework 2000 may also include program code for managing a user's friends data and for integrating the friends data within the context of the game center 2031 and other gaming applications 2030. For example, when the user selects a link to a particular game within the game center 2031, information related to each of the user's friends may be displayed for that game (e.g., the friends' ranking on the leaderboard, the friends' achievements, the results when the user played the game with each of his/her friends, etc). In one embodiment, the API 2001 of the game framework 2000 includes functions for accessing friends data managed by a friend service such as that described in the co-pending application entitled Apparatus and Method for Efficiently Managing Data in a Social Networking Service, Ser. No. 12/831, 888, filed Jul. 7, 2010, having inventors Amol Pattekar, Jeremy Werner, Patrick Gates, and Andrew H. Vyrros (hereinafter "Friend Service Application"), which is assigned to the assignee of the present application and which is incorporated herein by reference.

As illustrated in FIG. 20, in one embodiment, a game daemon 2020 may interface the game framework 2000 to a first set of services 2050 and a game services component 2010 may interface the game framework 2000 to a second set of services 2051. By way of example, the first set of services 2050 may include the invitation service 112, matchmaker service 111, and relay service 1051 described above and the friend service described in the Friend Service Application referenced above. Other services which may be accessed via the game daemon 2020 include a leaderboard service (providing leaderboard data); a game service (providing statistics and other data related to each of the games and the ability to purchase game); a user authentication service (for authenticating the user of the mobile device); and/or a user profile service (for storing user profile data such as user preferences). The second set of services 2051 accessed via the game services component 2010 may include the connection data exchange (CDX) service 110 and the NAT traversal services 290-291 described above. Although illustrated as separate components in FIG. 20 for the purpose of illustration, the game daemon 2020 and the game services module 2010 may actually be components of the game framework 2000. In one embodiment, the game daemon 2020 and 2010 communicate with each of the network services 2050-2051 through a pre-defined API which, in one embodiment, is a private API (i.e., not published to third party developers).

In one embodiment, the game daemon 2020 can communicate with the matchmaker service 111, invitation service 112, and other services 2050 using the HTTPS protocol while the game services module 2010 can communicate with the CDX service 110 and the NAT traversal services 290-291 using a relatively lightweight protocol such as UDP sockets. However, as previously mentioned, various other network protocols may be employed while still complying with the underlying principles of the invention.

In addition, as illustrated in FIG. 20, the game daemon 2020 may receive push notifications 2052 generated by certain services 2052 (e.g., the invitation service and matchmaker service) while other types of push notifications 2053 may be received directly by the game center (e.g., friend service notifications such as new friend requests). In one embodiment, these push notifications 2053 are provided directly to the game center 2031 to ensure that a user's sensitive data is not made accessible to applications 2030 designed by third party application developers.

Returning to the game invitation examples set forth above in FIG. 11, when an application 2030 on mobile device A makes an invitation call to the API 2001b of the game framework 2000 to invite a user of mobile device B (e.g., INVITE (Player B ID, Game/Bucket ID)), the game framework 2000 may pass the invitation request to the game daemon 2020 of mobile device A. The game daemon 2020 may then communicate with the invitation service 112 to submit the invitation request. The invitation service 112 can then use the push notification service 1050 (as described above) to push the invitation to the game daemon 2020 of mobile device B. The game daemon 2020 of mobile device B may then communicate with the game framework 2000 of mobile device B to determine whether the game for which the invitation was sent is installed on mobile device B. If so, then the game framework 2000 may trigger the application 2030 and/or generate a visual notification of the invitation. If the application is not installed, then the game framework 2000 may trigger a visual notification of the invitation to the user of mobile device B with an offer to purchase the game (e.g., via the game center 2031 GUI). Alternatively, the visual notification may be generated by a push notification daemon running on the mobile device 120 (not shown). If the user of mobile device B purchases the game, the invitation sequence may continue following the purchase. If user of mobile device B accepts the invitation request, then the game framework 2000 of mobile device B may pass the invitation request to its game daemon 2020 which can then respond to the invitation service 112.

Recall that in FIG. 11, the compatibility check 1106 determines that the NAT types of mobile devices A and B are compatible. Thus, at 1108, mobile device A's game daemon 2020 may receive mobile device B's acceptance (e.g., via push notification in the example) and, in one embodiment, passes the acceptance to the game framework 2000. At this stage, the game framework 2000 of mobile device A may either notify the requesting application 2030 that mobile device B has accepted (via the API 2001) or may wait to notify the requesting application 2030 until the devices have been successfully connected. In either case, the game framework 2000 may pass a connection request to the game services module 2010 which, in one embodiment, may initiate a connection data exchange with mobile device B. In particular, the game services module may transmit mobile device A's connection data to mobile device B using the CDX service 110 (see, e.g., transactions 1111 and 1112 in FIG. 11). As described above, this communication may be implemented as a UDP connection using a secure "ticket" data structure.

Recall that in FIG. 12, if the compatibility check 1106 determines that the NAT types of mobile devices A and B are not compatible then the relay service 1051 may be used to provide a connection between the devices. Consequently, the game daemon 2020 of mobile device B may receive a relay response 1203 from the invitation service (shown in FIG. 12) and the game daemon 2020 of mobile device A may receive a relay response 1205 from the invitation service (via the push notification service 1050). The game daemons 2020 of mobile devices A and B may communicate with the relay service at 1206 and 1207 to retrieve configuration data. At 1210, the game daemon 2020 of mobile device B receives relay update data from mobile device A and, at 1213, the game daemon 2020 of mobile device A receives relay update data from mobile device B.

The end result of the processes shown in FIGS. 11 and 12 is that mobile devices A and B have established a connection with one another (either a direct, P2P connection or a relay connection). In one embodiment, upon detecting a successful connection, the game framework 2000 may notify the application 2030 which requested the connection using an API call (e.g., CONNECTED (Player A ID, Player B ID)). Mobile devices A and B may then play the specified game or other collaborative application 2030 using the established connection.

Thus, in response to a relatively simply call from the API 2001 (e.g., INVITE Player B ID, Game/Bucket ID), a complex series of transactions may be managed by the game framework 2000 to establish a P2P or a relay connection between mobile devices A and B. In one embodiment, the game framework 2000 performs the sequence of operations to connect mobile devices A and B, and then provides the results to the requesting application 2030, thereby leaving the details of the API call transparent to the application designer. As such, the application designer is not required to understand how to connect mobile devices A and B on the network, or to perform various other functions required for enabling communication between the devices, thereby simplifying the application design process.

In a similar manner, the game framework 2000 can establish a match between mobile device A and other participants using the matchmaker service 111 as described above with respect to FIG. 2a-b. In this example, the application 2030 may make a simple call to the API 2001 such as MATCH (Player A ID, Game/Bundle ID). In response, the game framework 2000 can manage the matching and connection data exchange operations. When the matching operations and/or P2P connections are complete, the game framework 2000 provides the results back to the application 2030.

For example, in FIG. 2b, the game framework 2000 may use the game services module 2010 to communicate with the connection data exchange (CDX) service 110 and NAT traversal services 290-291 and may use the game daemon to communicate with the matchmaker service 111. Once a match has been made, the game daemon 2020 of mobile device A receives Ticket A at 229 and the game framework 2000 uses this information to implement a connection data exchange through the game services module 2010. For example, at 232, it may request its own connection data through the NAT traversal service 290 and may then exchange its connection data at 233-234 through the CDX service 110. At 237 and 240, the game services module 2010 of mobile device A receives connection data for mobile devices B and C, respectively. Following these exchanges, the game services module 2010 establishes P2P connections at 241 and the game framework 2000 notifies the application 2030 that the connection process is complete using an API notification (e.g., MATCH COMPLETE (Player B ID, Player C ID)). The application may then execute using the established P2P connection.

In some embodiments, the user may be given the option to play a game with other friends who are currently registered as "online." In this case, the notification that certain friends are online may be provided via the push notifications 2052 or push notifications 2053 (received directly by the game center 2031). The game center 2031 and/or applications 2030 may then provide the notifications to the user and provide the user the option to play with one or more selected online friends. It should be noted, however, that the invitation sequence described herein will work regardless of whether online notifications are provided. In one embodiment, the user's online status may be monitored by a service accessible by the game daemon 2020 (e.g., by the friend service mentioned above or by a separate "presence" service).

One embodiment of the game framework 2000 provides for a combination invitation/matchmaking operation in which a user may invite one or more friends to play a game with a group of unknown matched participants. For example, if a game requires 4 players and a first user invites a second user to play the game, then the invitation service 112 may initially connect the first user and second user and the matchmaking service 111 may then match the first user and second user with two (or more) other players. In this embodiment, the game framework 2000 may initially perform the invitation sequences described above to connect the first user and the second user. In one embodiment, once the first user and second user have been successfully connected, the game framework 2000 may implement the matchmaking sequences to identify and connect with the other users. A mentioned above, in one embodiment, the matching criteria applied by the matchmaking service may include both the first and second user (e.g., NAT types, connection types, language, etc, of both the first and second user). Alternatively, the criteria of one of the two users may be evaluated to make the matching decision.

Once all of the users are connected, the game framework 2000 may provide the connection results to the application 2030 which requested the connection via the API 2001. Once again, in response to a relatively simple API call by an application 2030, the game framework 2000 enters into a set of complex transactions to connect each of the devices. Once the devices have been successfully connected, the game framework 2000 provides the results back to the requesting application 2030.

As illustrated in FIG. 20, the game framework 2000 may include a communication buffer 2003 to temporarily store communication between the user and other game participants. The communication may include, for example, text, audio and/or video communication. The game framework 2000 can establish the buffer 2003 based on the requirements of each application 2030. For example, a relatively larger buffer 2003 may be required for audio/video communication with a slow network connection. In one embodiment, each application 2030 may make an explicit request to establish a communication buffer of a certain size via the API 2001 (e.g., using a BUFFER (size) command). Alternatively, the game framework 2000 may automatically create a buffer based on the communication requirements of each application. For example, the game framework 2000 may select a particular buffer size based on whether text, audio, and/or video need to be supported.

In one embodiment, the communication buffer 2003 may temporarily store communication streams before all of the P2P connections have been established between users. For example, after the invitation service 112 or matchmaker service 111 has identified each of the users but before the CDX service 110 has completed the connection data exchange operations, each user may be notified of the other game participants in the process of being connected. At this stage the user of the mobile device 120 may transmit text, audio and/or video communication streams to the other participants. The game framework 2000 will store the communication streams within the communication buffer 2003 for those participants who are not yet connected. The game framework 2000 may then transmit the text, audio and/or video from the buffer 2003 as the connection for each device is completed.

In one embodiment, the game daemon 2020 includes a cache 2021 for caching data persisted on each of the services 2050 to reduce the network traffic. For example, the user's friends list, leaderboard data, achievements data, presence data, and profile data may be stored in the cache 2021 as specified by a cache management policy. In one embodiment, the cache management policy is driven by each individual service on which the data is stored. Consequently, for n different services, n different cache management policies may be applied to the cache 2021. In addition, because the cache management policy is driven by the services, it may be modified dynamically based on current network and/or server load conditions. For example, during periods of time when a service is heavily loaded (e.g., Christmas, the day of a new product release, etc.), the service may dynamically specify a cache management policy with relatively infrequent cache updates (e.g., updates every 12 hours). By contrast, during periods of time when a service is not heavily loaded, the service may specify a caching policy with more frequent cache updates (e.g., updates every ½ hour, hour, 2 hours, etc).

In one embodiment, the cache management policy is specified using a time-to-live (TTL) value for certain data records stored in the cache 2021. When a data record has been stored in the cache past its TTL value, then that data is considered "stale" and a local request for that data may be forwarded directly to the service associated with that data. In one embodiment, the request includes an ID code identifying a current version of the data. If the ID code matches the ID code on the service, then the data is still valid and does not need to be updated. A response may then be sent back from the service indicating that the data in the cache is current and the TTL value for the data record may be reset.

In addition to using a cache management policy as described above, in one embodiment, cache updates for certain types of data may be pushed to the mobile device using the push notification service 1050. For example, changes to a user's friends list or to the current online status of the user's friends may be dynamically pushed to the user's mobile device 120. The push notification may be received by the game daemon 2020 which may then update the cache 2021 to include the relevant portion of the data pushed by the service (i.e., an update all of the data in the cache associated with that service may not be required). By contrast, some push notifications may instruct the game daemon 2020 to overwrite the entire contents of cache (or at least the portion of the cache associated with the service performing the push).

Those services which utilize push to update the cache 2021 may choose relatively high TTL values (and/or may not set TTL values) because they have the ability to push notifications to update data stored in the cache 2021. In one embodiment, each service specifies a set of events which may trigger a push notification cache update. For example, cache update events may include a change to a friend's online status, a new friend request, an acceptance of a friend request, a de-friend operation, an indication that a friend is playing a particular game, a game achievement reached by a friend, an update to the top 10 of a particular leaderboard, or any other events deemed to be of sufficient importance to warrant a cache update. Using push notifications to update the cache 2021 in this manner may decrease network and service load because, with push updates, periodic polling between the mobile device and the service is not required.

One embodiment of the game framework 2000 uniquely formats data presented to the end user based on the country and/or geographical location of the user. For example, values such as current date, time and monetary values may be presented differently for users in different countries and locations. By way of example, in the United States the date format may be [month day, year] (e.g., Apr. 25, 2010) whereas in other countries, the date format may be [day month, year] (e.g., 25 Apr. 2010). Similarly, when representing time in the US and some other countries the AM/PM designation may be used and a colon may be used between hours and minutes (e.g., 3:00 PM). By contrast, many other countries do not use the AM/PM designation and/or use a comma between hours and minutes (e.g., 15,00). As another example, many parts of the world use the metric system while some parts of the world do not (e.g., the United States). It should be noted that these are simply illustrative examples which may be used by certain embodiments of the invention. The underlying principles of the invention are not limited to any particular set of data formats.

In one embodiment, these different data formats may be selected when displaying leaderboard data, achievements data, friends data, and/or any other data processed by the game framework 2000. The game framework 2000 may determine the country and/or geographical location of the user in various ways. For example, in one embodiment, this information is simply provided in the user's profile data and/or may be determined based on the user's cellular service provider. The user's location may also be determined using, for example, Global Positioning System (GPS) tracking.

Other types of data formatting which are unrelated to geographical location and/or country may also be managed by the game framework 2000. For example, when displaying leaderboard data, it is important to know whether the lowest score should place the user at the top or bottom of the leaderboard. For some games (e.g., golf, track, racing, skiing, etc), a lower number indicates a better performance whereas in other games (e.g., football, baseball, etc), a higher number indicates a better performance. Thus, in one embodiment, the application 2030 specifies the type of score which will be used via the API 2001 (e.g., "ascending" or "descending"). The game framework 2000 may then use the appropriate set of labels and formatting for displaying the score.

One embodiment of the game framework 2000 also filters user data based on the relationship between the user and the user's friends. For example, one embodiment of the invention allows for a "detailed" view, a "friends" view, and a "public" view. In one embodiment, the detailed view is available to the user who owns the data (i.e., the user's personal information); the friends view is available to the user's friends; and the public view is available to all other users.

By way of example, the public view may simply include an "alias" name associated with each user, the games played by the alias and associated scores, and the dates/times on which the games were played. This information may be used by the game framework 2000 to populate a public leaderboard which may then be displayed via the game center 2031.

The friends view may include all of the information from the general view as well as any additional information to be shared among the user's friends including, for example, the games owned by the user; the games played by the user; the user's achievements and scores; how many friends the user has; the identify of those friends; URL identifying the user's avatars, and/or the user's online status, to name a few. In one embodiment, the "friends" view provides a default set of information to be shared with friends but the end user may adjust this default configuration and specify with particularity the types of information to be shared by each individual friend or groups of friends (e.g., co-workers, family members, college/high school friends, etc).

The "detailed" view may include all of the information from the "public" and "friend" views as well as any other information managed by the various services 2050 on behalf of the end user. By way of example, this may include all of the user's profile data; the user's Universally Unique Identifier ("UUID") (sometimes referred to herein as the "Player ID"); player name; alias names; number of games and the identity of the games; the user's friends; all of the user's achievements, etc.

In some circumstances, an application 2030 may only require a small amount of information related to each user such as each user's Player ID. For example, in one embodiment, when a match is requested, the game framework 2000 may initially only require each player's ID. As matches are made by the matchmaker service (see above), the game framework 2000 may determine whether any of the matched users are friends (e.g., via communication with the friend service and/or by interrogating the user's local friend data). If so, then the game framework 2000 may retrieve additional user data and provide that data to any matched friends. In this way, the game framework 2000 filters information based on the identity of the users and the relationship between each of the users.

In one embodiment, the game framework 2000 initially provides a public view between a first user and a second user if the two users do not have a friend relationship. However, in one embodiment, the game framework 2000 allows the first user to send a friend request to the second user (e.g., using the second user's alias). If the friend request is accepted, then the game framework 2000 will provide additional information to each of the users (e.g., the default "friend" view).

Different API Embodiments

The API implemented in one embodiment, is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 21:
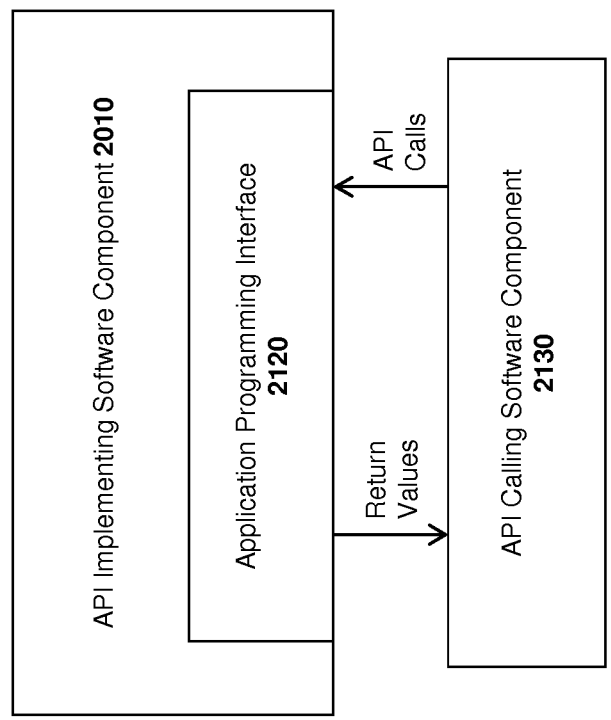
FIG. 21 illustrates one embodiment of an API implementing software component and an API calling software component.

FIG. 21 illustrates one embodiment of an API architecture which includes an API implementing software component 2110 (e.g., an operating system, a library, a device driver, an API, an application program, or other software module) that implements the API 2120. The API 2120 specifies one or more functions, methods, classes, objects, protocols, data structures, formats and/or other features of the API implementing software component that may be used by the API calling software component 2130. The API 2120 can specify at least one calling convention that specifies how a function in the API implementing software component receives parameters from the API calling software component and how the function returns a result to the API calling software component. The API calling software component 2130 (e.g., an operating system, a library, a device driver, an API, an application program, or other software module), makes API calls through the API 2120 to access and use the features of the API implementing software component 2110 that are specified by the API 2120. The API implementing software component 2110 may return a value through the API 2120 to the API calling software component 2130 in response to an API call.

It will be appreciated that the API implementing software component 2110 may include additional functions, methods, classes, data structures, and/or other features that are not specified through the API 2120 and are not available to the API calling software component 2130. It should be understood that the API calling software component 2130 may be on the same system as the API implementing software component 2110 or may be located remotely and accesses the API implementing software component 2110 using the API 2120 over a network. While FIG. 21 illustrates a single API calling software component 2130 interacting with the API 2120, it should be understood that other API calling software components, which may be written in different languages (or the same language) than the API calling software component 2130, may use the API 2120.

The API implementing software component 2110, the API 2120, and the API calling software component 2130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 22:
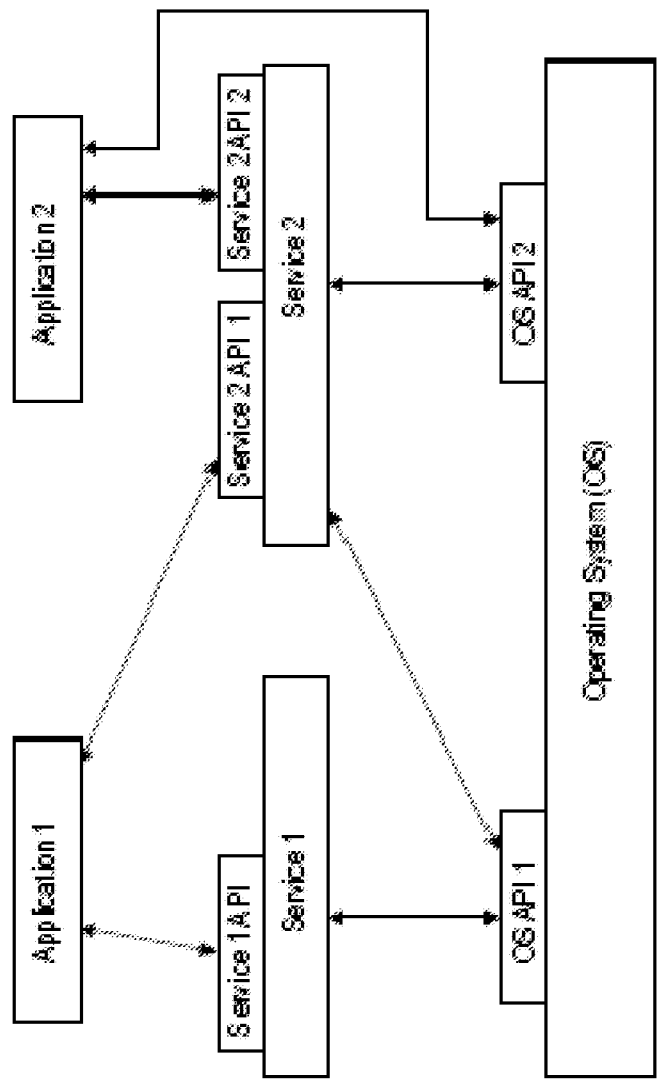
FIG. 22 illustrates one embodiment in which API calls are made between operating systems, services, and applications.

In FIG. 22 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 23:
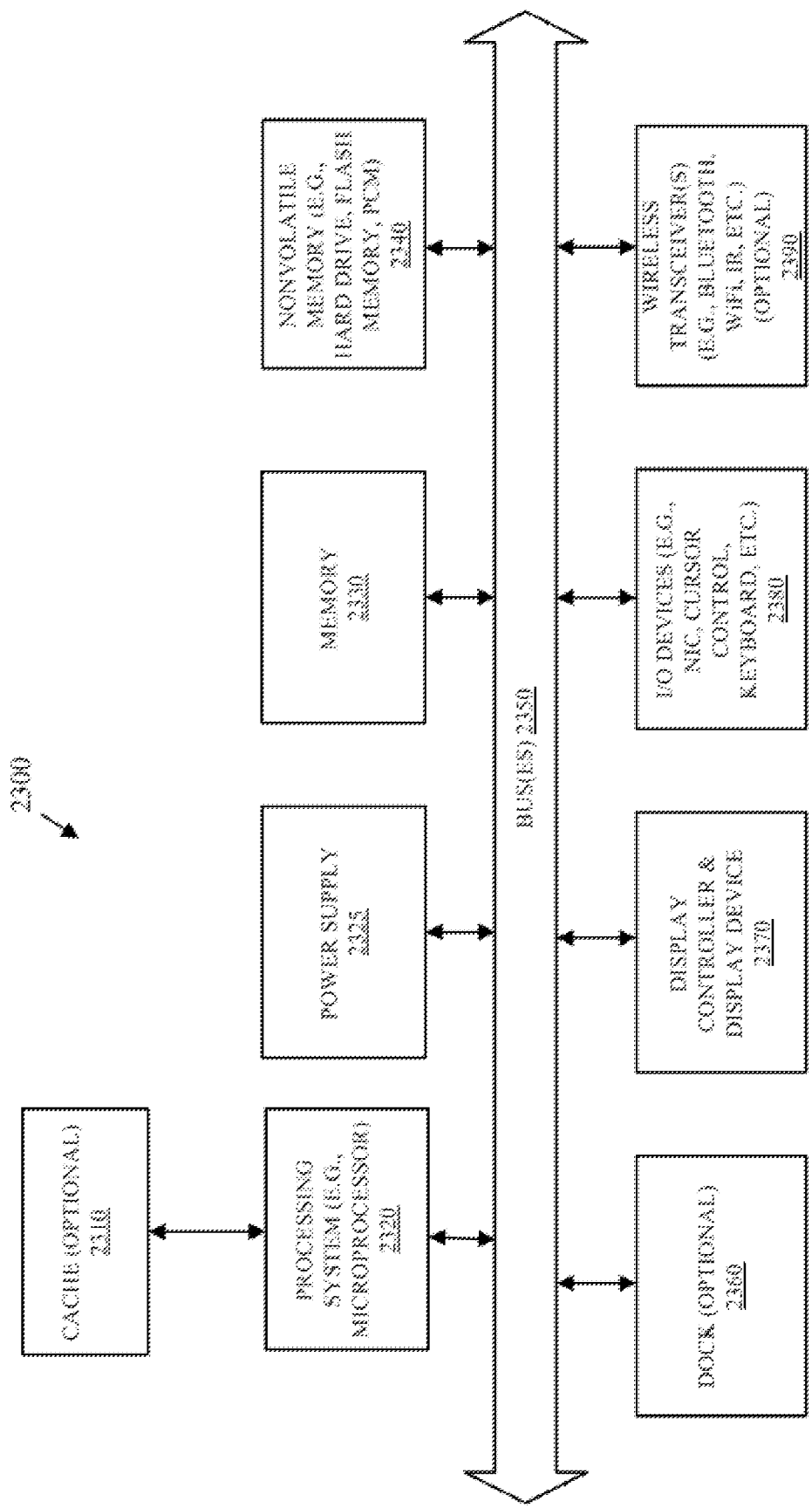
FIG. 23 illustrates one embodiment of an exemplary computer system architecture.

FIG. 23 is a block diagram illustrating an exemplary computer system which may be used in some embodiments of the invention. It should be understood that while FIG. 23 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 23, the computer system 2300, which is a form of a data processing system, includes the bus(es) 2350 which is coupled with the processing system 2320, power supply 2325, memory 2330, and the nonvolatile memory 2340 (e.g., a hard drive, flash memory, Phase-Change Memory (PCM), etc.). The bus(es) 2350 may be connected to each other through various bridges, controllers, and/or adapters as is well known in the art. The processing system 2320 may retrieve instruction(s) from the memory 2330 and/or the nonvolatile memory 2340, and execute the instructions to perform operations as described above. The bus 2350 interconnects the above components together and also interconnects those components to the optional dock 2360, the display controller & display device 2370, Input/Output devices 2380 (e.g., NIC (Network Interface Card), a cursor control (e.g., mouse, touchscreen, touchpad, etc.), a keyboard, etc.), and the optional wireless transceiver(s) 2390 (e.g., Bluetooth, WiFi, Infrared, etc.).

Figure 24:
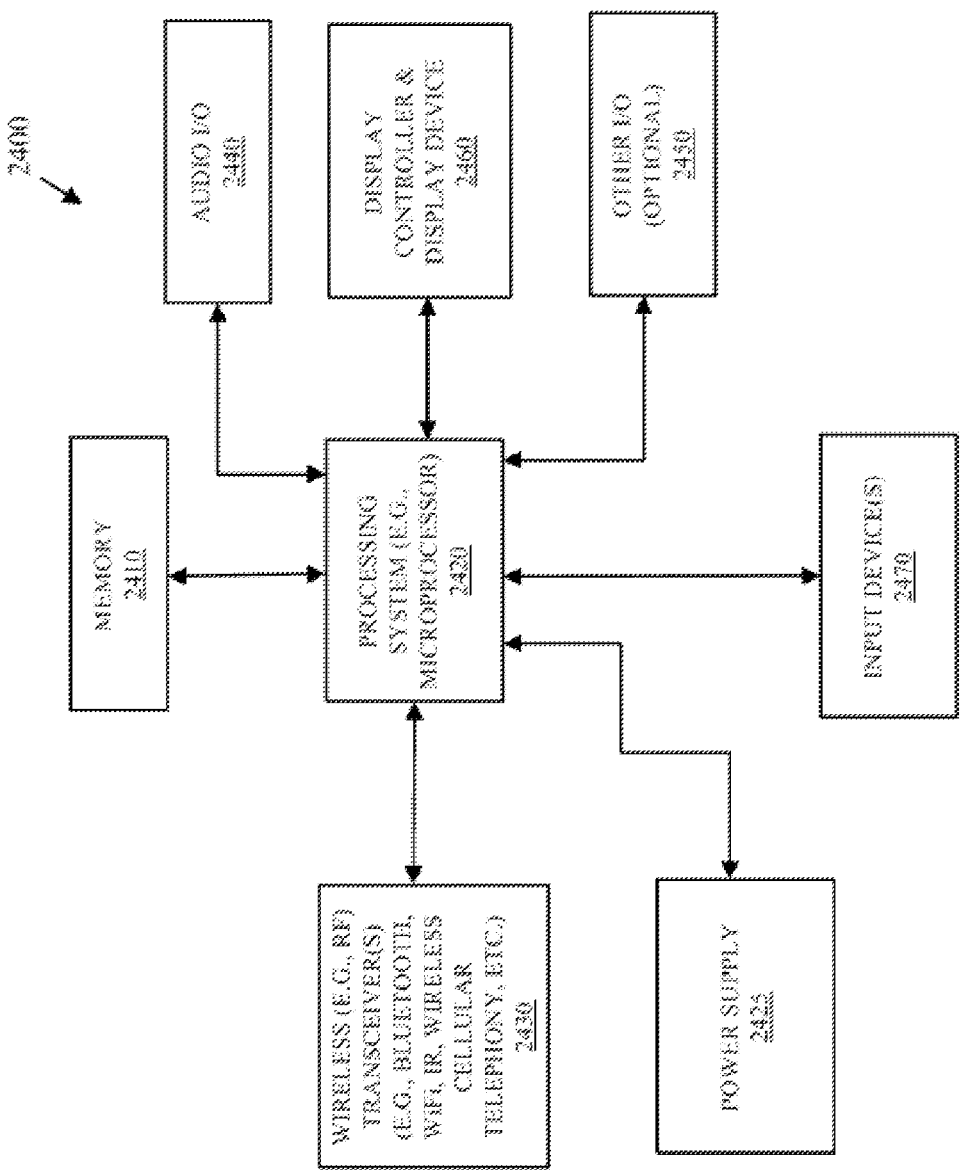
FIG. 24 illustrates another embodiment of an exemplary computer system architecture.

FIG. 24 is a block diagram illustrating an exemplary data processing system which may be used in some embodiments of the invention. For example, the data processing system 2400 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 2400 may be a network computer or an embedded processing device within another device.

According to one embodiment of the invention, the exemplary architecture of the data processing system 2400 may used for the mobile devices described above. The data processing system 2400 includes the processing system 2420, which may include one or more microprocessors and/or a system on an integrated circuit. The processing system 2420 is coupled with a memory 2410, a power supply 2425 (which includes one or more batteries) an audio input/output 2440, a display controller and display device 2460, optional input/output 2450, input device(s) 2470, and wireless transceiver(s) 2430. It will be appreciated that additional components, not shown in FIG. 24, may also be a part of the data processing system 2400 in certain embodiments of the invention, and in certain embodiments of the invention fewer components than shown in FIG. 24 may be used. In addition, it will be appreciated that one or more buses, not shown in FIG. 24, may be used to interconnect the various components as is well known in the art.

The memory 2410 may store data and/or programs for execution by the data processing system 2400. The audio input/output 2440 may include a microphone and/or a speaker to, for example, play music and/or provide telephony functionality through the speaker and microphone. The display controller and display device 2460 may include a graphical user interface (GUI). The wireless (e.g., RF) transceivers 2430 (e.g., a WiFi transceiver, an infrared transceiver, a Bluetooth transceiver, a wireless cellular telephony transceiver, etc.) may be used to communicate with other data processing systems. The one or more input devices 2470 allow a user to provide input to the system. These input devices may be a keypad, keyboard, touch panel, multi touch panel, etc. The optional other input/output 2450 may be a connector for a dock.

Embodiments for Managing P2P Connections Across Different Service Providers

In one embodiment of the invention, the architectures described above are extended to allow peers at different service providers to establish peer-to-peer (P2P) connections such as real-time audio, video, and/or chat connections. Because the different service providers may utilize their own protocols and their own client ID namespaces, these embodiments of the invention provide techniques to allow devices to interoperate regardless of the protocols used and to integrate the namespaces into a single, global namespace.

A global database may be maintained to track a global namespace of all users on all systems. However, given the vast number of users spread across service providers, a global database approach might be difficult to manage. Alternatively, names used to identity users and/or data processing devices (e.g., user IDs, phone numbers) may be broadcast to all other service providers to identify who can respond to the requested connection. Once again, however, such a system would not scale well (i.e., sending a broadcast message for each attempted connection would consume a significant amount of bandwidth).

Figure 25:
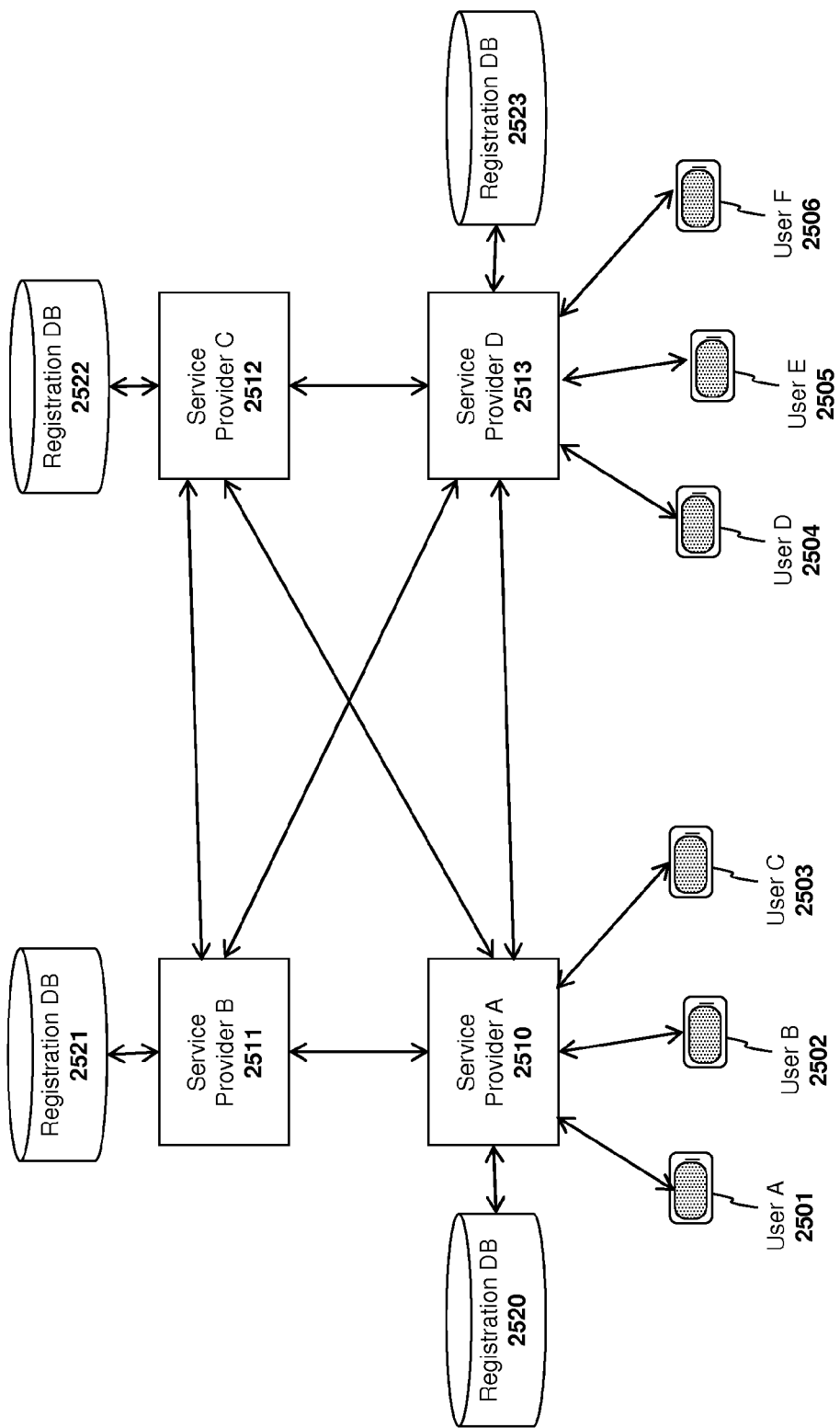
FIG. 25 illustrates a plurality of users connected through a plurality of different service providers.

To address the foregoing issues, one embodiment of the invention uses Bloom filters to locate relevant service providers during connection attempts. This embodiment will be described with respect to the architectures shown in FIGS. 25-26. Four service providers are illustrated in FIG. 25—service provider A 2510, service provider B 2511, service provider C 2512 and service provider D 2513. As in prior embodiments, each service provider manages a registration database 2520-2523 containing user IDs and/or telephone numbers of a set of users who are provided with data communication service from the service provider. By way of example, in FIG. 25, users A-C 2501-2503 are provided with service from service provider A 2510 and users D-F are provided with service from service provider D 2513. As previously described, in one embodiment, the registration databases 2520-2523 map phone numbers or user IDs to a push token of each user's data processing device. Thus, servers maintained by the service providers enable the users of a particular service provider to locate and establish peer-to-peer (P2P) connections with one another using the techniques described above (see, e.g., FIGS. 10-14 and associated text). As one example, the servers maintained by the service providers allow user to establish audio/video chat sessions with one another such as FaceTime™ Chat sessions (a technology designed by the assignee of the present patent application).

Figure 26:
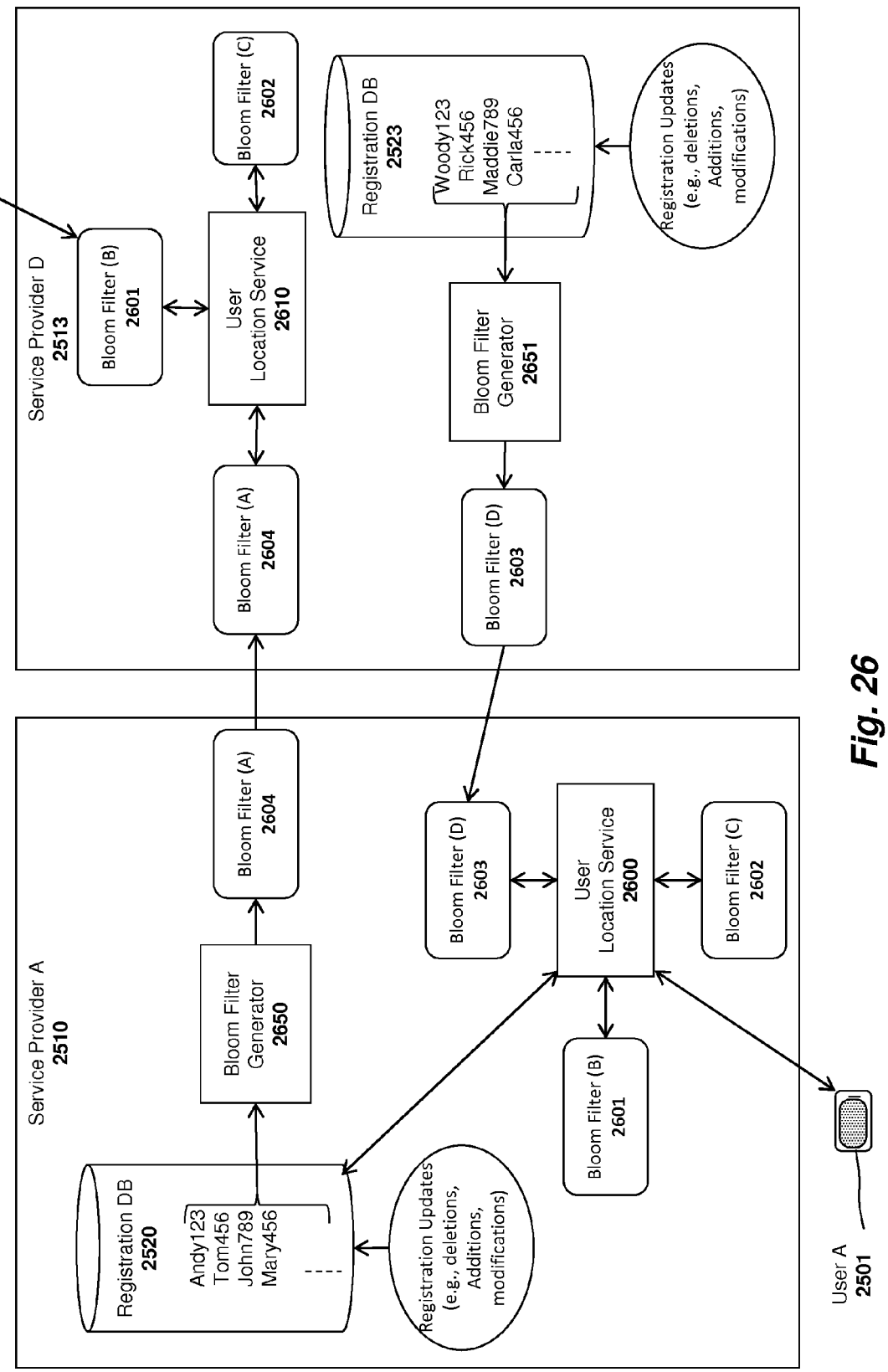
FIG. 26 illustrates an embodiment of the invention which employs bloom filters for identifying the location of users

In addition to enabling P2P connections between a service provider's own users, the embodiments illustrated in FIGS. 25 and 26 enable users of different service providers to establish P2P connections with one another. In particular, as shown in FIG. 26, each service provider includes a user location service 2600, 2610 for initially querying the service provider's registration database 2520, 2523 to determine if a particular user is managed by the service provider. (Only two service providers (providers A and D) are illustrated in FIG. 26 for simplicity.) If user A 2501 requests a P2P connection with another user managed by the same service provider—e.g., user B 2502—the user location service 2600 of service provider A will identify user B from the registration database, and send the connection request to user B (e.g., with user B's push token retrieved from the registration database 2520).

If, however, user A requests a P2P connection with a user managed by a different service provider—e.g., user F 2506—then the location service 2600 of service provider A 2510 will attempt to locate user F at a different service provider using the bloom filters 2601-2603 received from each of the other service providers. In particular, as illustrated in FIG. 26, each service provider includes a bloom filter generator 2650, 2651 for generating a bloom filter based the current contents of its registration database 2520, 2523. As is known by those of skill in the art, a bloom filter is a is a space-efficient probabilistic data structure that is used to test whether an element is a member of a set. False positives are possible, but false negatives are not. In the embodiments described herein, the "elements" used to generate each bloom filter are the User ID's and/or phone numbers of each user. In FIG. 26, for example, the bloom filter generator 2650 of service provider A 2510 uses all of it's User IDs (Andy124, Tom4546, etc) to generate its bloom filter 2604. Similarly, bloom filter generator 2651 of service provider D 2513 uses all of the user IDs in its registration database (Woody1234, Rick456, etc) to generate its bloom filter 2603. In one embodiment, each service provider generates its own bloom filter in this manner and periodically transmits the bloom filter to all other service providers. Each service provider may then use the bloom filters received from the other service providers to test and determine whether particular user is managed by the other service providers.

By way of example, in FIG. 26, if user A 2501 with a user ID of Andy 123 attempts to establish a P2P session (e.g., a personal audio/video chat) with user F 2506 with a user ID of Woody123, then the user location service 2600 of service provider A 2510 may initially attempt to locate user F's user name, Woody123, in its own registration database 2520. If unsuccessful, in one embodiment, it will query the bloom filters 2601-2603 of the other service providers an attempt to locate the service provider which manages the User ID "Woody123." As mentioned, bloom filters may provide false positives but will not provide false negatives. Thus, if the bloom filter indicates that service providers B and C do not manage Woody123, then service provider A will know definitively that Woody123 is not managed by these service providers. In the illustrated example, the bloom filter query indicates that Woody123 may be managed by Service Provider D, and may also indicate that Woody123 is managed by one or more other service providers. As such, in one embodiment, service provider A will send an initiate message (e.g., an INVITE command inviting user F to a P2P session) to each of the service providers who potentially manage this user ID. The service providers which do, in fact, manage this user ID, will respond to service provider A in the affirmative. Once the correct service provider has identified itself—service provider D in the example—the two service providers may then act as proxies for their respective users (Users A and F in the example) and to open a communication channel between the users. Once users A and F have exchanged connection data, they may open direct, P2P communication channels with one another (e.g., by exchanging using the techniques described above with respect to FIG. 11 and/or implementing a standard Internet Connectivity Establishment ("ICE") transaction). Alternatively, if a direct P2P connection is infeasible (e.g., because of incompatible NAT types), then users A and F may open a relay connection using the relay service 1051 illustrated in FIG. 13 (see also FIG. 12 and associated text).

In one embodiment, each service provider is expected to continually update its own bloom filter and transmit the bloom filter to each of the other service providers participating to support P2P audio/video connections. The updates may occur at regular intervals (e.g., once every hour, day, etc) and/or after a certain number of new User IDs have been added to the registration database. The underlying principles of the invention are not limited to any particular mechanism for exchanging bloom filters between service providers.

Figure 27:
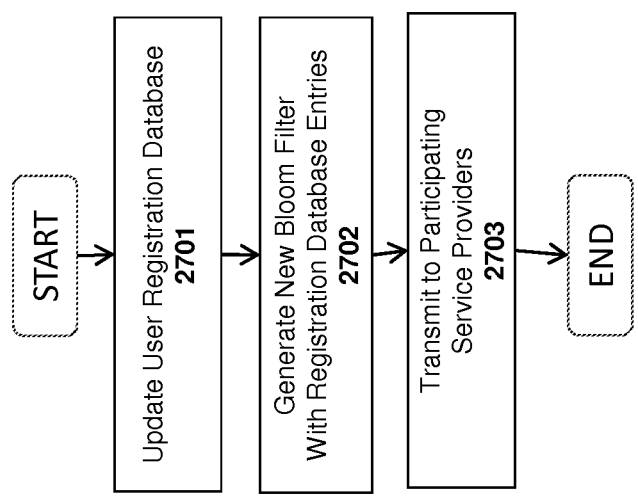
FIG. 27 illustrates one embodiment of a method for using bloom filters.
Figure 28:
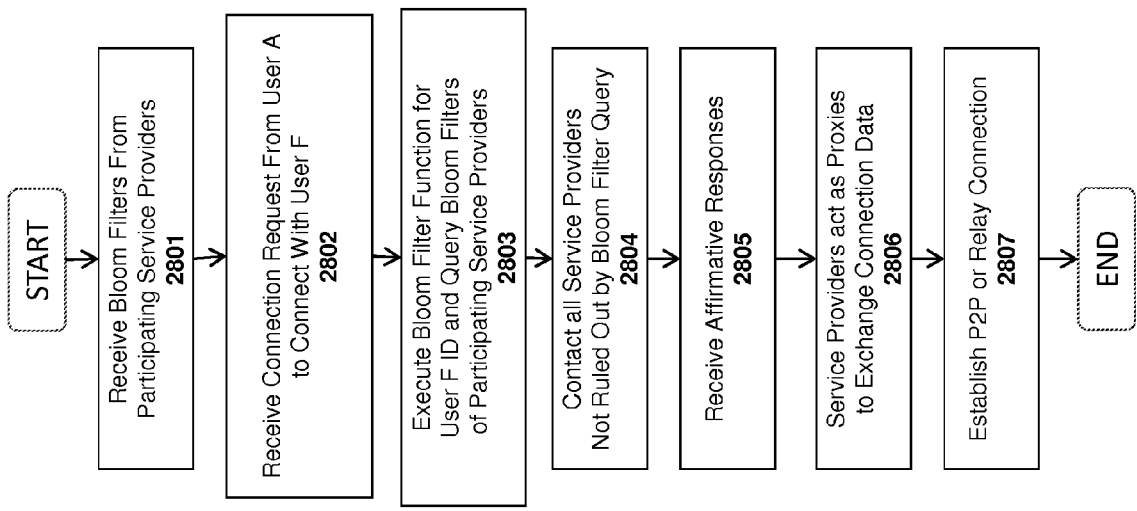
FIG. 28 illustrates another embodiment of a method for using bloom filters.

One embodiment of a method for generating and updating bloom filters is illustrated in FIG. 27. The method may be executed on the architecture shown in FIGS. 25-26, but is not limited to any particular system architecture. At 2701, the user registration database at a particular service provider is updated. For example, new User IDs/phone numbers may be added and old User IDs/phone numbers may be deleted. At 2702, a new bloom filter is generated using the complete set of User IDs/phone numbers. At 2703, the new bloom filter is transmitted to participating service providers.

One embodiment of a method for using a bloom filter to locate a service provider for a client is illustrated in FIG. 27. The method may be executed on the architecture shown in FIGS. 25-26, but is not limited to any particular system architecture. At 2801, the bloom filters of a group of participating service providers are received. The bloom filters may be stored in a volatile memory for efficient access and/or persisted to a non-volatile storage location. At 2802, a connection request is received from a user (User A in the example) to establish a P2P connection with another user (User F). At 2803, a bloom filter function is executed on the user ID of User F (e.g., Woody123 from the example above) to rule out certain service providers. If the bloom filter function returns a negative result for a particular bloom filter, then User F is not managed by that particular bloom filter. However, if a positive result is returned for a bloom filter, then there is a reasonable chance that the service provider associated with the bloom filter manages User F. If only one positive result is returned, then at 2804, a connection invitation is transmitted to that service provider. If multiple positive results are returned, then at 2804, a separate connection invitation may be transmitted to each relevant service provider.

The service provider at which User F has a registration then responds in the affirmative, and the two service providers may act as proxies at 2806 to permit the users to exchange connection data, as described above (e.g., push tokens, public/private network addresses/ports, NAT types, etc). If more than one service provider responds in the affirmative (meaning that two service providers support users with the same User ID), then additional steps may be taken to identify the correct user (e.g., comparing the phone numbers, real names, network addresses or other information known about the user with whom a connection is desired).

Once the correct service provider for User F has been identified, and the necessary connection data exchanged, then at 2807, a direct P2P connection or a relay connection (if necessary) is established between User A and User F, as described above.

Figure 29:
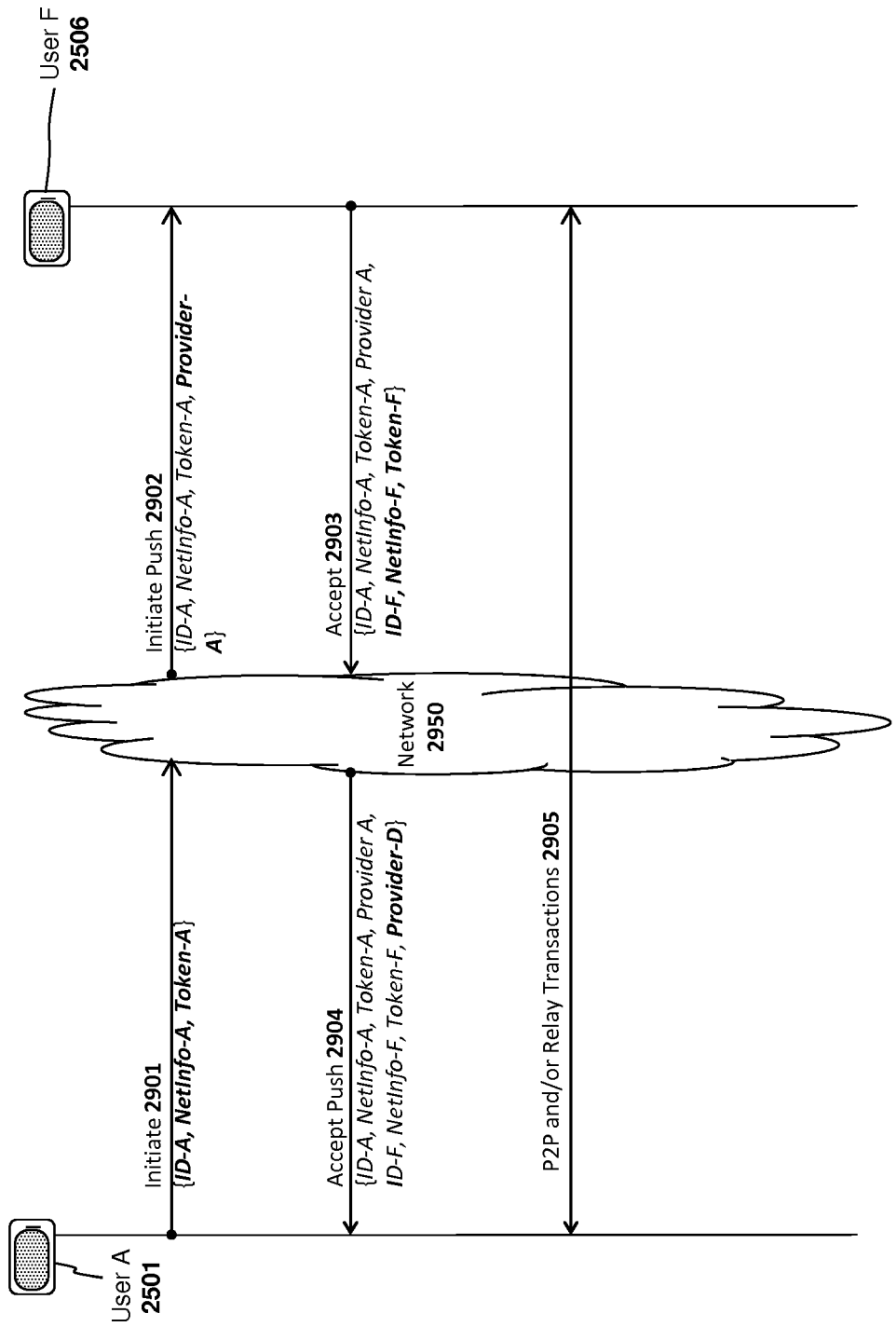
FIG. 29 illustrates two users establishing a point to point (P2P) connection in accordance with one embodiment of the invention.

As mentioned above with respect to FIGS. 11-12, in some embodiments of the invention, the various servers used to establish a P2P connection between two (or more) users do not need to maintain any connection state information during the connection process. This includes, for example, the invitation service 112 and the connection data exchange service 110. Rather, in these embodiments, the complete connection state including, but not limited to, public/private IP and port (sometimes referred to generally as network information), NAT type, user IDs, push tokens, etc) is accumulated and transmitted with each successive user transaction. As illustrated in FIG. 29, one additional piece of state information in a multi-provider context which is transmitted with each transaction is a provider ID code.

Turning to the specific details of FIG. 29, User A transmits an initiate request 2901 (sometimes referred to herein as an "invitation" request) which includes its own network ID (ID-A), it's own network information (e.g., public/private IP/port data, NAT type, etc) determined using the techniques described above, its own push token (Token-A), and an ID code, phone number and/or other type of identifier for User F. The initiate request is initially received by User A's service provider which may implement any of the techniques described above with respect to FIGS. 25-28 to locate the service provider of User F (e.g., using a bloom filter to rule out certain service providers). (User A's and User F's service providers are not illustrated in FIG. 29 for simplicity.)

In one embodiment, once User F's service provider is identified, an initiate push operation 2902 is transmitted from User F's service provider to User F which includes an identifier for User A's service provider—"Provider A" in the example. The identifier for Provider A may be as simple as an N-bit identification code (e.g., 16-bit, 32-bit, 64-bit, etc). Alternatively, the identifier for Provider A may include a public IP address identifying Provider A's network gateway or other networking data needed to connect to Provider D. The underlying principles of the invention remain the same regardless of the format used to identity Provider A with the sequence of P2P connection transactions.

In one embodiment, the push transaction 2902 is generated by a push notification service such as push notification service 1050 discussed above (see, e.g., FIG. 11 and associated text). As mentioned, all of the original state information provided by User A and any additional state information collected by servers of service provider A is included in the initiate push transaction 2902.

In the example shown in FIG. 29, User F responds with an Accept transaction 2903 containing all of the prior state information (ID-A, NetInfo-A, Provider A) along with User F's information needed to establish a P2P connection including, by way of example and not limitation, User F's ID, (ID-F), User F's network information (NetInfo-F; which may include public/private IP address/port, NAT type, etc), and User F's token (Token-F). All of the connection state information for User A and User F is received by User F's service provider ("Provider D" in the example) which attaches it's own provider ID code to the transaction (Provider-D) and forwards it to User A's service provider. As described above for Provider A, the identifier for Provider D may be as simple as an N-bit identification code. Alternatively, the identifier for Provider D may include a public IP address identifying Provider D's network gateway or other networking data required to connect to Provider D. The underlying principles of the invention remain the same regardless of the format used to identity Provider D within the sequence of P2P connection transactions.

Once all of the connection state data is received by User A (including the Provider-D data), User A and User F may establish a P2P connection using the techniques described above, as indicated by transaction 2905.

Figure 30:
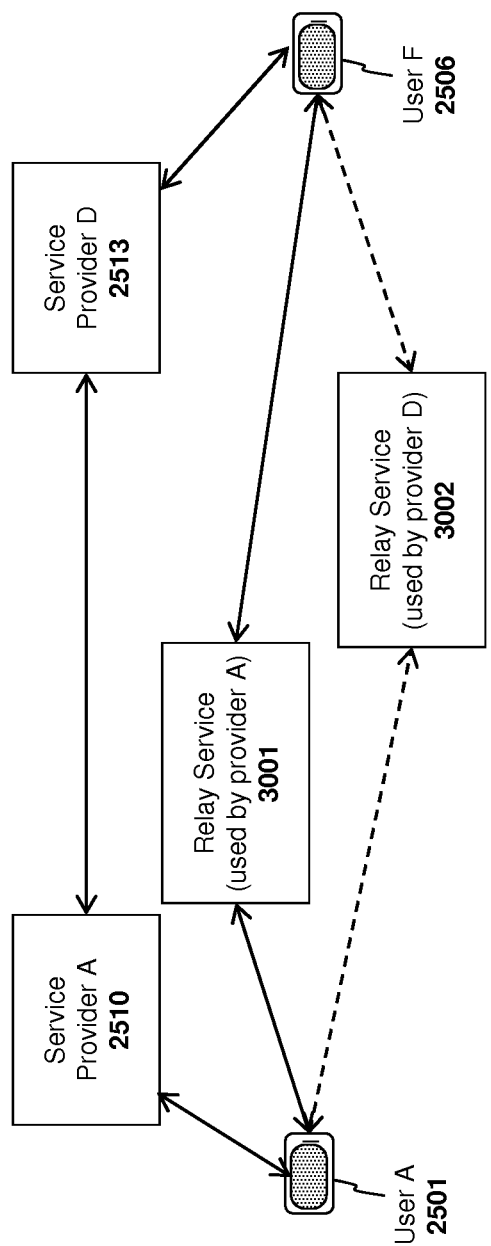
FIG. 30 illustrates two users establishing a P2P connection through a relay service used by a particular service provider.
Figure 31:
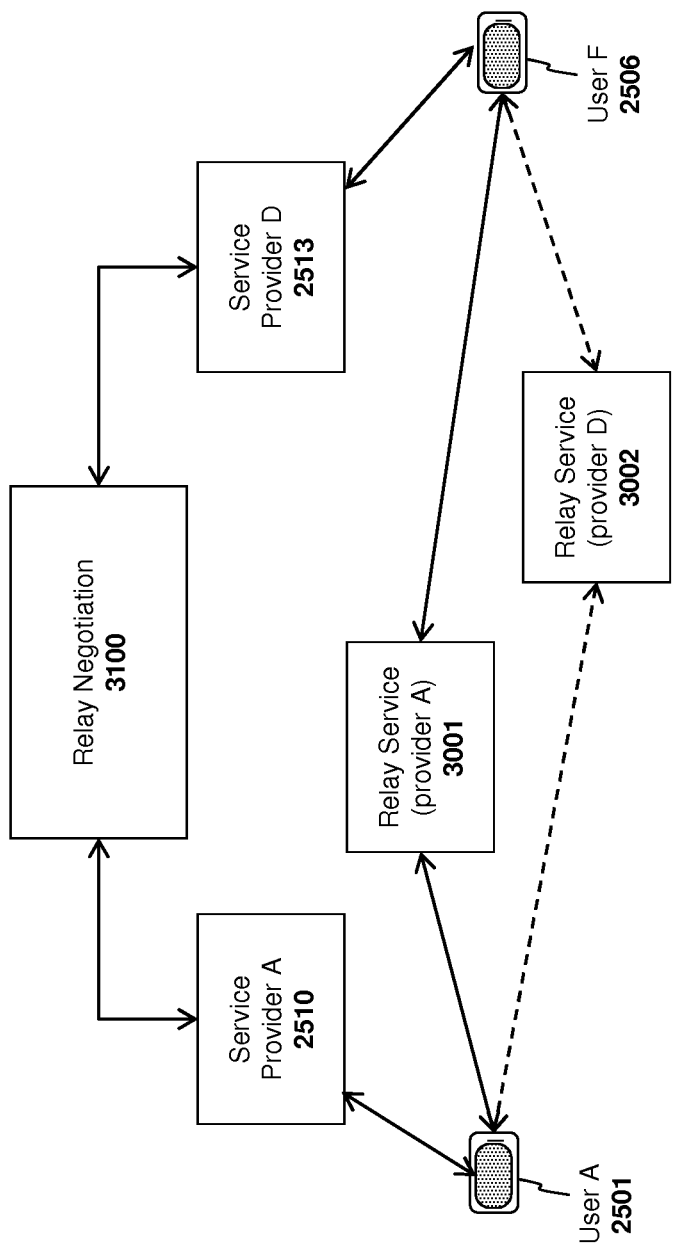
FIG. 31 illustrates another embodiment of the invention for establishing a P2P connection through a relay service.

As discussed above, under certain conditions, User A and User F may need to establish a connection through a relay service 1051 (see, e.g., FIG. 10) instead of a direct P2P connection. As illustrated in FIG. 30, in one embodiment, both service providers A and F may use their own relay services 3001-3002 (and/or have relationships with third party relay services). In one embodiment, if the attempted P2P connection between User A and User F fails, then service provider A's relay service 3001 (i.e., the provider of the user initiating the P2P connection) is used to support the connection. In an alternate embodiment, User F's relay service 3002 (i.e., the provider of the user with whom a connection is being requested) is used to support the connection (as indicated by dotted lines between User A 2501, relay service 3002, and User F 2506 in FIG. 31). In yet another embodiment, all of the providers agree upon a single relay service and utilize that relay service to establish P2P connections between users.

One embodiment of the invention combines a variety of different communication protocols to support secure audio/video P2P communication between user devices. These protocols include (but are not limited to) Datagram Transport Layer Security (DTLS) protocol to provide secure communication over P2P connections; the Secure Real-time Transport Protocol (or SRTP) which defines a profile of RTP (Real-time Transport Protocol), intended to provide encryption, message authentication and integrity, and replay protection to the RTP data for both unicast (device to device) and multicast (device to multiple device) applications; and Session Initiation Protocol (SIP) to establish voice/video connections between user devices. These protocols may be employed within the context of any of the embodiments of the invention described herein.

In one embodiment, each device on the open, inter-provider network illustrated in FIG. 25 will be securely identifiable to other devices for the purposes of identity verification and end to end encryption of the stream using STRP. A certificate format required to be issued by each of the service providers to enable secure communication is described below.

In one embodiment, each provider will need to know how to discover other peer providers. In one embodiment, there is a global and secured list of providers to query for call routing and peer information. This is a list of trusted servers, and their addressing information. One of the providers may host this service.

Described below is the level of security and authentication needed between providers to validate and trust the connection between them. This may be a different set of credentials than are used between the provider and the global lookup database as well as those used to authenticate the P2P connection.

In one embodiment, at call routing time, the recipient's provider (i.e., the user being called) provides a peer certificate to return to the caller to be used to authenticate the P2P connection between the endpoints. This certificate may be able to be signed by an external entity and the certificate requirements may allow for any type of identity, not just an email.

In addition, in one embodiment, audio, video and signaling data is multiplexed together on each data processing device over a single data port. The audio, video, and signaling data is then demultiplexed and decoded at the destination device.

The inter-provider network illustrated in FIG. 25 consists of multiple interoperating layers. The interaction of these layers may be specified by various protocols. The goal of this interaction is to process a user request to establish a connection, performing the necessary exchange of information between the user endpoints (identified as Users A-F 2501-2506 in FIG. 25) so that they can establish an audio/video calling session.

In operation, the inter-provider network shown in FIG. 25 is implemented as a set of servers which communicate with one another, originating and responding to requests. These requests are the protocol actions that are necessary to forward requests so that user endpoints can exchange media channel connection data and form an audio/video-calling session. In one embodiment, each service provider manages all direct communication with its user endpoints.

In one embodiment, user endpoints are represented via a Uniform Resource Identifier (URI) that identifies the party that controls the endpoint. The initial supported URI schemes are tel: (for telephone numbers) and mailto: (for email addresses). Other URI schemes may be supported in the future.

In one embodiment, the mapping of URI to each user endpoint is not an identity mapping; it is a many-to-many relationship. A single URI may map to multiple endpoints, and a single endpoint may be mapped to by multiple URIs. In addition, URI to endpoint mappings may span multiple Providers. For instance, there may be one Endpoint on Provider A, and a different Endpoint on Provider B, and both of these Endpoints may be mapped by the same URI. (However, in one embodiment, endpoints may only be hosted by a single Provider at a time.) In one embodiment, Endpoint URIs are generic, user-level identifiers like phone numbers and email addresses. The mapping of these to providers and endpoints is performed by the system, and is transparent to the end user.

In one embodiment the meta protocol used for the inter-provider communication illustrated in FIG. 25 is dictionaries over HTTP. In this embodiment, all actions are performed as either an HTTP GET or POST. If the action is specified as an HTTP GET, the body will be empty. If the action is specified as an HTTP POST, the body will contain the request parameters encoded as a dictionary. Responses will have a body which contains the response parameters encoded as a dictionary. In one embodiment, the initial encoding of dictionaries is Apple XML Property Lists. Other encodings such as JSON or Protocol Buffers may also be used. In one embodiment, different service providers may use any set of protocols or communication mechanisms to communicate with individual user devices.

In one embodiment, a provider discovery protocol is employed to allow the service providers shown in FIG. 25 to discover one another. In one embodiment, a bootstrap URI is published by the managing entity of the network (e.g., a primary or managing service provider). This bootstrap URI points to a discovery dictionary containing the set of providers that are the accepted members of this network. For each service provider, this dictionary contains identifying information, as well as further URIs which specify how to communicate with this provider. In one embodiment, when service providers start up, and periodically thereafter, they retrieve the discovery dictionary. Then, they configure themselves to communicate with the other providers based on the information in the dictionary.

Details for one particular set of protocols for establishing P2P communication sessions between users will now be described. It should be noted, however, that these specific details represent just particular embodiment and are not required for complying with the underlying principles of the invention.

1. Invitation Protocol

The Invitation Protocol of one embodiment is used for initial call setup. This is the out-of-band signaling used by user endpoints (e.g., user endpoints 2501-2506 in FIG. 25) to exchange media channel connection data, which will be used to establish the media channel for the video-calling session.

1.1. Actions

There are four main actions in Invitation Protocol.

1.1.1. Initiate

Sent by the initiating Endpoint to start a call. Fields: session-id, self-uri, self-token, self-blob, peer-uri.

1.1.2. Accept

Sent by the receiving Endpoint, to indicate that it's willing to participate in the call.

Fields: session-id, self-uri, self-token, self-blob, peer-uri, peer-token, peer-blob.

1.1.3. Reject

Sent by the receiving Endpoint, to indicate that it's not willing to participate in the call. Fields: session-id, self-uri, self-token, self-blob, peer-uri, peer-token, peerblob.

1.1.4. Cancel

Sent by the either Endpoint, to indicate that the call should be terminated. Fields: session-id, self-uri, self-token, self-blob, peer-uri, peer-token, peer-blob.

1.2. Action Variations

Depending on the party servicing the action, these may take three forms:

Request (from Endpoint to Provider)
Forward (from Provider to Provider)
Push (from Provider to Endpoint)

1.3. Call Flow 1.3.1. User Entry

When an Endpoint wishes to establish a connection, it needs a URI to identify receiving Endpoints. This URI is most likely derived from some information provided by the user, for instance a dialed phone number, or an email address stored in an address book. Then the endpoint calls Initiate Request on its hosting provider.

1.3.2. Initiate Request

The initiating provider looks at the URI, and determines the set of receiving providers which host endpoints that are mapped by this URI. (This set of Providers may include the initiating Provider itself.) It then calls Initiate Forward on all applicable receiving Providers.

1.3.3. Initiate Forward

Each receiving provider determines the receiving endpoint, and sends it an Initiate Push.

1.3.4. Initiate Push

The receiving endpoint gets the Initiate Push, and presents the information to the user. (This would typically be UI along the lines of "XXX is calling.") If the user decides to take the call, the endpoint will call Accept Request. (Otherwise, it will call Reject Request.)

1.3.5. Accept Request

The receiving Endpoint calls Accept Request on its hosting Provider.

1.3.6. Accept Forward

The receiving Provider sends Accept Push to the initiating Endpoint.

1.3.7. Accept Push

The initiating end point gets the Accept Push, and indicates to the user that it can proceed with forming a connection. At this point, both Endpoints have exchanged media channel connection data, so they are ready to establish a media channel for the audio/video-calling session. From here, the flow continues with Media Channel Establishment, as documented in Media Session Management (below).

2. Dispatch Optimization Protocol

As discussed in detail above, in one embodiment, Bloom filters are used to choose the candidate service providers which will be able to respond to an initiate call request. In one embodiment, providers are required to maintain an up-to-date Bloom filter representing all the URIs of the Endpoints that they currently host. The Bloom filters for all providers may distributed to all other providers in an incremental fashion.

Dispatch Optimization Protocol. When dispatching an originated call, providers first consult the Bloom filter of all other Providers. From this, they will obtain a candidate set of Providers that can actually service the call. The Initiate action is then sent only to this candidate list.

3. Media Session Management

Media session management refers to the setup, control, and teardown of the media channel and media streams running over the media channel. Media session management is detailed in the following sections.

4. Media Channel Establishment

Network packets for media signaling, media flow, and session teardown are sent over the media channel. The media channel is established through either NAT traversal, or relay configuration (as described in detail above). Both NAT traversal and relay configuration require that each endpoint possesses the media channel connection data for both endpoints.

4.1. NAT Traversal Protocol

In one embodiment, the NAT traversal protocol is used to establish a media channel over a direct peer-to-peer connection. It includes usage of techniques covered in Interactive Connectivity Establishment (ICE) [RFC 5245].

4.2. Relay Configuration Protocol

In one embodiment, the relay protocol is used to establish a media channel over a relay network. In one embodiment, it includes usage of TURN [RFC 5761].

5. Media Channel Signaling

Media signaling covers set up of security for media negotiation and media encryption, and media negotiation for audio and video parameters.

5.1. Security Setup

As mentioned, in one embodiment, Datagram Transport Layer Security (DTLS) [RFC 4347] is used to secure communication of network traffic over the media channel. The DTLS protocol may be implemented to provide end-to-end encryption such that a service provider will not be able to access encrypted content within voice/video packets transmitted between users.

5.2. Media Negotiation

In one embodiment, SIP [RFC 3261] is used for negotiating the audio and video parameters of the video calling session.

5.3. Audio and Video Encryption

In one embodiment, SRTP [RFC 3711] is used for encrypting the audio and video payloads.

6. Media Flow Control

Media flow control covers management of active media streams, and notification of media state changes over the media channel.

6.1. Network Adaptation

In one embodiment, network adaptation techniques are implemented to account for communication channel fluctuations. In particular, a user endpoint may adjust stream parameters such as audio and/or video bitrates in order to adapt to varying network conditions such as changes in throughput, packet loss, and latency.

6.2. Video Muting

An endpoint sending video may mute/unmute video. Notifications are sent to the remote endpoint using SIP MESSAGE.

6.3. Video Orientation

An endpoint sending video may alter the orientation of the video. Notifications are sent to the remote endpoint using RTP header extension information.

6.4. Video Switching

An endpoint sending video may switch the source of video. For example, on a user device which includes both front-facing and back-facing cameras, the video may switch from front-facing to back-facing. Notifications may be sent to the remote endpoint using RTP header extension information.

6.5. Hangup

In one embodiment, an endpoint can explicitly terminate an active session by sending a SIP BYE message.

7. Media Channel Teardown

A media session may be torn down explicitly or implicitly. An explicit teardown of the media channel is done via sending or receiving a SIP BYE message. An implicit teardown may occur due to network connectivity loss, or poor network performance.

8. Security
8.1. Certificates

In one embodiment, communications between endpoints in the inter-provider system shown in FIG. 25 are secured using public key cryptography. Each entity (Provider and Endpoint) has a certificate issued by a trusted CA which signs its identity. This certificate contains the URI belonging to the entity, as well as other identifying information. The certificate can be used by counter-parties to verify the identity of the entity when communicating.

8.2. Media Channel Signaling

SIP messages may be secured using DTLS [RFC 4347].

8.3. Audio and Video

Audio and video streams may be secured using SRTP [RFC 3711].

9. Encoding
9.1. Audio
9.1.1. Audio Codec

The Audio Codec may be compliant to MPEG-4 Enhanced Low Delay AAC (AAC-ELD, ISO/IEC 14496-3).

9.1.2. Audio Quality

In one embodiment, the audio signal acoustic characteristics are specified by the 3GPP spec for WideBand telephony terminals, TS 26.131 and TS 26.132.

9.1.2. Audio RTP Payload Format

9.2. Video

In one embodiment, sequence parameter set (SPS) and picture parameter set (PPS) NALUs are used to carry the video stream description in the bitstream.

9.2.1. Video Codec

In one embodiment, the Video Codec used to communicate between users in FIG. 25 is H.264 High Profile without b-frames, Level 1.2 (effectively, QVGA 15 fps, max 300 kbps). It should be noted, however, that the underlying principles of the invention are not limited to any particular audio/video format.

9.2.2. Video RTP Payload Format

Figure 32:
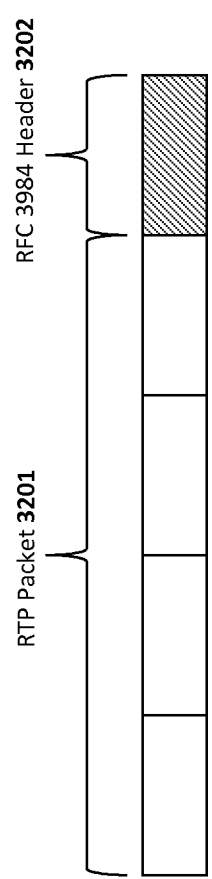
FIG. 32 illustrates an RTP packet with an RFC 3984 header employed in one embodiment of the invention.

As mentioned, the Realtime Transport Protocol (RTP) may be used to support audio/video communication between user endpoints. As illustrated in FIG. 32, in one embodiment, an RFC 3984 header 3202 (i.e., as defined by RFC 3984, RTP Payload Format for H.264 Video) is appended to each 12 byte RTP Payload 3201 (containing an RTP data packet). The header specifies how the RTP data is packetized using an H.264 image description extension.

System and Method for Secure Instant Messaging

Figure 33:
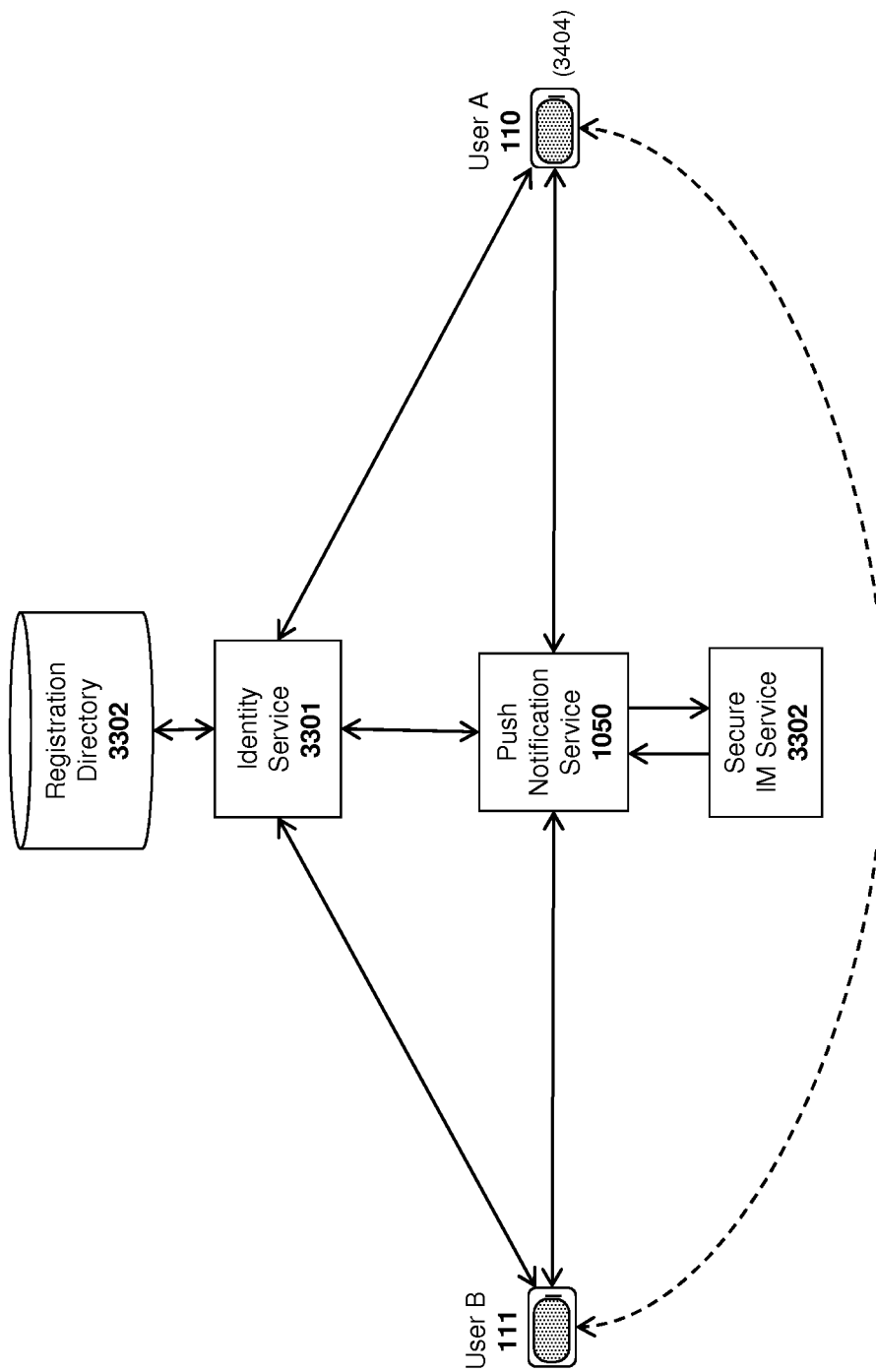
FIG. 33 illustrates a push notification service and a secure instant messaging service.

One embodiment of the invention provides an architecture to enable secure peer-to-peer sessions between mobile devices for applications such as instant messaging and video chat. As illustrated in FIG. 33, this embodiment of the invention includes an identity service 3302 for authenticating users, a push notification service 1050 for pushing notifications to mobile devices (as previously described), and secure instant messaging service 3302 for establishing secure instant messaging sessions between two or more mobile users (users A 110 and B 111 are illustrated in FIG. 33). In one embodiment, the identity service 3301 manages a user registration directory 3302 of active user IDs, authentication keys and push tokens, which may be used by the notification service 1050 as described herein to send push notifications to mobile devices. In one embodiment, the user IDs are email addresses, although the underlying principles of the invention are not limited to any particular type of user ID. Moreover, a single user may have multiple user IDs for different applications (e.g., instant messaging, video chat, file sharing, etc) and may have different mobile devices (e.g., an iPhone™ and a separate iPad™—devices designed by the assignee of the present patent application).

Figure 34:
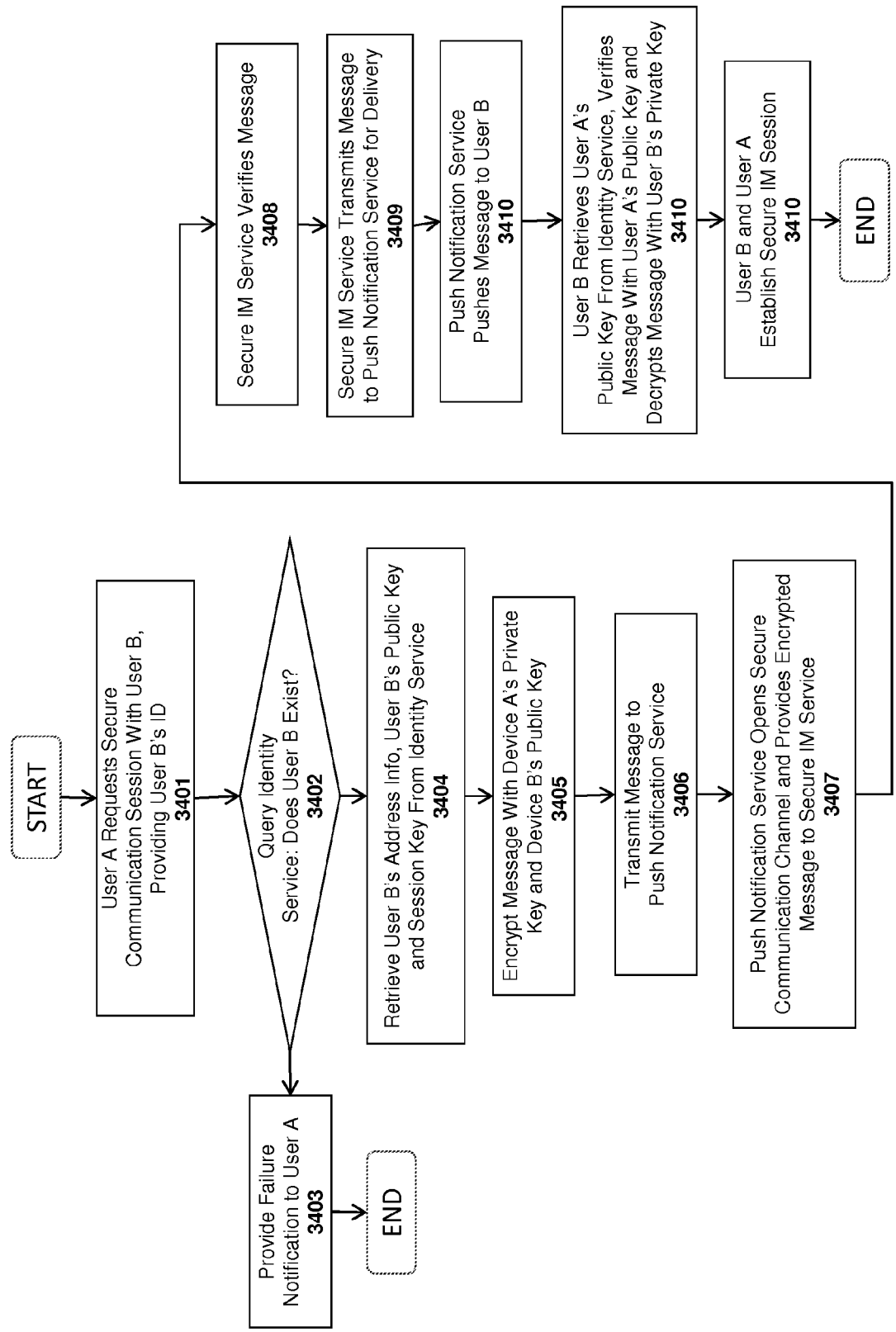
FIG. 34 illustrates one embodiment of a method for establishing a secure instant messaging session.

One embodiment of a computer-implemented method for establishing secure peer-to-peer communication channels is illustrated in FIG. 34. While this method will initially be described within the context of the architecture shown in FIG. 33, it should be noted that the underlying principles of the invention are not limited to this particular architecture.

At 3401, user A transmits a query including an identifier for user B's (e.g., user B's email address and/or phone number) to the identity service 3301 to initiate a secure communication channel with user B. In response, the identity service 3301 determines whether any user ID matches the query at 3402 (e.g., whether user B's email address or telephone number is registered within the identity service). If not, at 3403, the identity service transmits a failure notification to user A.

If a match is found, then at 3404 user A retrieves user B's network address info and public key from the identity service 3301. In one embodiment, the address info includes a token for user B's computing device, thereby authorizing user A to talk to user B with this specific address (device A's token can talk to B's token). If user B has multiple devices, multiple tokens may be provided from the identity service 3301 (one for each device) and routed separately to user A.

In one embodiment, a session key is also generated (sometimes referred to herein as a "query signature") which is a signature over a timestamp of the current time, user A's ID, user B's ID, user A's token, and user B's token provided by the identity service 3301. This session key is subsequently used by the secure IM service 3302 to authenticate the two users without involving the identity service (as described below).

User A now has addressing information and public key for each of these address units (target IDs/tokens). At 3404, device A encrypt the message and attachments to be sent to user B with user A's private key and device B's public key. In one embodiment, this comprises encrypting the content of the text/attachments with user B's key and signing the content with user A's key. Once encrypted, the message cannot be decrypted at any of the severs situated between user A and user B, although the servers can see the type of message being transmitted (e.g., whether it is a text message or read receipt). As a result of the encryption using user B's public key, only user B can read the message contents. User B can also verify the sender (user A) with using user A's signature.

At 3406, user A opens a secure communication channel with the push notification service 1050 using datagram transport layer security (DTLS) and sends the encrypted message to the push notification service 1050 with user B's token, user ID, and user A's user ID. As is known by those of skill in the art, the DTLS protocol provides communications privacy, allowing datagram-based applications to communicate in a way that is designed to prevent eavesdropping, tampering, or message forgery. The specific details associated with the DTLS protocol are well known and therefore will not be described here in detail.

In one embodiment, user A's token is not transmitted to the push notification service 1050 in this step, but is inferred based on user A's communication with the push notification service 1050. At 3407, the push notification service 1050 opens a secure communication channel with the secure instant messaging service 3302 and, upon request, provides the secure instant messaging service with user A's push token. Thus, at this stage, the secure instant messaging service 3302 has user B's token and ID, and user A's token and ID. In one embodiment, it verifies this information using the session key mentioned above, e.g., by re-generating the session key with user B's token and ID, and user A's token and ID and a timestamp and comparing the generated session key to the one received from the push notification service 1050. In one embodiment, the if the current timestamp is too far ahead of the original timestamp then the signatures will not match and a verification failure will occur. If the signatures match (i.e., if the message is well signed) then at 3409, the secure instant messaging service 3302 opens a second, outgoing secure communication channel with the push notification service 1050, adds user A's push token to the message (along with user B's push token and ID) and transmits the message to the push notification service 1050 for delivery to user B. Significantly, at this stage, the secure IM service 3302 does not need to query the identity service 3301 for verification purposes, thereby preserving network bandwidth.

At 3410, the push notification service opens a secure communication channel with user B using transport layer security (TLS) and pushes the message to user B. At 3411, user B performs the same verification operations described above for user A to verify and decrypt the message. In particular, user B may query the identity service 3301 to retrieve user A's public key and then uses the public key to verify the message (which had been previously been signed using user A's private key and encrypted with user B's public key). At this stage, users A and B have all of the information needed to establish a secure IM session at 3410 (e.g., public keys and tokens).

Figure 35:
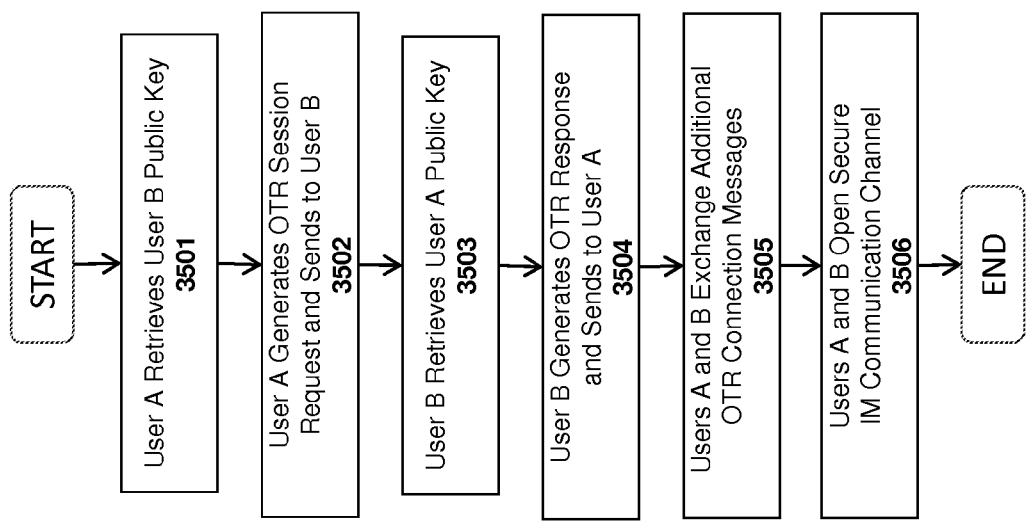
FIG. 35 illustrates another embodiment of a method for establishing a secure instant messaging session.

In one embodiment, illustrated in FIG. 35, Off-the-Record Messaging (OTR) negotiation may be used in lieu of, or in addition to the techniques described above. As is known by those of skill in the art, OTR is a cryptographic protocol that provides strong encryption for instant messaging conversations which uses a combination of the AES symmetric-key algorithm, the Diffie-Hellman key exchange, and the SHA-1 hash function. In one embodiment, the secure messaging techniques described above are attempted and, if unsuccessful, then the OTR techniques illustrated in FIG. 35 are employed.

At 3501, user A queries the identity service using User B's ID (e.g., email address, phone number, etc) and retrieves User B's public key from the identity service. At 3502, user A generates a secure OTR session request by encrypting using user B's public key and transmits the request to user B. At 3503, user B decrypts using user B's private key and, in response to the session request, user B retrieves user A's public key.

At 3504, user B generates an OTR response, encrypting the response with user A's public key. At 3505, users A and B exchange additional OTR connection messages. The specific messages exchanged at this stage may be are defined by the current OTR specification and are therefore not described in detail here. At 3506, once all necessary connection data has been exchanged, users A and B open secure instant messaging communication channels with one another.

While the embodiments described above focus on an instant messaging implementation, the underlying principles of the invention may be implemented with other types of peer-to-peer communication services such as peer-to-peer audio and/or video services.

Embodiments of an Identity Service for Connecting Mobile Users

As mentioned above, in one embodiment, the identity service 3301 manages a user registration directory 3302 of active user IDs, authentication keys and push tokens. The identity service 3301 is used by other services such as the push notification service 1050 and the secure instant messaging service 3302 to provide efficient identifying information for mobile devices and users based on human-usable input. In particular, in one embodiment, the identity service comprises a shared user registration database 3302 with tables that map convenient user-readable user ID codes (e.g., phone numbers, email addresses, game center nicknames, etc) to detailed user/device information.

In one embodiment, a single user ID may map to multiple physical devices within the user registration directory 3302. For example, a user with the ID tom@bstz.com may have multiple mobile devices such as an iPhone™ and a separate iPad™ (devices designed by the assignee of the present patent application) and a separate notebook/desktop personal computer. Any user or service with the necessary authentication credentials may query the identity service to retrieve information about other users. While the foregoing specific devices are used for the purposes of illustration, the underlying principles of the invention are not limited to any particular device type.

In one embodiment, the device information maintained for each device comprises (1) a push token for the device (which includes network addressing information for the device as described above) and (2) a set of capabilities of the device. The capabilities may include the identity of the service provider for the device (e.g., AT&T vs Verizon), device version information (e.g., software OS version and/or application versions) and one or more protocols supported by the device (e.g., based on the application program code installed on the device). For example, if the device has the Facetime™ application installed, then this information will be stored by the identity service along with device information. Additionally, the device information may specify the types of services that each user device is capable of communicating with (e.g., such as the secure instant messaging service described above).

Thus, in response to a query to retrieve user B's device information, user A may receive a response from the identity service 3301 containing the above device information for each of user B's devices. This will effectively inform user A's device of the different ways in which user A's device can communicate with user B. For example, if user A has some of the same communication applications as user B (e.g., the same instant messaging client, Facetime application, file sharing application, etc), with the correct versions installed, then user A's device may use this information to attempt to open a communication channel with user B.

In one embodiment, the device information also includes a set of flags which identify the specific application capabilities for each application. Returning to the Facetime example above, the device information may specify that User B's device supports Facetime channels over 3G networks. In such a case, user A's device may then attempt to open a communication channel with user B's device over a 3G network using the specific protocols supported by user B's device. Of course, the foregoing are merely illustrative examples. The underlying principles of the invention are not limited to any particular set of application capabilities or protocols.

Figure 36:
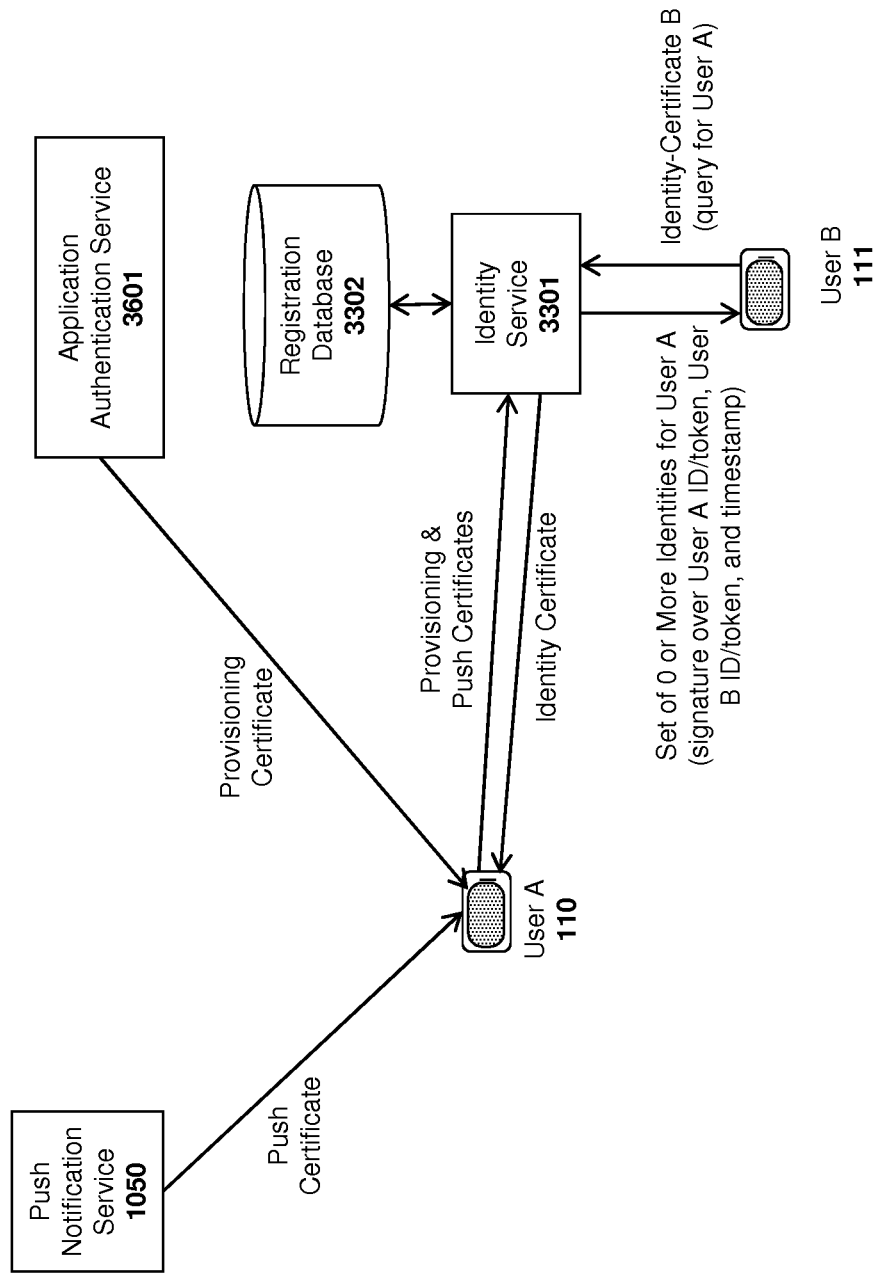
FIG. 36 illustrates a system architecture including an identity service and an application authentication service.

In one embodiment of the invention, illustrated in FIG. 36, there are four operations that a device may perform to interact with the identity service: (1) authenticate; (2) registration; (3) canonicalize; and (4) query.

(1) Authentication

"Authenticate" as used herein refers to proving the identity of a particular user identifier (ID). In one embodiment, the authentication performed may be different for different types of ID codes (e.g., email addresses, service nicknames, user ID codes, phone numbers, etc). For example, authentication of email addresses may be different from authentication of phone numbers or service ID codes.

Figure 37:
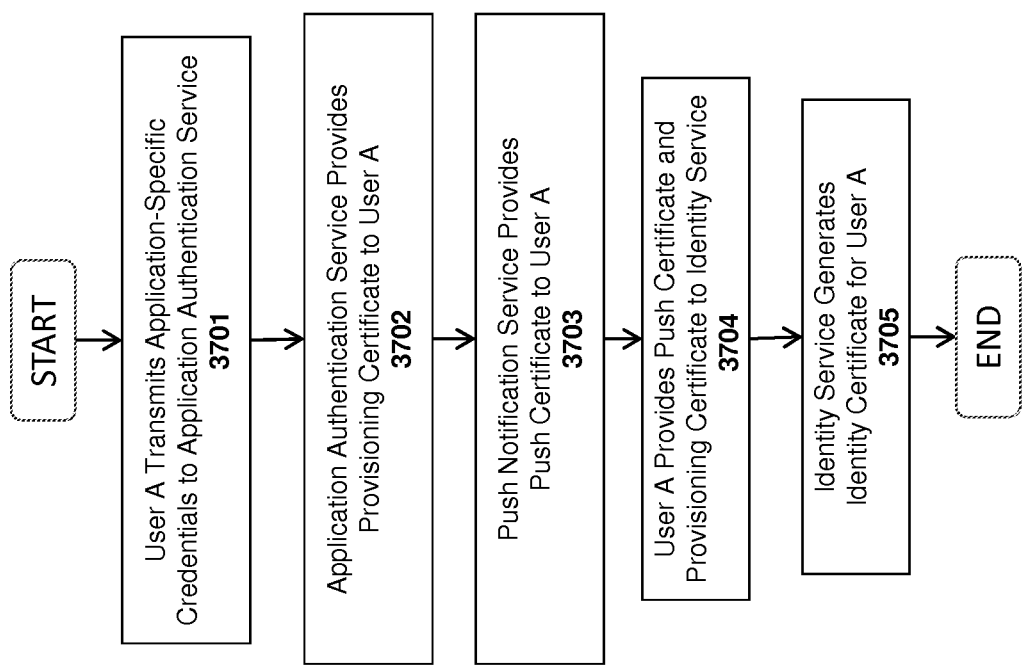
FIG. 37 illustrates one embodiment of a method for securely authenticating a user.

These operations will be described with respect to the system architecture shown in FIG. 36 and the method set forth in FIG. 37. It should be noted, however, that the method illustrated in FIG. 37 may be implemented on different system architectures while still complying with the underlying principles of the invention.

At 3701, user A transmits a set of application-specific credentials to the application authentication service 3601. In the case of an email application, for example, the credentials may include user A's email address and password; in the case of a game application, this may include the user ID for the game service and a password; and in the case of a phone number, it may include a short message service (SMS) signature. Moreover, while illustrated in FIG. 36 as separate services, the application authentication service 3601 and identity service 3301 may form a single, integrated service.

In response, at 3702, the application authentication service 3601 takes the provided authentication credentials, signs them, puts them into an authentication certificate, referred to herein as a "provisioning certificate," and transmits the provisioning certificate to user A. In one embodiment, the provisioning certificate comprises a cryptographic nonce (e.g., a timestamp), and the signature.

In addition to the provisioning certificate, in one embodiment, user A is provided with a "push certificate" received from the push notification service at 3703 which includes a signature over user A's push token, a nonce (e.g., a timestamp), and a list of user A's capabilities (e.g., specific applications installed on user A's device). In one embodiment, the push certificate is provided to user A's device when user A's device is initially provisioned on the network.

(2) Registration

At 3704, user A registers its push certificate and its provisioning certificate with the identity service and, at 3705, the identity service extracts certain predetermined information from the push certificate and provisioning certificate, and generates its own signature for these entities, referred to herein as the "identity certificate" of user A, which may subsequently be used to verify the identity of user A with any of the services on the network (i.e., without the need for the services to individually contact the identity service for verification).

(3) Canonicalize

Certain types of user IDs are "noisy," meaning that they are often represented using a variety of different formats. For example, the same phone number can be represented as either 408-555-1212, 1-408-555-212 or 4085551212. There are also a variety of international access codes and carrier access codes which take on different formats. Consequently, a first user may know the phone number of a second user, but may not know the particular format needed to reach the user given the current context (e.g., where the user is currently roaming, how the phone number is formatted) to locate the second user's phone number in the registration database 3302.

It would be inefficient to store each of the different variations of a particular user ID within the registration database (i.e., it would consume a significant amount of space and might not successfully capture all of the different possible formats). As such, to address this problem, one embodiment of the invention canonicalizes user IDs prior to storing the user IDs within the registration database 3302 (e.g., using an agreed-upon canonical format).

In one embodiment, the identity service 3301 includes logic for performing the canonicalization based on the current context of the user and the settings on the requesting device. For example, in FIG. 37, user B may provide the identity service 3301 with the identity of its home carrier (e.g., AT&T), its current roaming carrier (e.g., TMobile), user settings (e.g., an indication as to whether international assist is being used), and a raw target ID code (e.g., User A's phone number in a non-canonicalized form such as 4085551212). In response, the identity service 3301 will canonicalize the raw target ID based on all of the foregoing variables prior to performing the query on the registration database 3302. Thus, the canonical ID of user A (not the raw ID) is provided to user B in response to user B's query to the identity service (described in greater detail below).

(4) Query

As previously described, in order to establish a secure communication channel with a target user, a user initially queries the identity service to retrieve identities for the target user. As illustrated in FIG. 36, User B transmits a query for User A's identity, sending its own identity certificate as part of the query. In response, the identity service sends back 0 or more identity certificates, each of which include User A's ID code (in a canonicalized format as mentioned above), a push token for that identity and a query signature generated over User A's ID and push token and User B's ID and push token.

It would be inefficient to force each service to query the IDS every time authentication is required. For example, when user A wants to send a message to user B, the instant messaging service described above would need to query the identity service with user A's token and signature and user B's token and signature, which would consume network resources.

To address this issue, in the embodiments of the invention described herein, a set of 0 or more signatures is generated by the identity service for each transaction between users and this set of signatures is sent along with each request to each service. The signature is over the tuple of: source ID, source token, target ID, target token and timestamp, as described above. Thus, any service can perform verification itself by dynamically generating a cryptographic signature over these entities to verify without contacting the identity service.

In addition, each individual service can make a decision as to how fresh the timestamp needs to be for the verification to occur successfully. As long as the verification is taking place within a pre-specified window of time from the original timestamp generated by the identity service, then the transaction will be successfully verified. Thus, the identity service provides tools for allowing application services to authenticate users, but does not make policy decisions on how authentication should occur (e.g., how fresh the timestamp needs to be). Thus, different applications may have different policies for authentication.

Figure 38A:
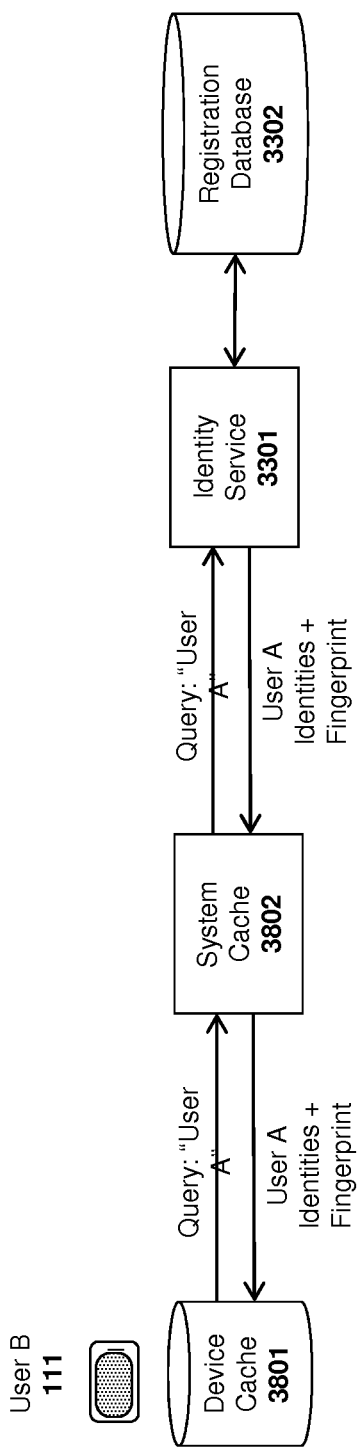
FIG. 38 illustrates one embodiment of the invention which improves authentication efficiency using caching and fingerprints.
Figure 38B:
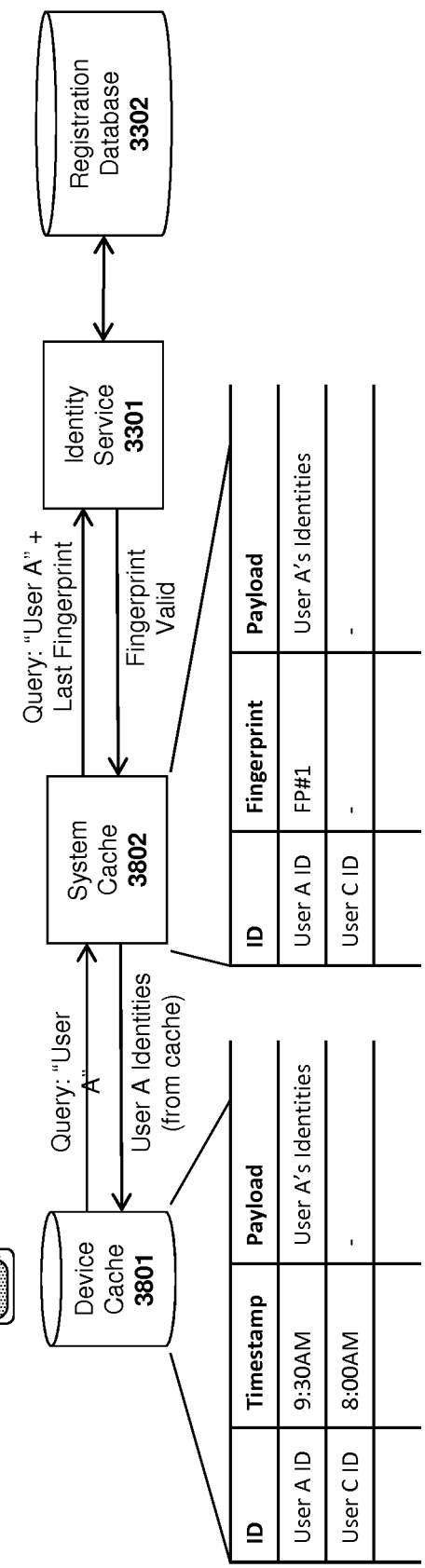

One embodiment of the identity service implements a caching architecture for queries to further reduce the amount of network traffic. As illustrated in FIGS. 38a-b, in this embodiment, a device cache 3801 of user IDs is maintained on each user device 111 and an intermediate system cache 3802 is implemented on the network between the identity service 3301 and the device 3801 to service identity requests and thereby reduce the load on the identity service. In one embodiment, the system cache 3802 is provided by a content distribution network such as currently available from Akamai and other content distribution services.

As illustrated in FIG. 38a, if the system cache does not currently have a valid entry for user A, it will forward the request to the identity service which will respond with 0 or more identities for user A as described above. In addition, in the embodiment shown in FIG. 38a, the identity service generates a fingerprint for user A's identities and transmits the fingerprint back to the system cache. In one embodiment, the fingerprint is a hash over the entities which comprise user A's identity (i.e., A's canonicalized ID, push token, and timestamp). In one embodiment, the hash is an SHA-1 hash, although the underlying principles of the invention are not limited to any particular type of hash algorithm.

The fingerprint is then cached with user A's identities on the system cache, as indicated in FIG. 38b (e.g., indexed using user A's canonicalized identities). In addition, the fingerprint and associated IDs may be cached within the device cache 3801 on user B's device.

When user B subsequently needs to query for user A's identities, user B will initially look within the device cache 3801 to determine whether a valid cache entry exists for user A's identities. In one embodiment, each cache entry has a time to live (TTL) value associated therewith (as determined by the timestamp column shown in FIG. 38). As long as the request for an identity occurs within a specified window of time from the timestamp, then the entry in the device cache 3801 is valid and a query over the network is not required (i.e., user B reads user A's identities from the device cache 3801).

If, however, the cache entry within the device cache 3801 has expired (i.e., is past the TTL value), then user B transmits a query for user A's identities to the system cache 3802, which looks up the fingerprint for user A (using user A's canonicalized ID code) and transmits the fingerprint to the identity service 3301 along with the query for user A. If the fingerprint is still valid, as determined by the identity service 3301 (e.g., if the timestamp is still within a valid window of time), then the only response required by the identity service 3301 is an indication of the fingerprint's validity. The system cache 3802 then returns its cached copy of user A's identities to user B, as indicated in FIG. 38b. The foregoing caching techniques save a considerable amount of processing resources that would otherwise be required to generate a new set of signatures over user B's and user A's identities.

In one embodiment, the cache TTL value mentioned above may be configurable on a per-application basis (i.e., based on the security preferences of the application designer). Thus, for example, an application such as Facetime™ may be provided with a different TTL value than iChat™. In addition, the TTL value may be dynamically set based on current network conditions. For example, if the network is currently overloaded with traffic, then the TTL value may be set dynamically to a higher value (so that the cached identity is valid for a longer period of time). In addition, in one embodiment, all of the caching techniques described above are implemented within an API exposed to application developers. As such, the caching of identities occurs transparently to the applications which use them.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method for managing user identities on a network comprising:

receiving, by an identity service executing on a processor in a server on the network, a request to register an identity for a first user, the request including a token containing a notification service account identifier for a mobile device of the first user that uniquely identifies the mobile device of the first user to a push notification service, the push notification service executing on a processor in a server on the network to transmit data to mobile devices identified by tokens, the request further including one or more authenticated identification (ID) codes uniquely identifying the first user;

storing, by the identity service, an entry for the first user within a registration database, the entry associating the token with the authenticated ID codes of the first user;

receiving, by the identity service, a query from a second user to communicate with the first user, the query including at least one of the authenticated ID codes of the first user, the query further including at least one authenticated ID code of the second user and a token containing a notification service account identifier for a mobile device of the second user that uniquely identifies the mobile device of the second user to the push notification service on the network;

generating, by the identity service, a first query signature over one or more of the authenticated ID codes and tokens of the first and second users, and a timestamp, the query signature usable by application-specific network services to authenticate communication between the first and second users on the network; and transmitting, by the identity service, the first query signature and the first user's token to the mobile device of second user, the mobile device of the second user subsequently sending a message to the push notification service for delivery to the first user upon verification by a first application-specific network service using the first query signature sent to the first application-specific network service by the push notification service.

2. The method as in claim 1 further comprising:
receiving a request from the second user at the first application-specific network service to establish a communication channel with the first user;
generating a second query signature at the first application-specific network service using the authenticated ID codes and tokens of the first and second users, and a current timestamp;
if the first query signature and the second query signatures match, then allowing communication between the first user and the second user using the first application-specific network service.

3. The method as in claim 2 wherein if the first query signature does not match the second query signature, then rejecting the request from the second user at the first application-specific network service to establish a communication channel with the first user.

4. The method as in claim 3 wherein the first application-specific network service comprises an instant messaging service.

5. The method as in claim 1 wherein the request to register the identify of the first user includes application data identifying applications installed on the first user's mobile device, the application data being stored in the entry for the first user within the registration database,
wherein the request from the second user includes application data identifying applications installed on the second user's mobile device, and wherein the response to the second user identifies applications common to both the first user's mobile device and the second user's mobile device.

6. The method as in claim 5 wherein at least one of the applications comprises a video chat application.

7. The method as in claim 1 wherein the one or more authenticated ID codes are received from the first user in a non-canonicalized format, the method further comprising:
canonicalizing the one or more authenticated ID codes to generate canonicalized ID codes prior to storing the canonicalized ID codes within the registration database; and
transmitting one or more of the canonicalized ID codes to the second user with the first query signature and first user's token.

8. The method as in claim 7 wherein one of the authenticated ID codes comprises a telephone number associated with the first user.

9. The method as in claim 1 wherein one of the authenticated ID codes comprises an email address associated with the first user.

10. The method as in claim 1 further comprising:
generating a first certificate for the first user comprising a signature over the token of the first user;
generating a second certificate for the first user comprising a signature over at least one of the authenticated ID codes of the first user and a password associated with the first user; and
generating a third certificate for the first user using data extracted from the first certificate and the second certificate, and a timestamp, the third certificate usable by the application-specific network services to authenticate the first user on the network.

11. A method comprising:
receiving, by an identity service executing on a processor in a server on a network, a first query from a mobile device of a first user to communicate with a mobile device of a second user;
responsively providing, by the identity service, the mobile device of the first user with one or more authenticated identities of the second user, a token for a mobile device of the second user, and a fingerprint generated with one or more authenticated identities of the first user, the token, and a timestamp, the token containing a notification service account identifier for the mobile device of the second user that uniquely identifies each mobile device of the second user to a push notification service, the push notification service executing on a processor in a server on the network to transmit data to mobile devices identified by tokens, the mobile device of the first user subsequently sending a message to push notification service for delivery to the second user upon verification by a first application-specific network service using authentication identifiers and tokens for the first and second users sent to the first application-specific network service by the push notification service;
subsequently checking, by the identity service, the fingerprint on the mobile device of the first user to determine if the fingerprint is still valid in response to a second query generated from the first user to communicate with the second user, wherein if the fingerprint is still valid then re-using the one or more authenticated identities of the second user and the token of the second user provided in response to the first query.

12. The method as in claim 11 wherein the fingerprint comprises a hash over the one or more authenticated identities and the token of the second user.

13. The method as in claim 12 wherein the hash comprises an secure hash algorithm 1 ("SHA-1") hash.

14. The method as in claim 11 wherein subsequently checking the fingerprint comprises re-generating the fingerprint using the one or more authenticated identities and token of the second user and a current timestamp and comparing the re-generated fingerprint with the original fingerprint.

15. The method as in claim 12 further comprising:
storing the one or more authenticated identities, the token of the second user, and the fingerprint in a network cache;
receiving a subsequent query at the network cache for the one or more authenticated identities and token of the second user;
transmitting the fingerprint from the network cache to the identity service;
receiving a response from the identity service indicating whether the fingerprint is still valid, wherein if the fingerprint is still valid, transmitting the one or more authenticated identities and the token stored in the network cache to the mobile device from which the subsequent query was received.

16. The method as in claim 15 wherein, if the fingerprint is no longer valid, then transmitting one or more authenticated identities and the token of the second user and a new fingerprint from the identity service to the network cache, the new fingerprint generated using the one or more authenticated identities and the token of the second user and a current timestamp.

17. A non-transitory machine-readable medium having program code stored thereon which, when executed by one or more machines, causes the machines to perform the operations of:

receiving, by an identity service executing on a processor in a server on a network, a request from a mobile device of a second user at a first application-specific network service to establish a communication channel with a mobile device of a first user;

generating, by the identity service, a second query signature at the first application-specific network service using authenticated ID codes and tokens of the first and second users, and a current timestamp, the tokens containing a notification service account identifier for each of the mobile devices of the first and second users that uniquely identifies each of the mobile devices to a push notification service, the push notification service executing on a processor in the network to transmit data to mobile devices identified by tokens;

if a first query signature and the second query signatures match, then allowing communication between the mobile devices of the first user and the second user using the first application-specific network service, the first query signature sent from the push notification service to the first application-specific network service to verify a message sent from the mobile device of the second user to the push notification service for delivery to the first user.

18. The non-transitory machine-readable medium as in claim 17 wherein if the first query signature does not match the second query signature, then rejecting the request from the mobile device of the second user at the first application-specific network service to establish a communication channel with the mobile device of the first user.

19. The non-transitory machine-readable medium as in claim 18 wherein the first application-specific network service comprises an instant messaging service.

20. The non-transitory machine-readable medium as in claim 17 wherein the identity service receives a request to register an identity of the first user that includes application data identifying applications installed on the mobile device of the first user, the application data being stored in an entry for the first user within a registration database, wherein the request from the second user includes application data identifying applications installed on the mobile device of the second user, and wherein the identity service identifies applications common to the mobile device of the first user and the mobile device of the second user.

21. The non-transitory machine-readable medium as in claim 20 wherein at least one of the applications comprises a video chat application.

22. The non-transitory machine-readable medium as in claim 17 wherein the one or more authenticated ID codes are received from the first user in a non-canonicalized format, the machine-readable medium further comprising:

canonicalizing one or more authenticated ID codes to generate canonicalized ID codes prior to storing the canonicalized ID codes within a registration database; and transmitting one or more of the canonicalized ID codes to the mobile device of the second user with the first query signature and first user's token.

23. The non-transitory machine-readable medium as in claim 22 wherein one of the authenticated ID codes comprises a telephone number associated with the first user.

24. The non-transitory machine-readable medium as in claim 17 wherein one of the authenticated ID codes comprises an email address associated with the first user.

25. The non-transitory machine-readable medium as in claim 17 comprising additional program code to cause the machines to perform the additional operations of:

generating a first certificate for the first user comprising a signature over the token of the first user;

generating a second certificate for the first user comprising a signature over at least one of the authenticated ID codes of the first user and a password associated with the first user; and generating a third certificate for the first user using data extracted from the first certificate and the second certificate, and a timestamp, the third certificate usable by application-specific network services to authenticate the first user on the network.

26. A non-transitory machine-readable medium having program code stored thereon which, when executed by one or more machines, causes the machines to perform the operations of:

receiving, by an identity service executing on a processor in a server on a network, a first query from a mobile device of a first user to communicate with a mobile device of a second user;

responsively providing, by the identity service, the mobile device of the first user with one or more authenticated identities of the second user, a token containing a notification service account identifier for a mobile device of the second user, the token uniquely identifying the mobile device of the second user to a push notification service, the push notification service executing on a processor in a server on the network to transmit data to mobile devices identified by tokens, and a fingerprint generated with one or more authenticated identities of the first user, the token, and a timestamp, the mobile device of the first user subsequently sending a message to push notification service for delivery to the second user upon verification by a first application-specific network service using authentication identifiers and tokens for the first and second users sent to the first application-specific network service by the push notification service;

subsequently checking, by the identity service, the fingerprint on the mobile device of the first user to determine if the fingerprint is still valid in response to a second query generated from the first user to communicate with the second user, wherein if the fingerprint is still valid then re-using the one or more authenticated identities of the second user and the token of the second user provided in response to the first query.

27. The non-transitory machine-readable medium as in claim 26 wherein the fingerprint comprises a hash over the one or more authenticated identities and the token of the second user.

28. The non-transitory machine-readable medium as in claim 27 wherein the hash comprises an secure hash algorithm 1 ("SHA-1") hash.

29. The non-transitory machine-readable medium as in claim 26 wherein subsequently checking the fingerprint comprises re-generating the fingerprint using the one or more authenticated identities and token of the second user and a current timestamp and comparing the re-generated fingerprint with the original fingerprint.

30. The non-transitory machine-readable medium as in claim 26 comprising additional program code to cause the machines to perform the additional operations of:

storing the one or more authenticated identities, the token of the second user, and the fingerprint in a network cache;

receiving a subsequent query at the network cache for the one or more authenticated identities and token of the second user;

transmitting the fingerprint from the network cache to the identity service;

receiving a response from the identity service indicating whether the fingerprint is still valid, wherein if the fingerprint is still valid, transmitting the one or more authenticated identities and the token stored in the network cache to the mobile device from which the subsequent query was received.

31. The non-transitory machine-readable medium as in claim 30 wherein, if the fingerprint is no longer valid, then transmitting one or more authenticated identities and the token of the second user and a new fingerprint from the identity service to the network cache, the new fingerprint generated using the one or more authenticated identities and the token of the second user and a current timestamp.

* * * * *